Nov. 18, 1969   S. A. MENCACCI   3,478,677
PRESSURE COOKER
Filed Aug. 8, 1966   28 Sheets-Sheet 7
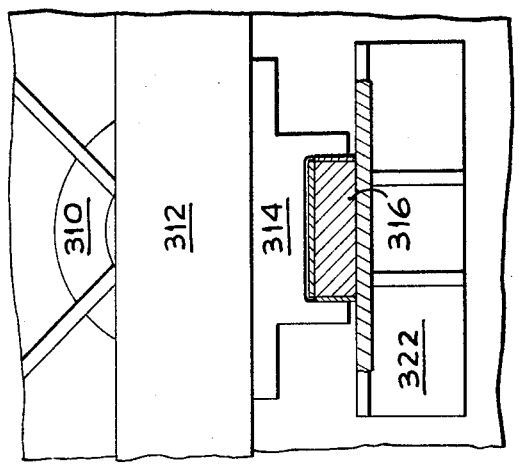
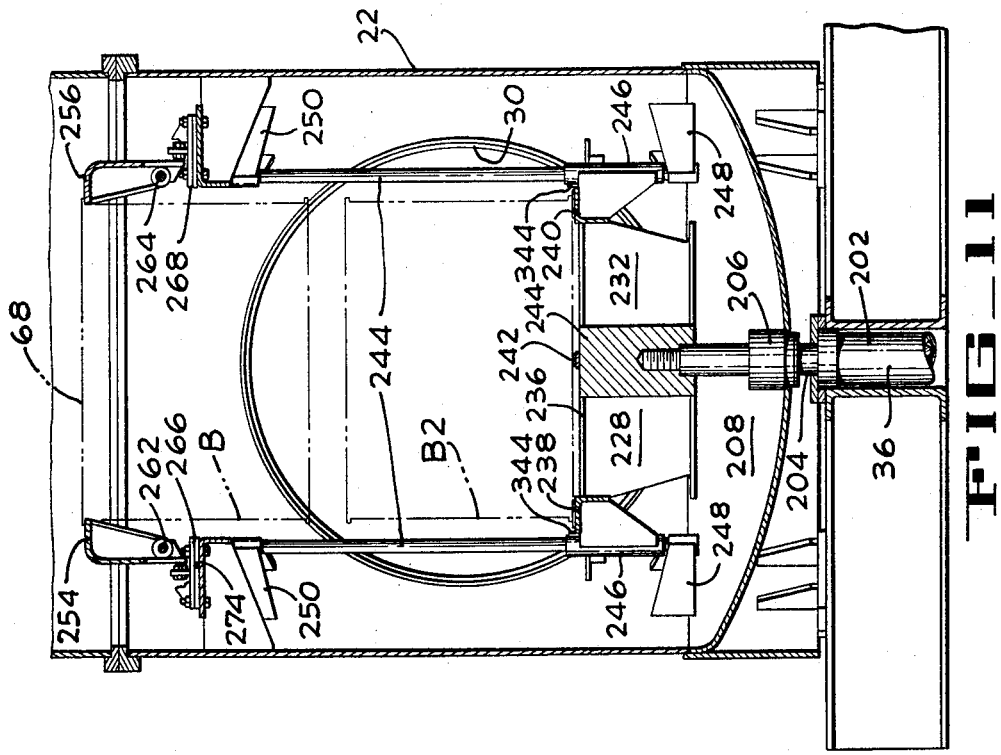
INVENTOR
SAMUEL A. MENCACCI
BY Francis W. Anderson
ATTORNEY

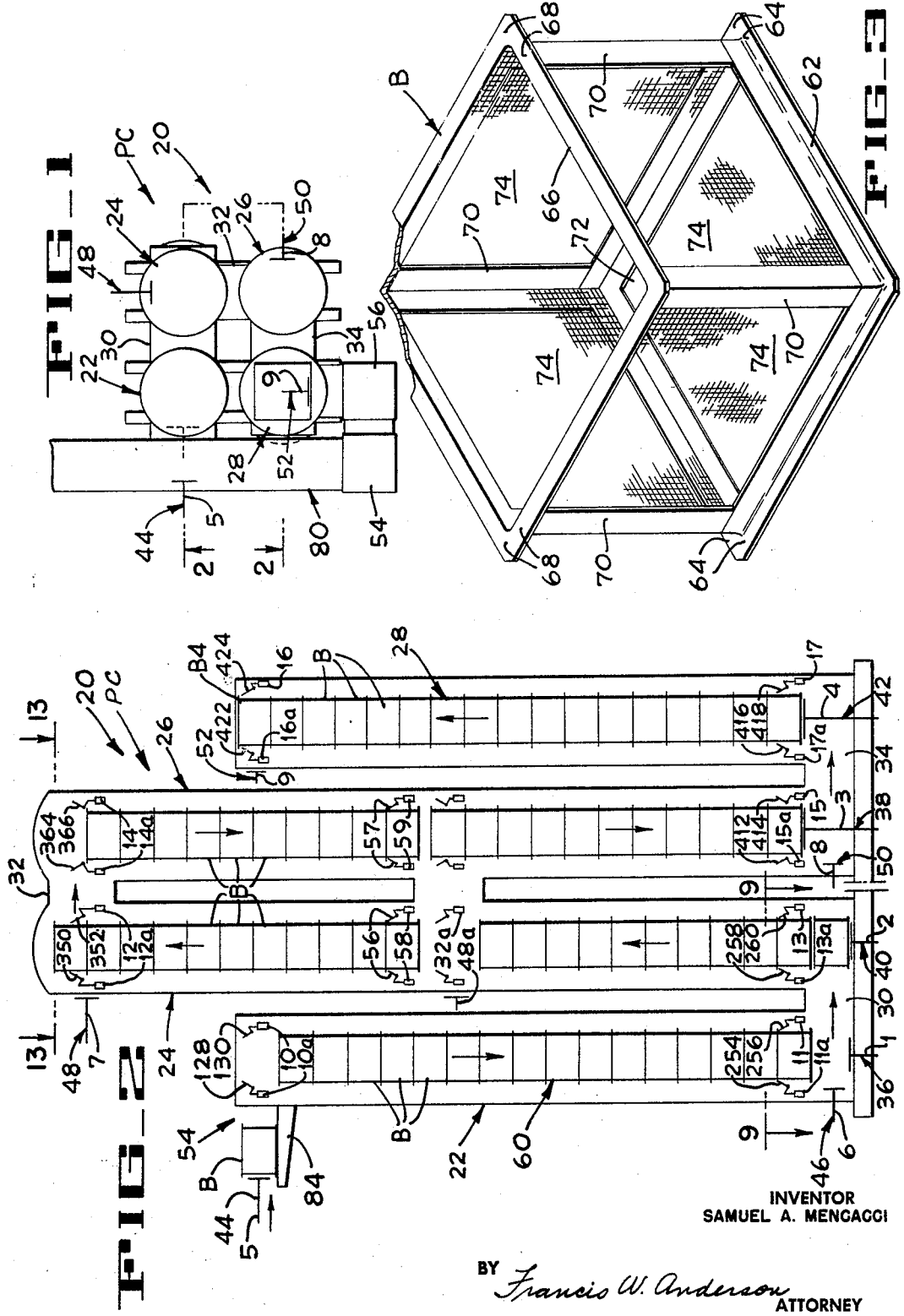

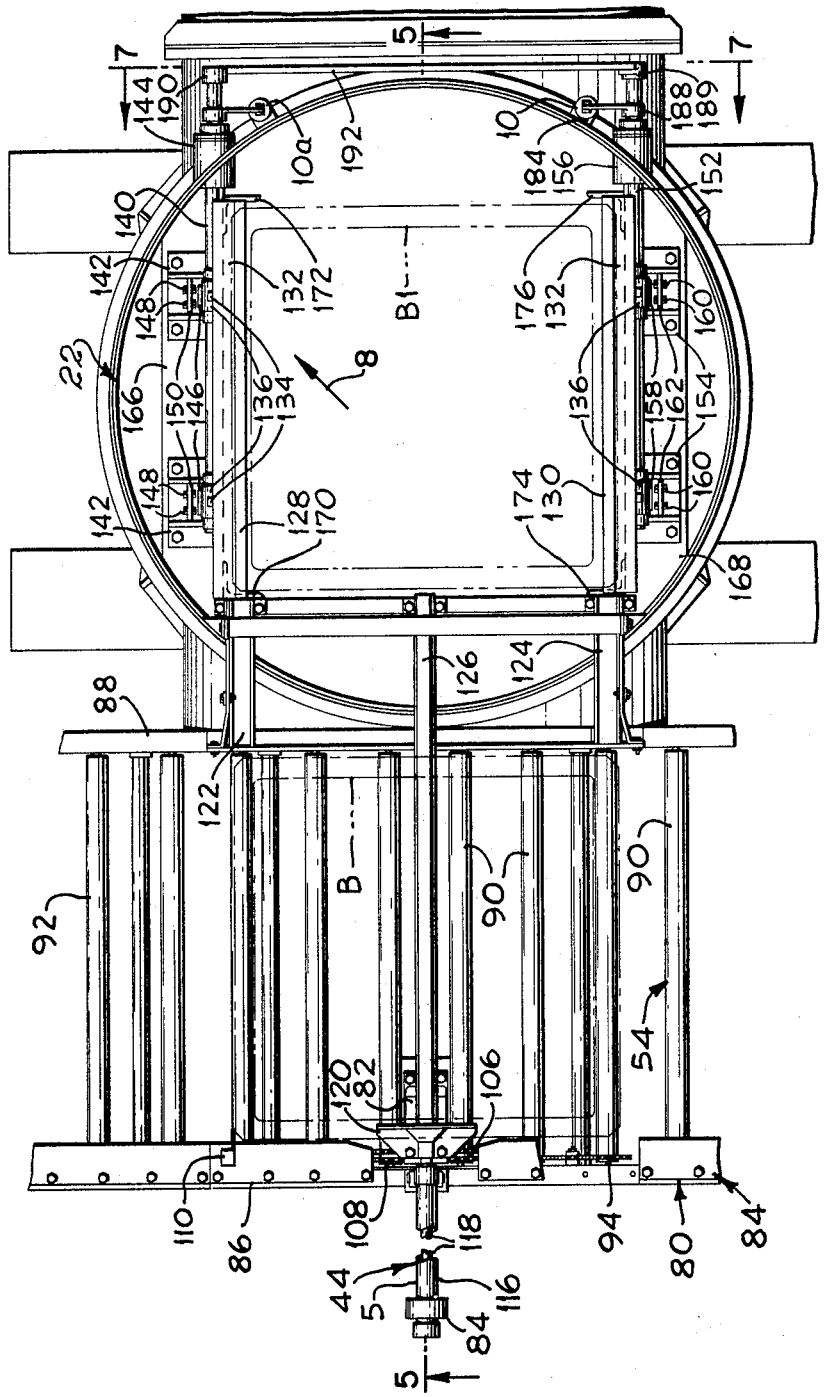

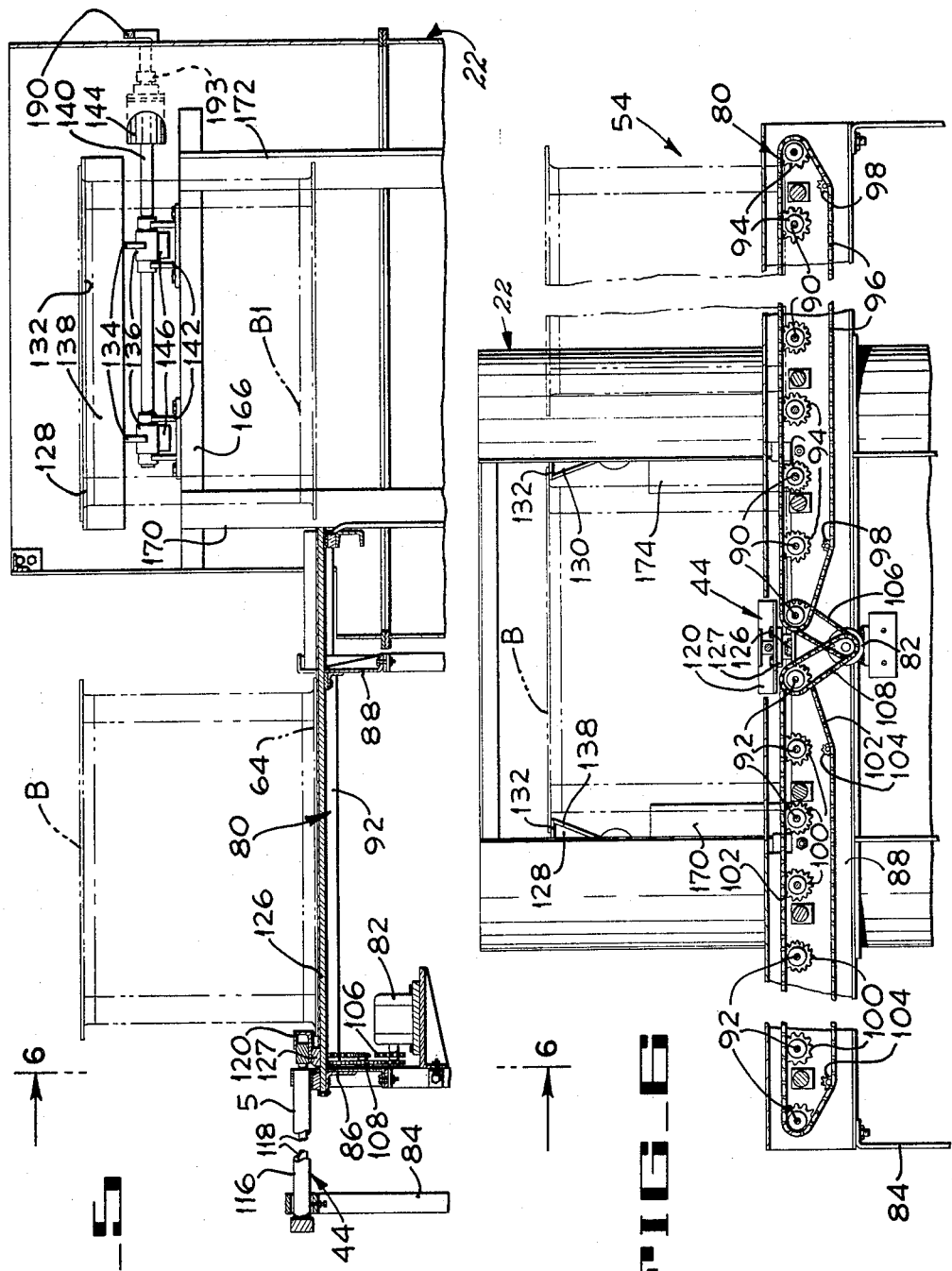

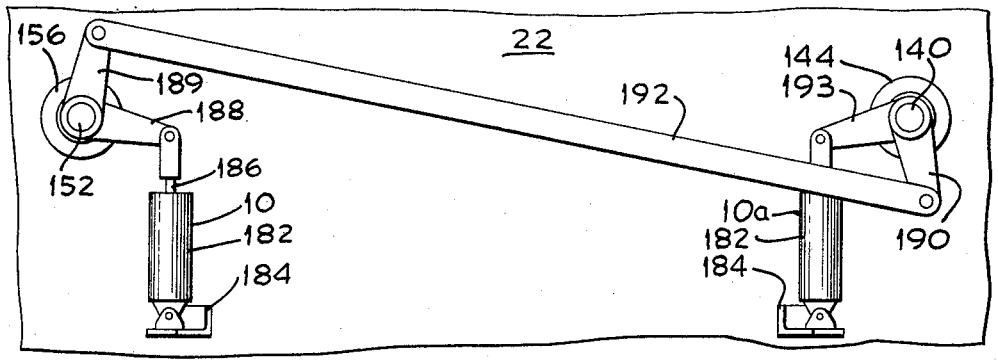
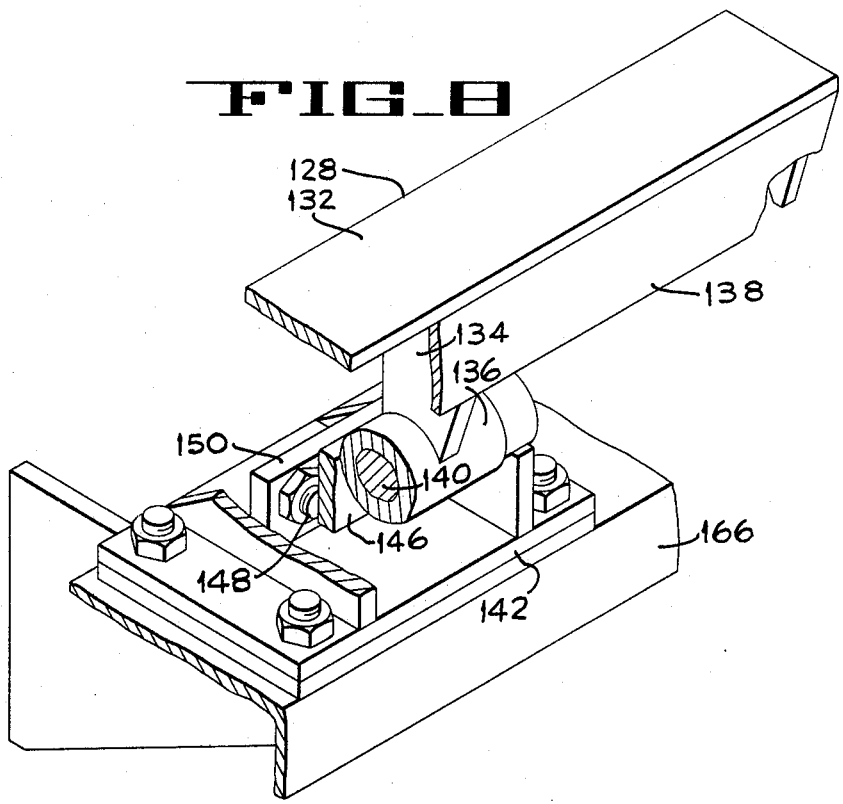

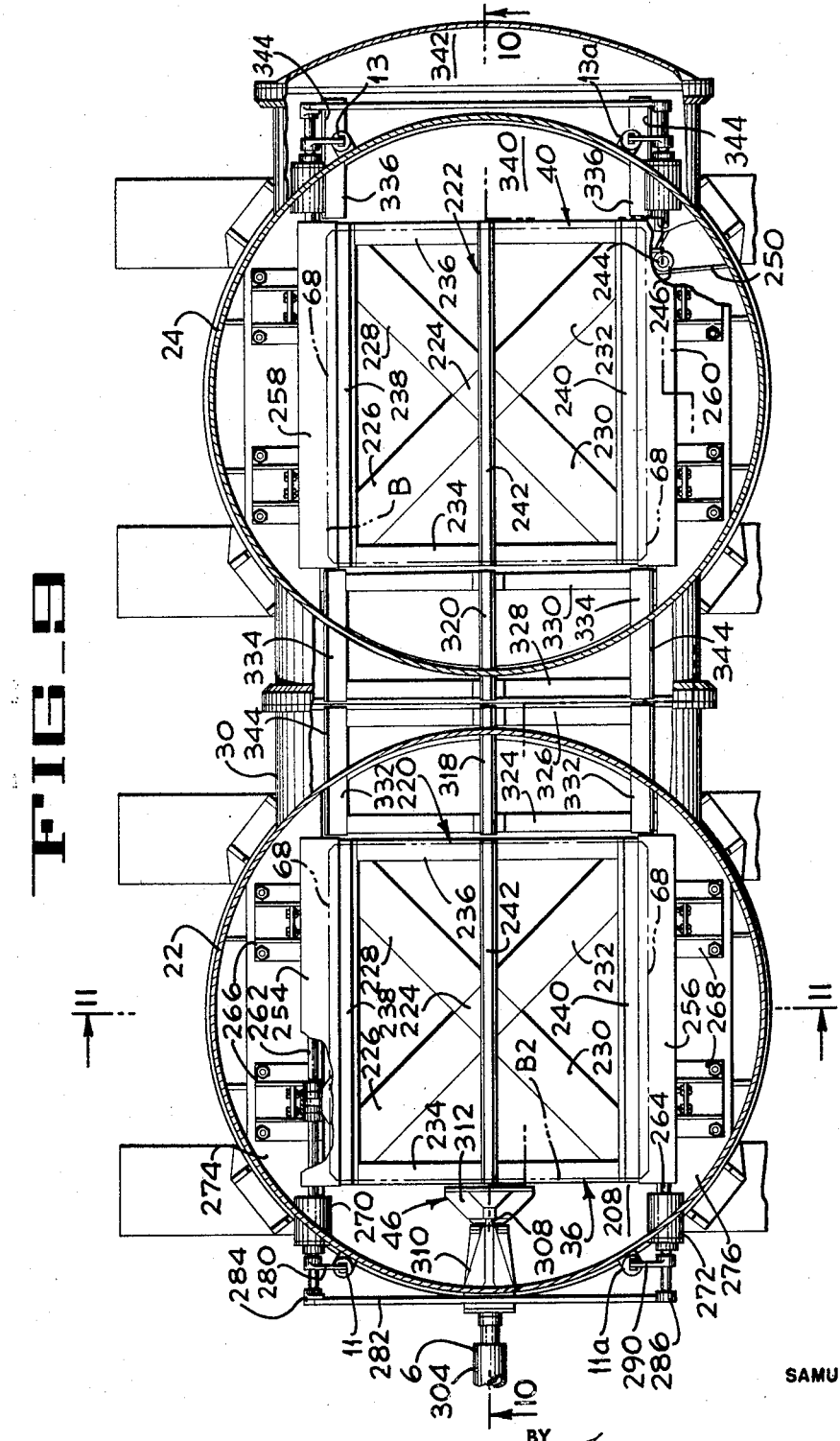

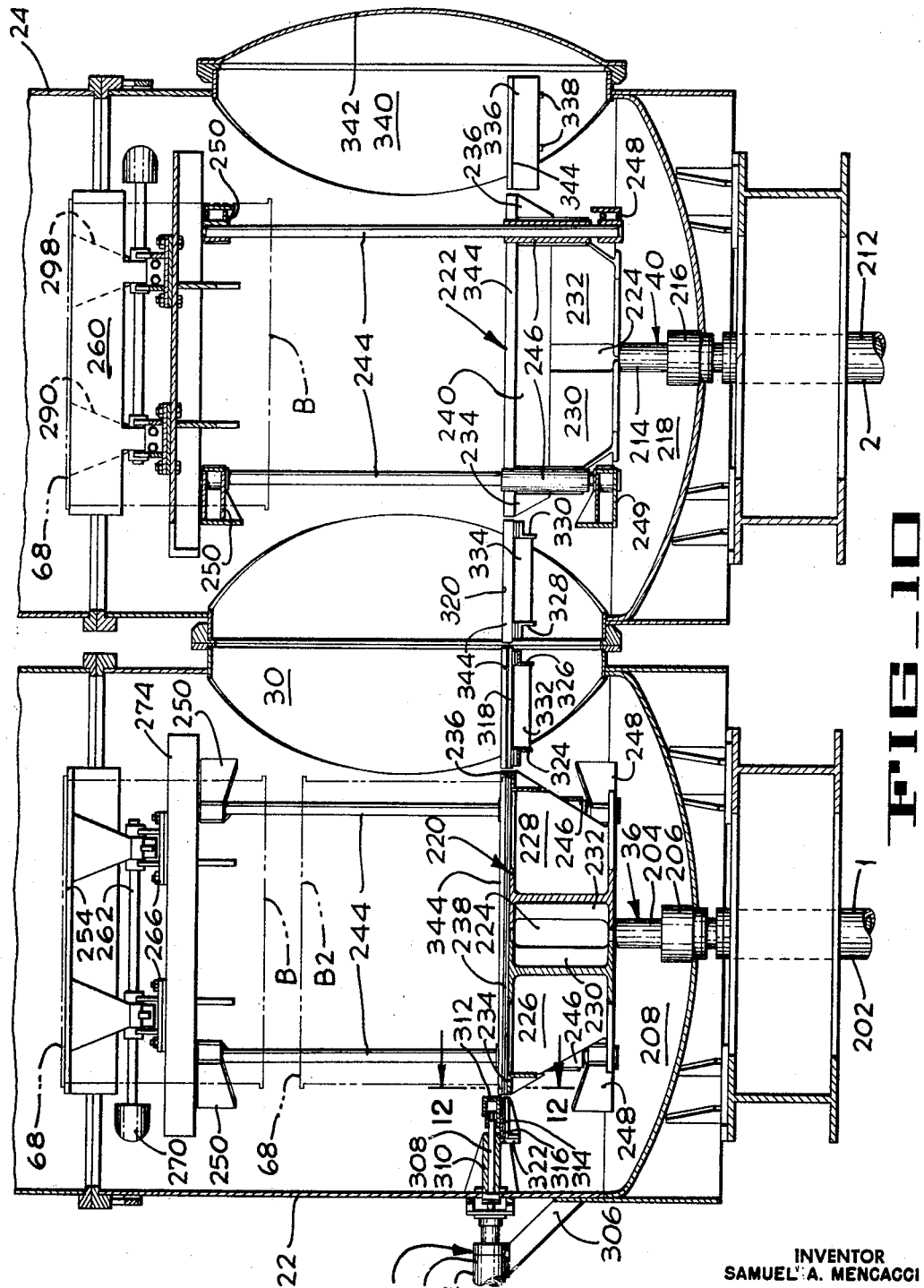

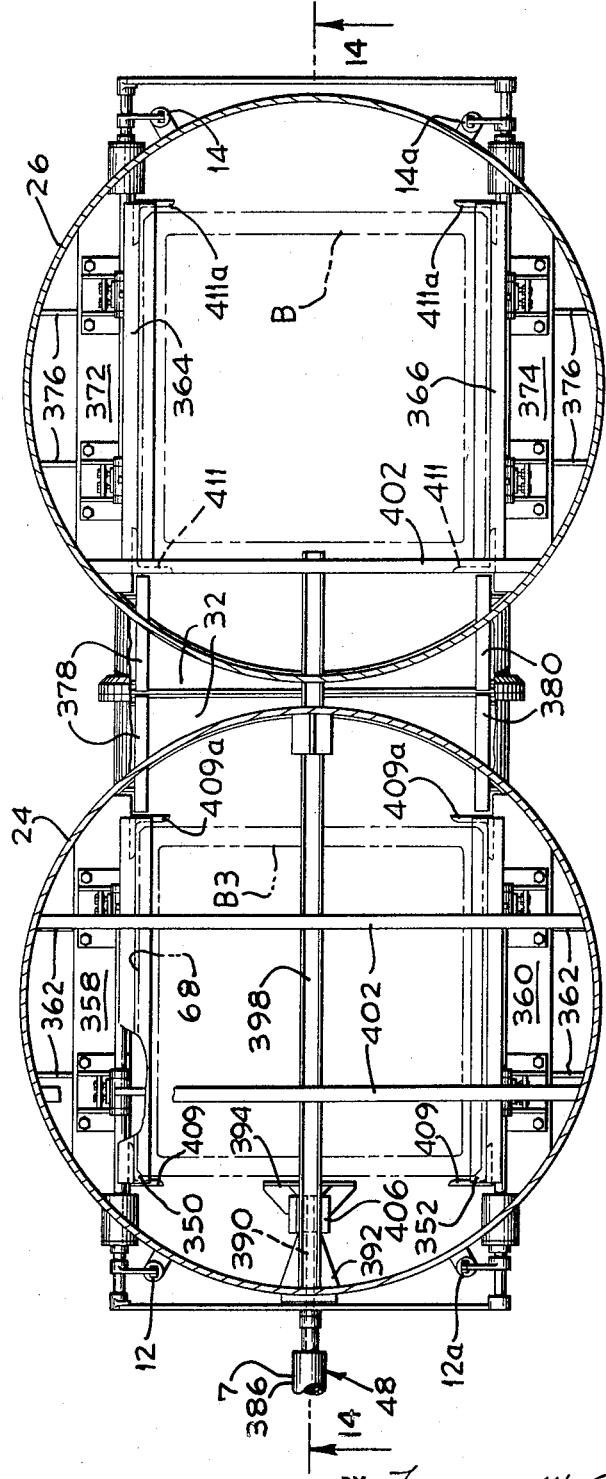

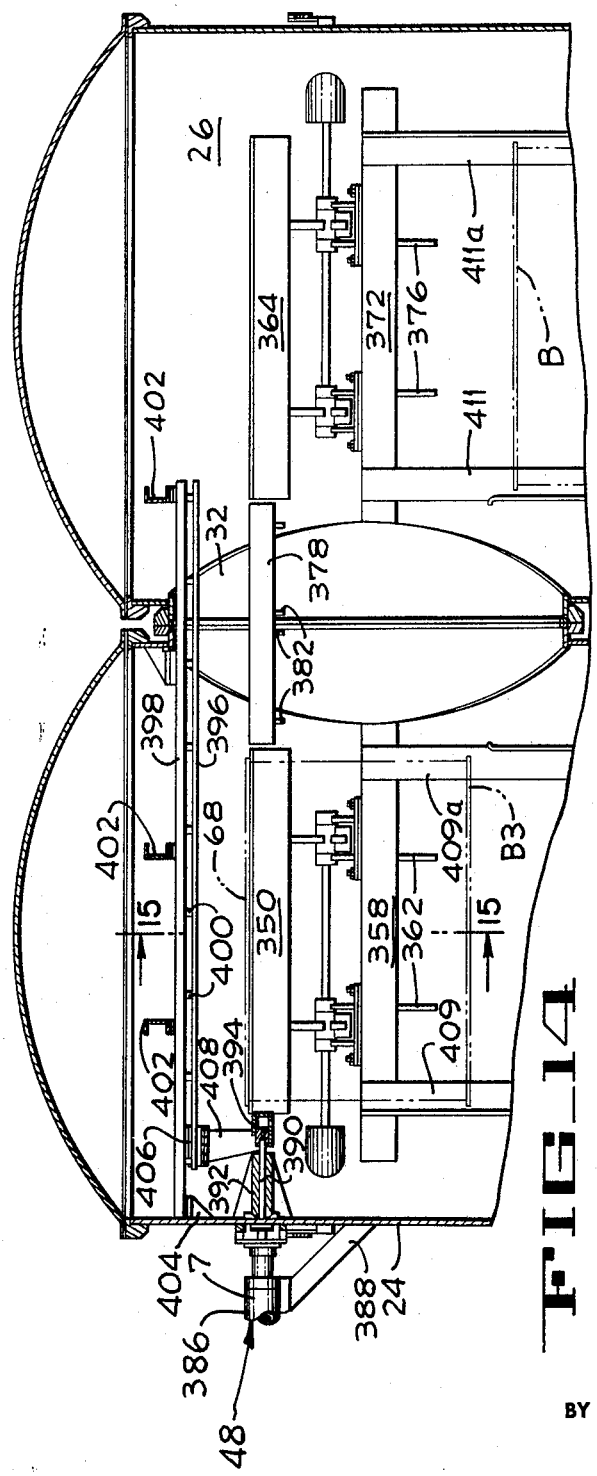
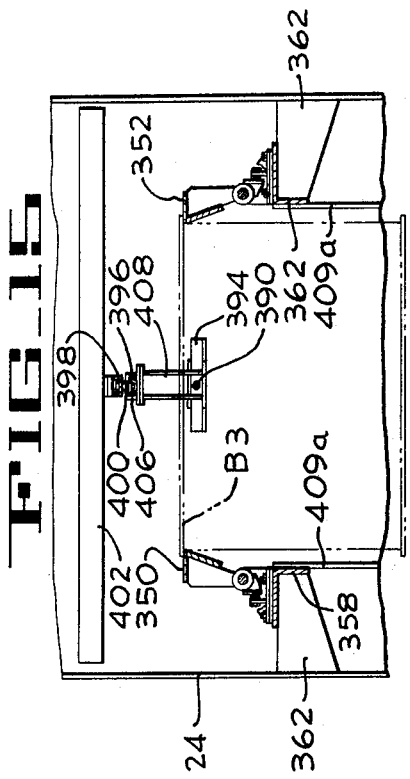

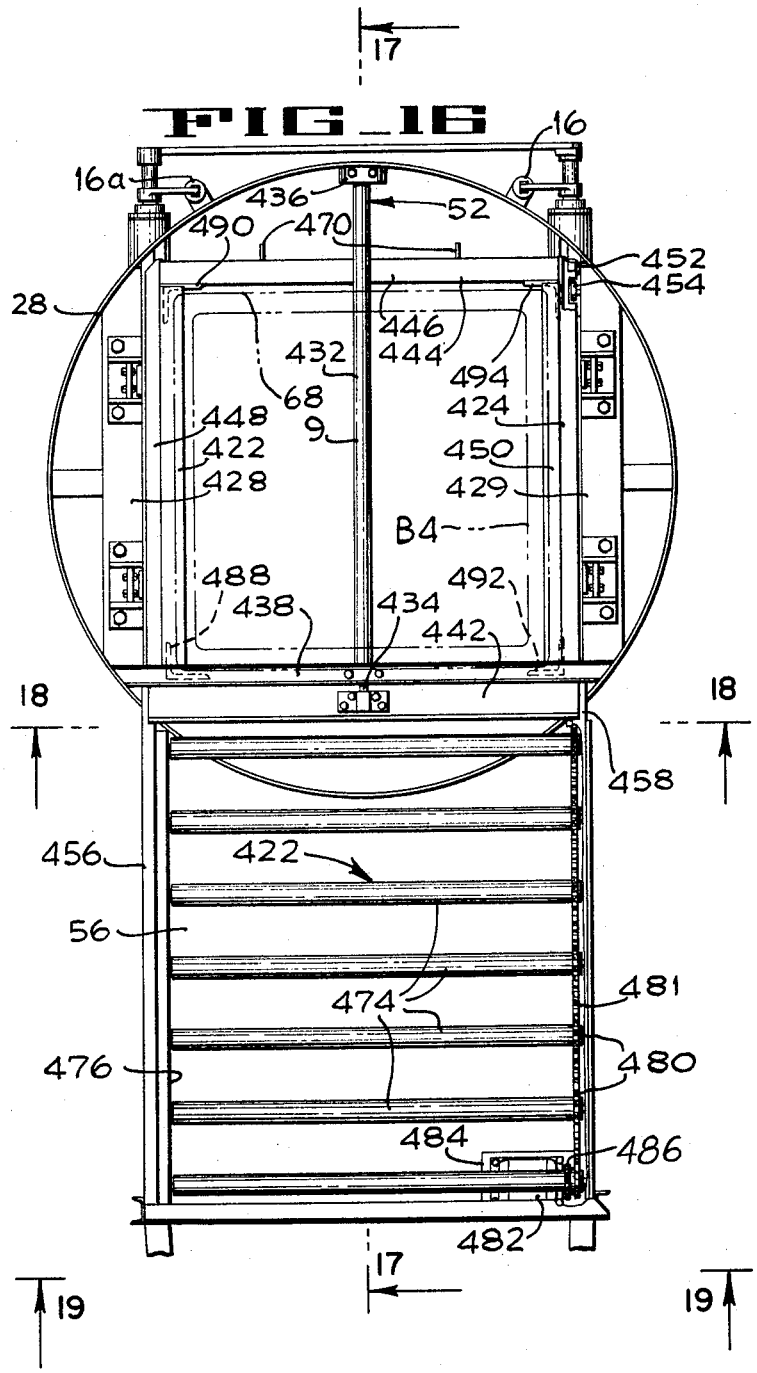

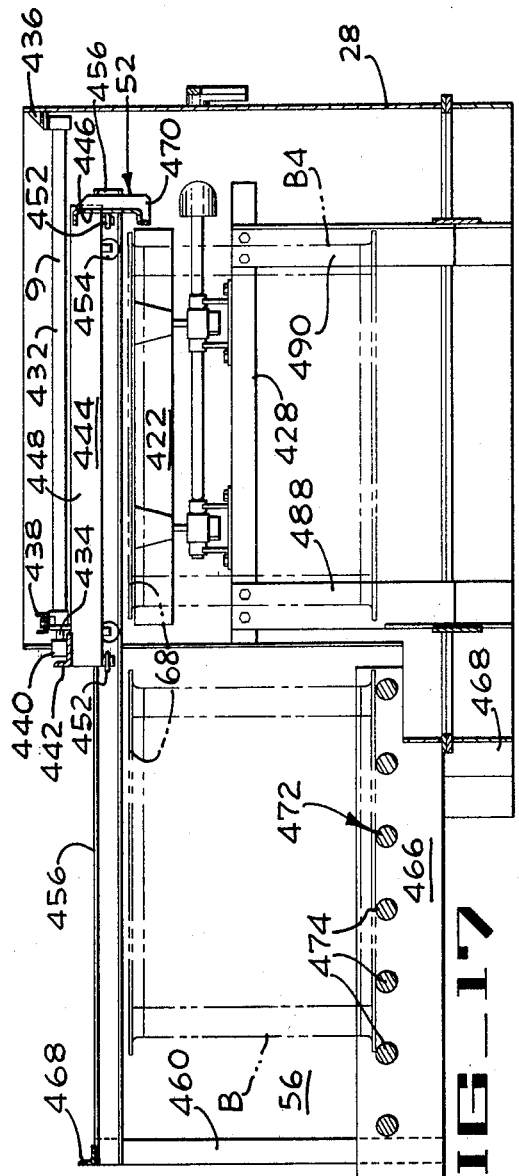
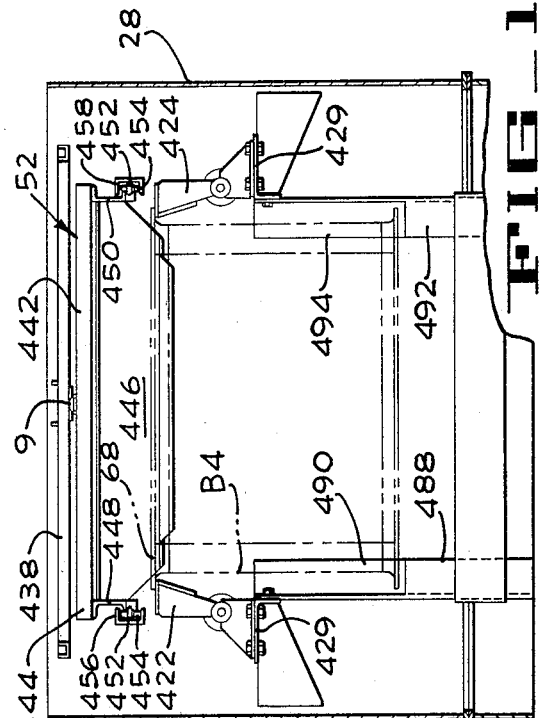
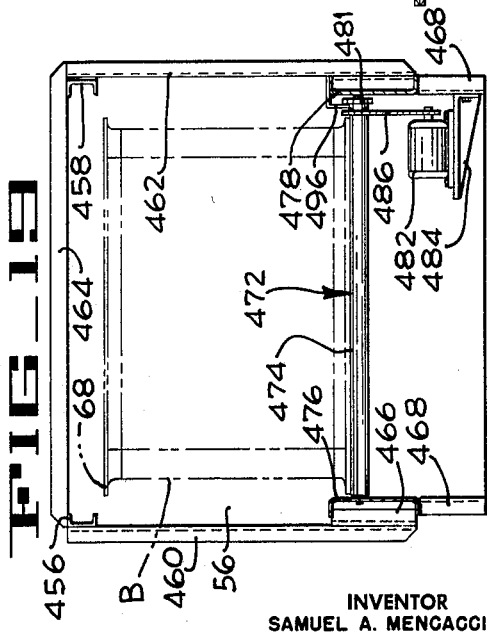

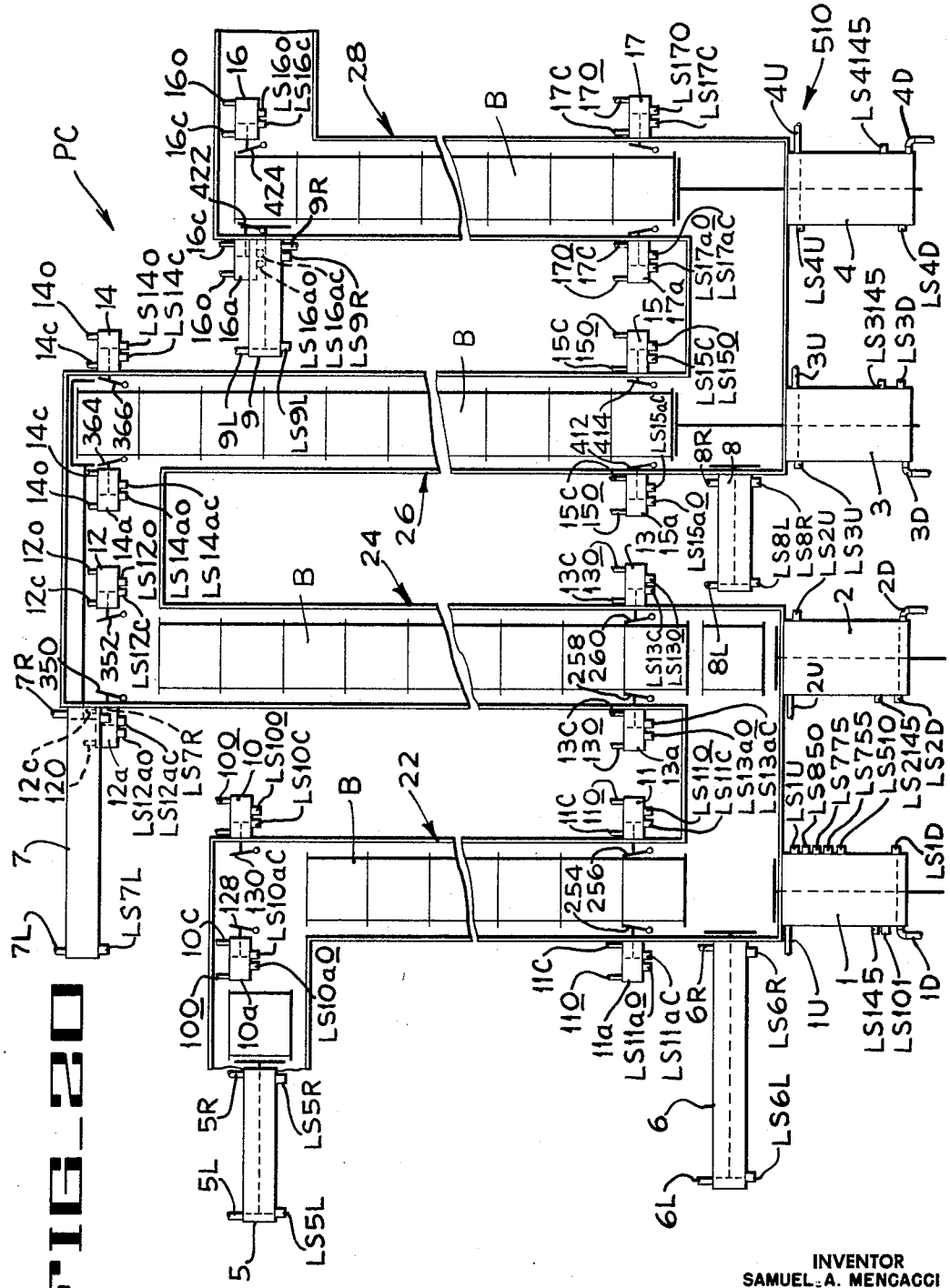

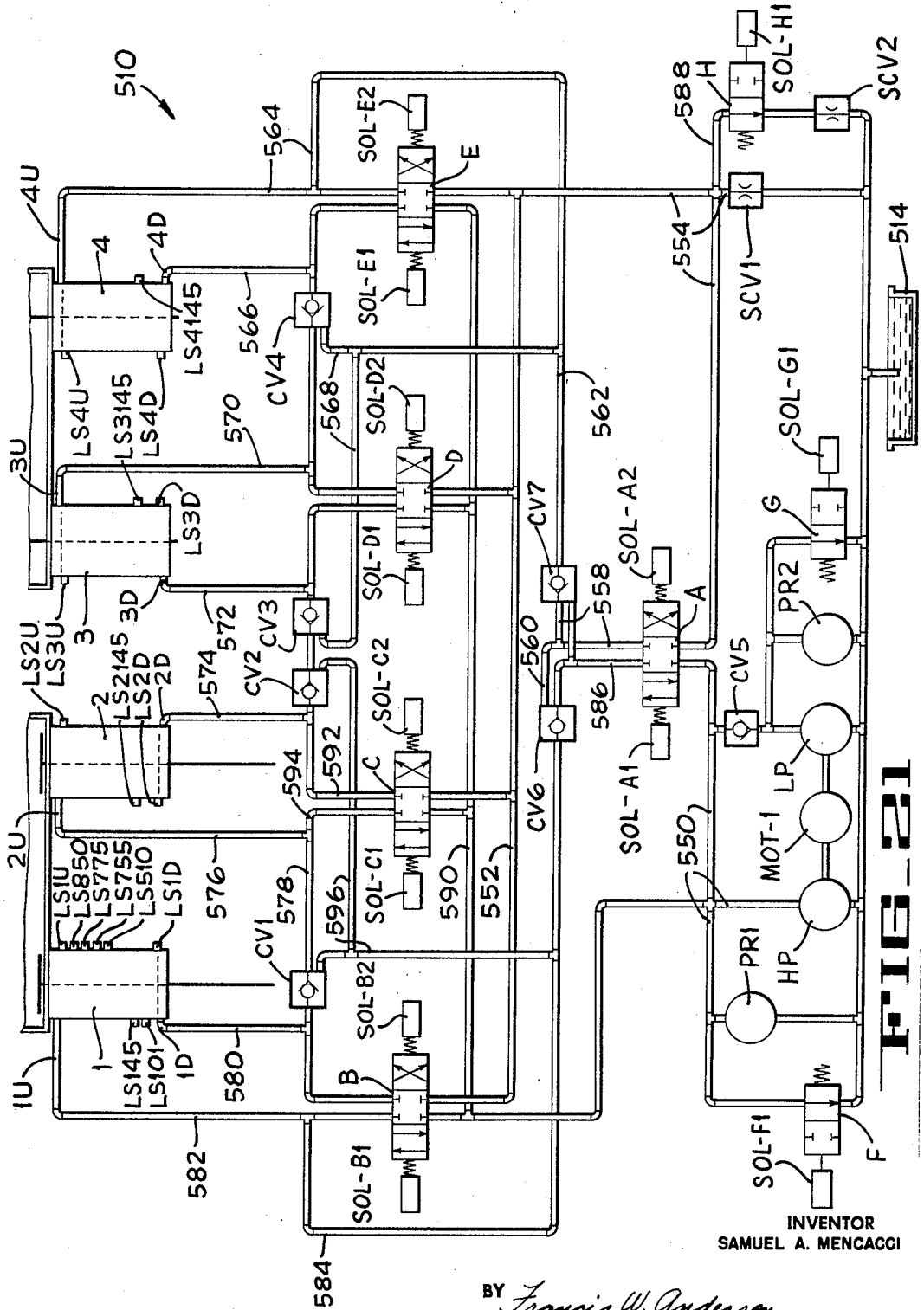

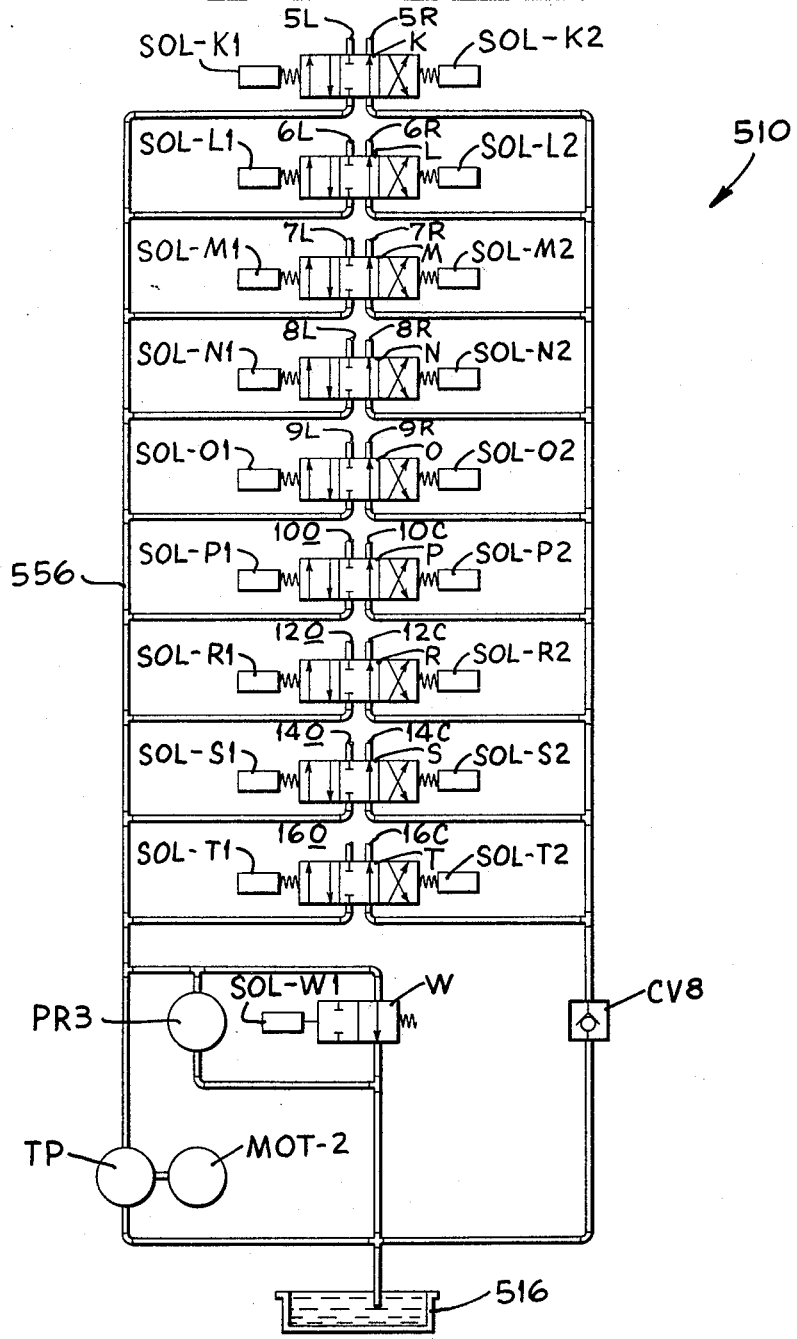

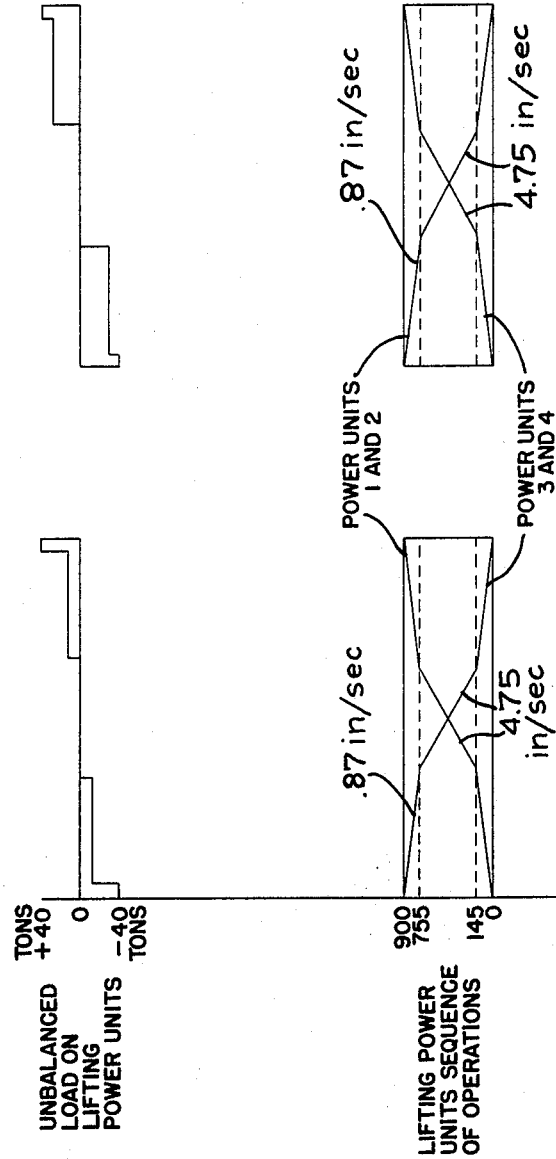
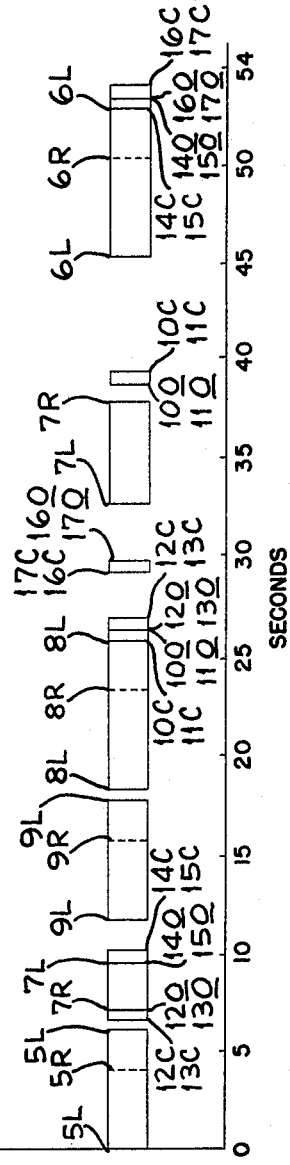

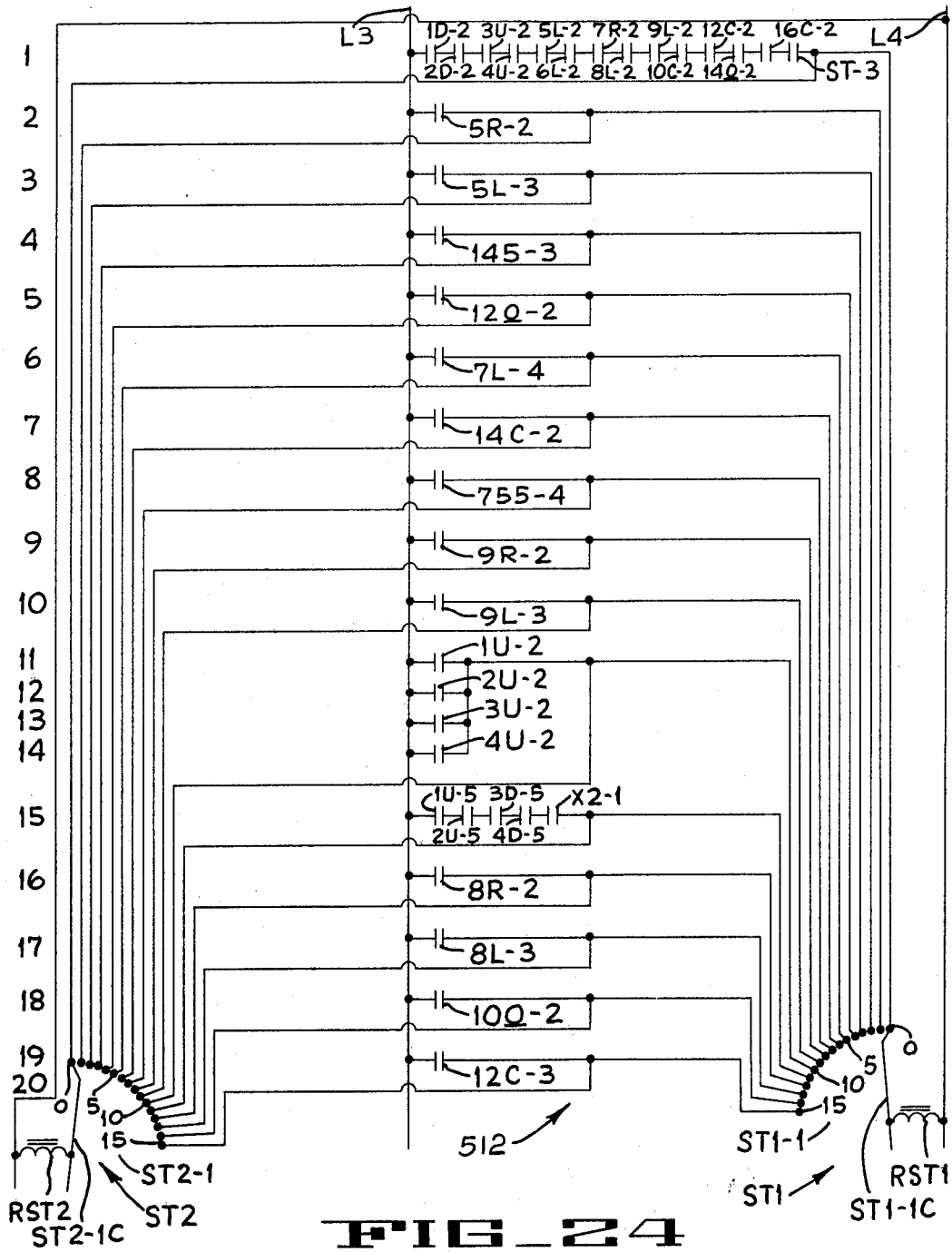
FIG_24

Nov. 18, 1969     S. A. MENCACCI     3,478,677
PRESSURE COOKER
Filed Aug. 8, 1966     28 Sheets-Sheet 18
FIG_26
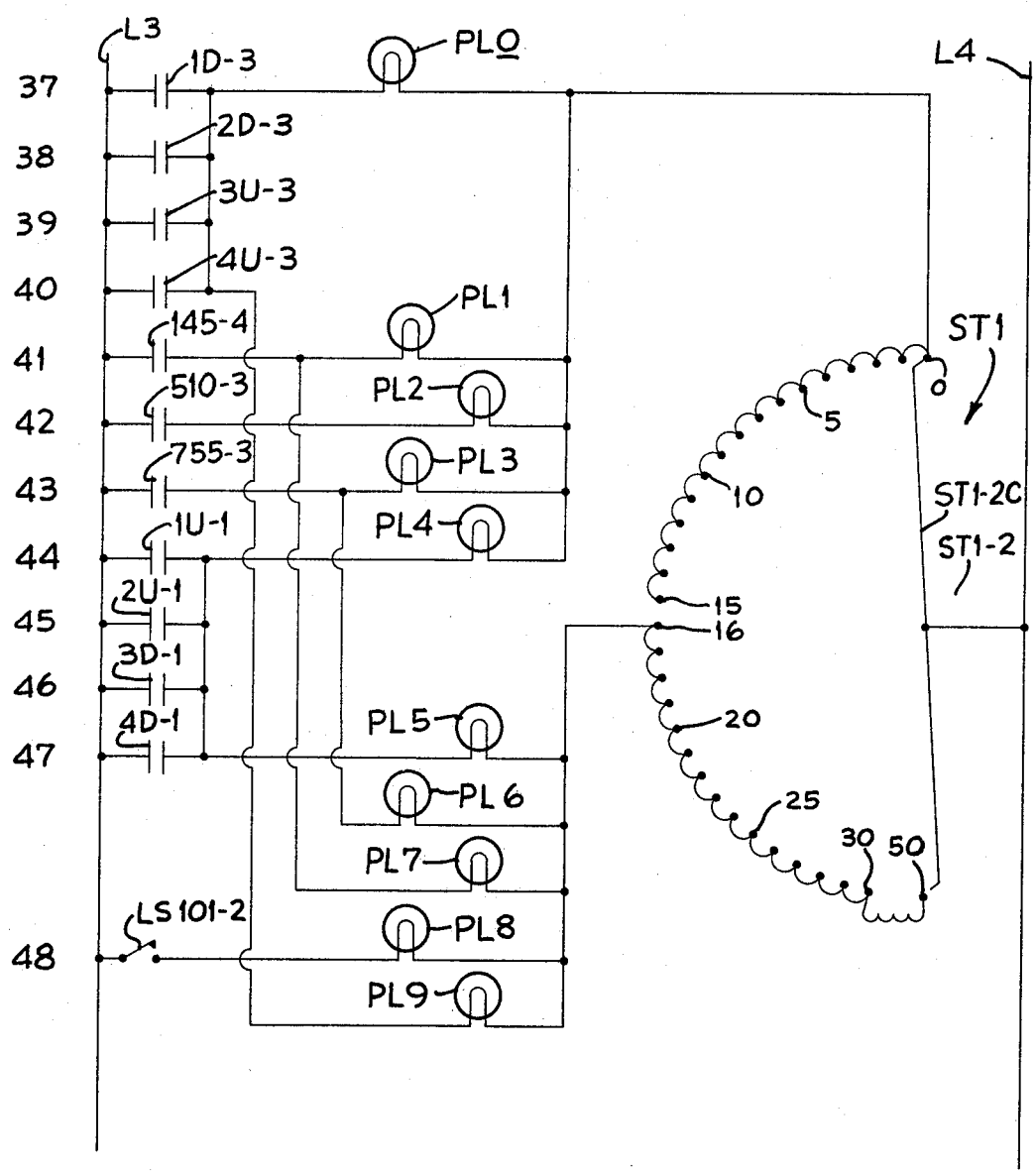
INVENTOR
SAMUEL A. MENCACCI
BY Francis W. Anderson
ATTORNEY

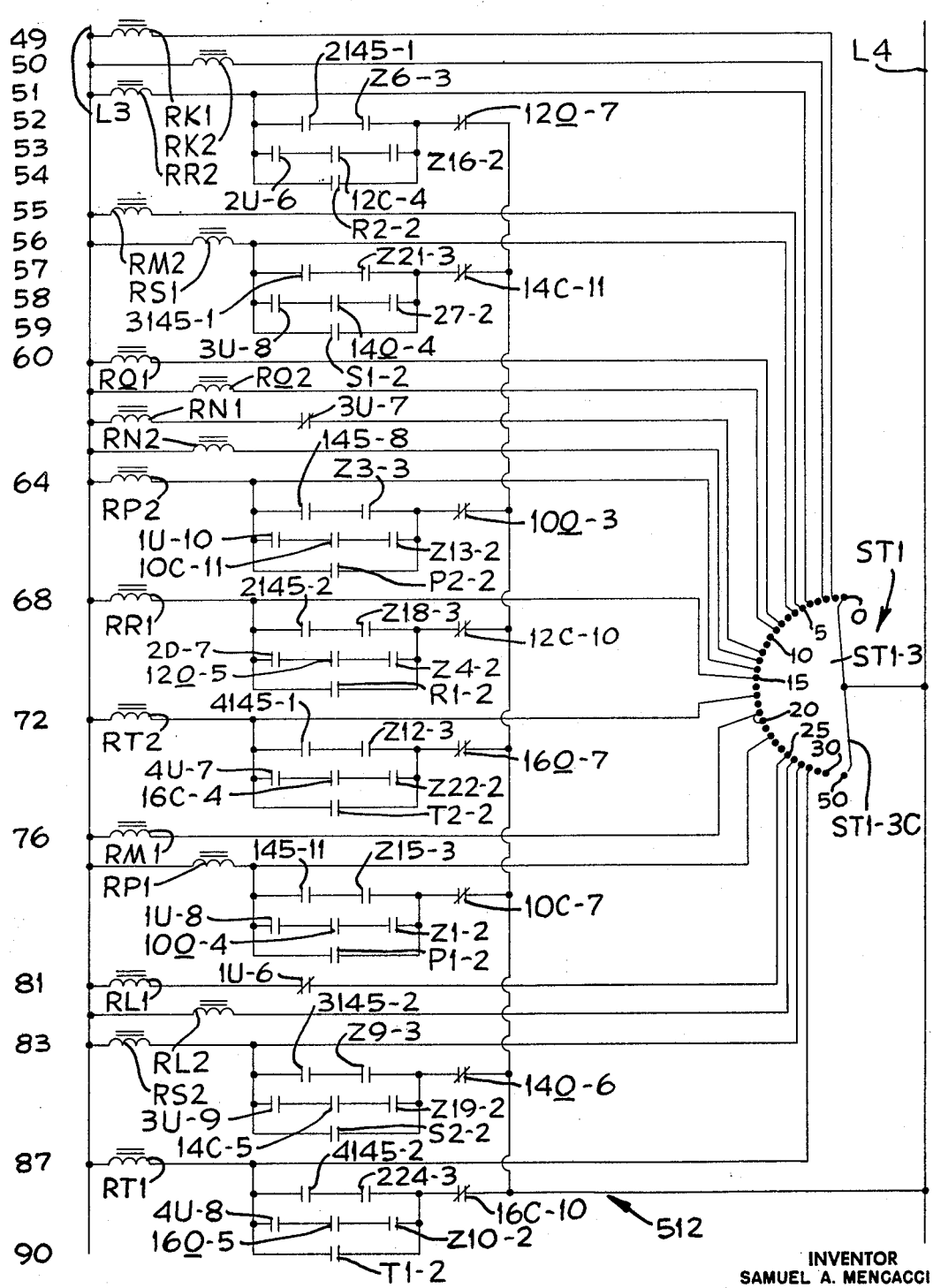
FIG_27

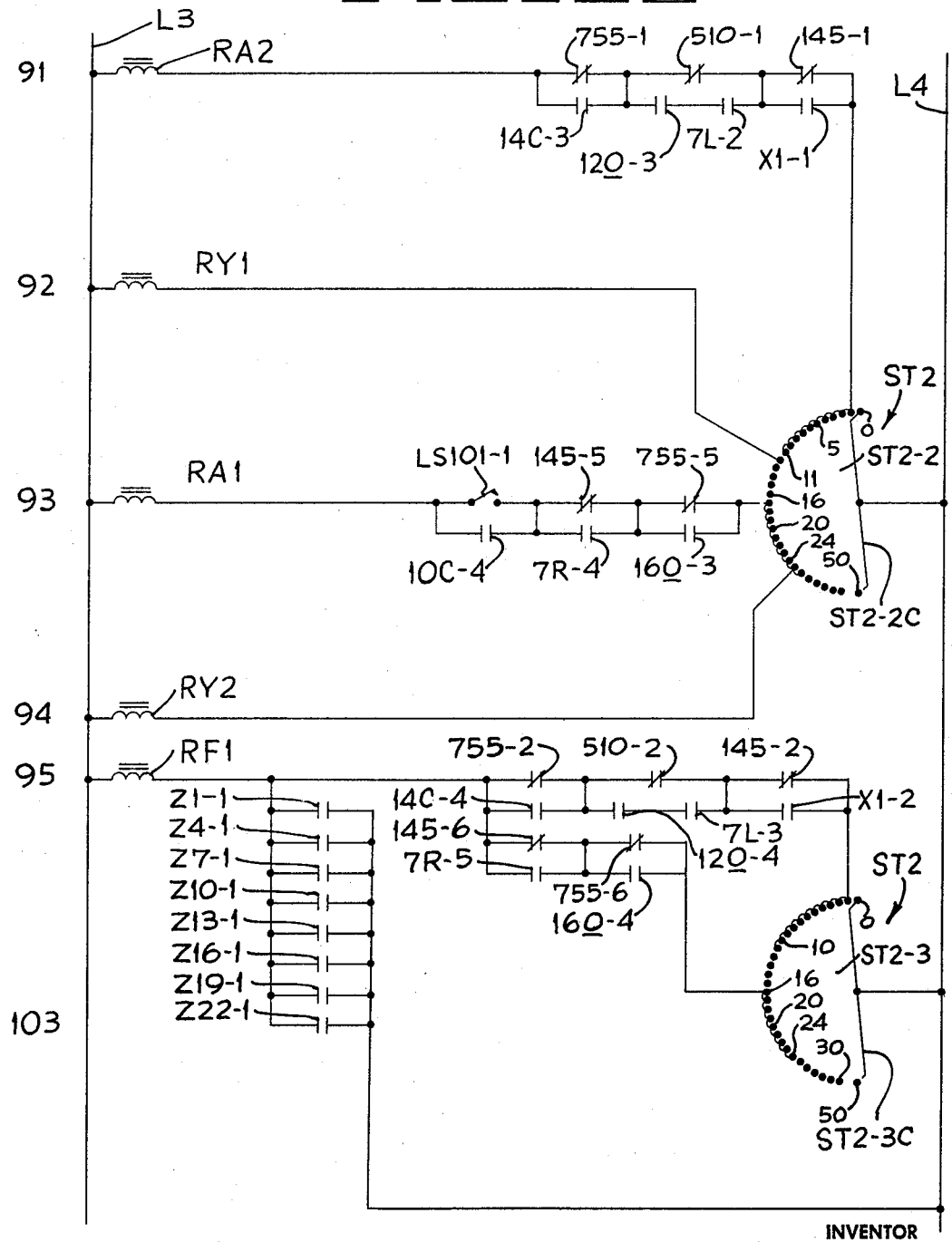

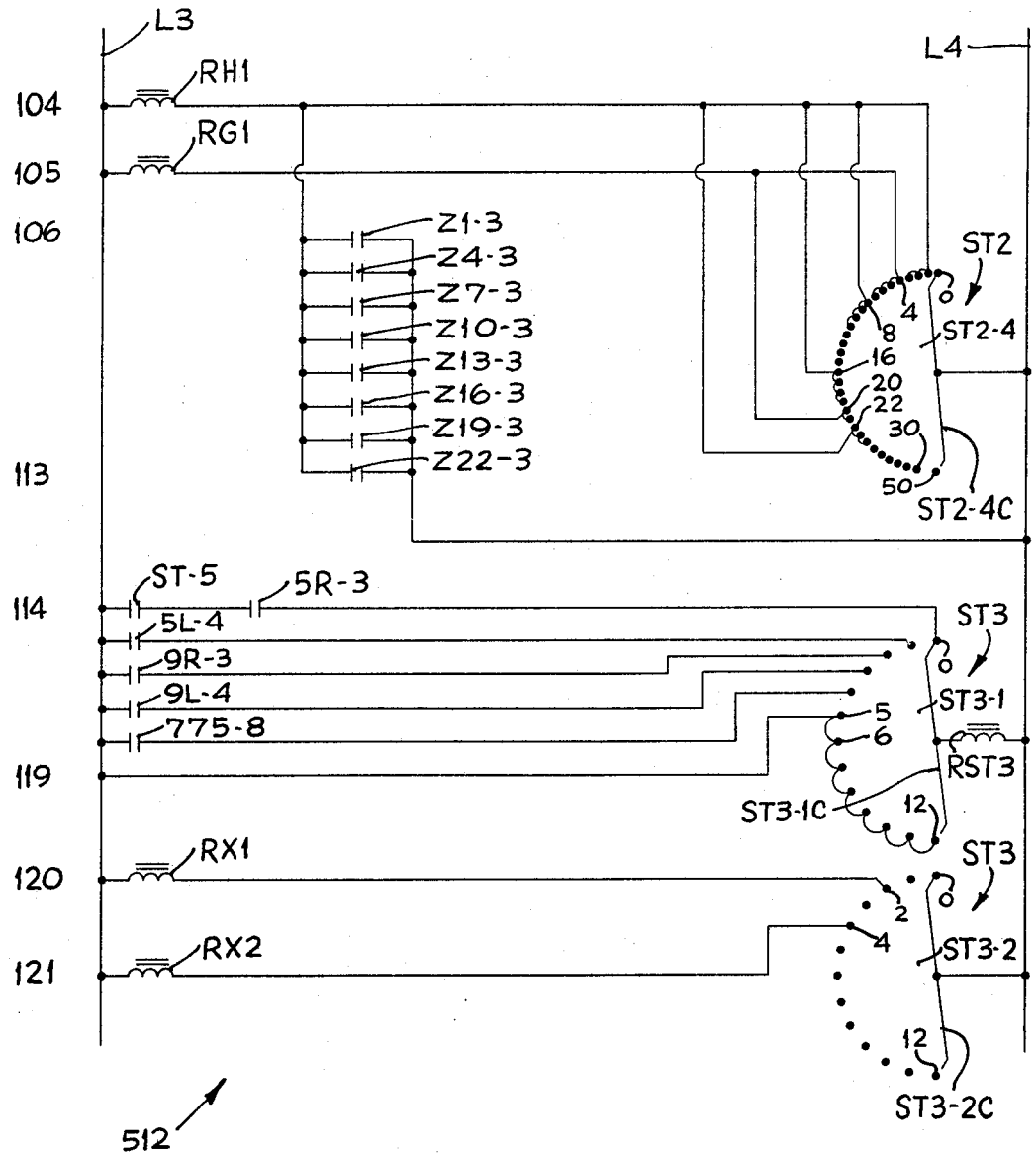

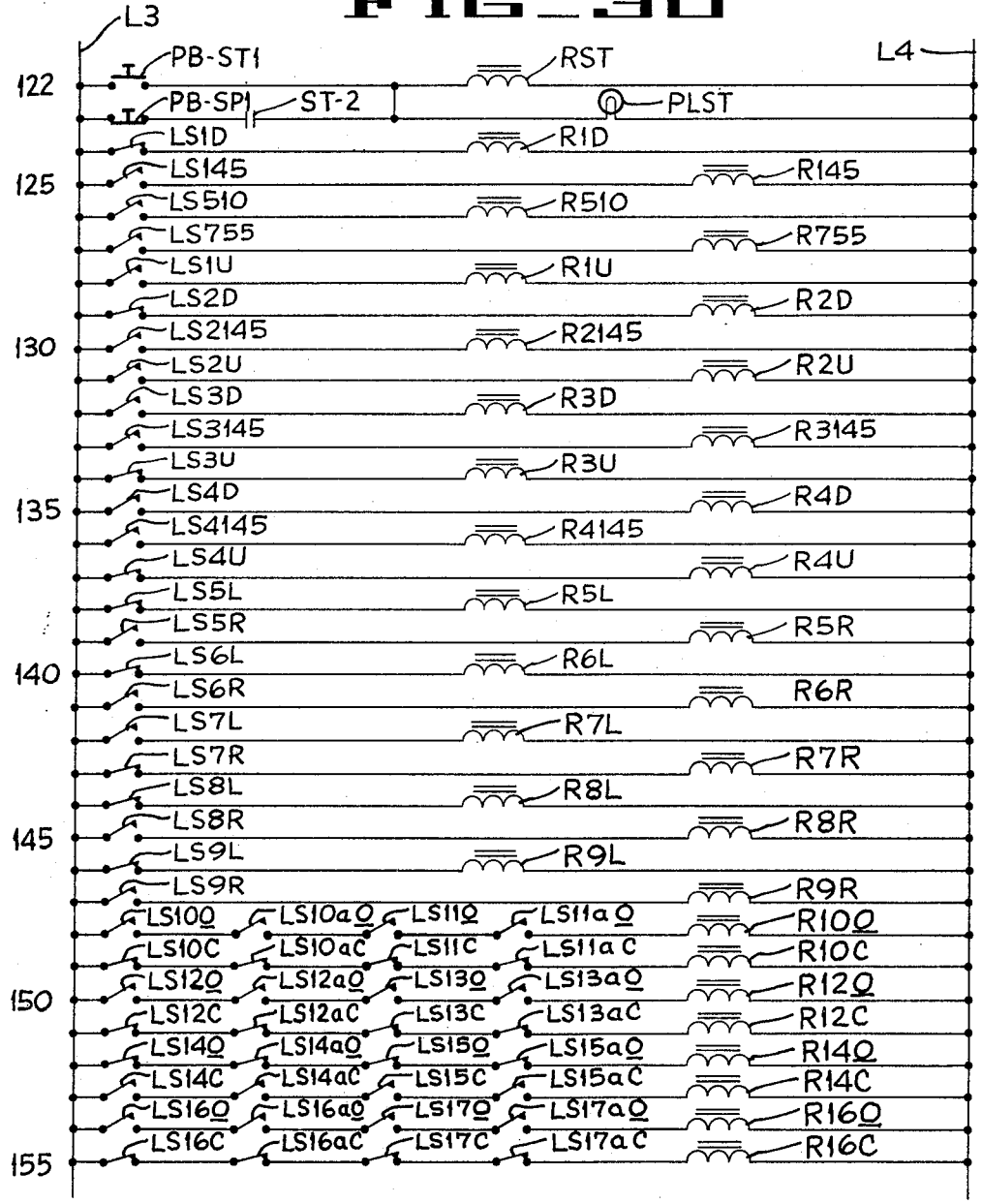

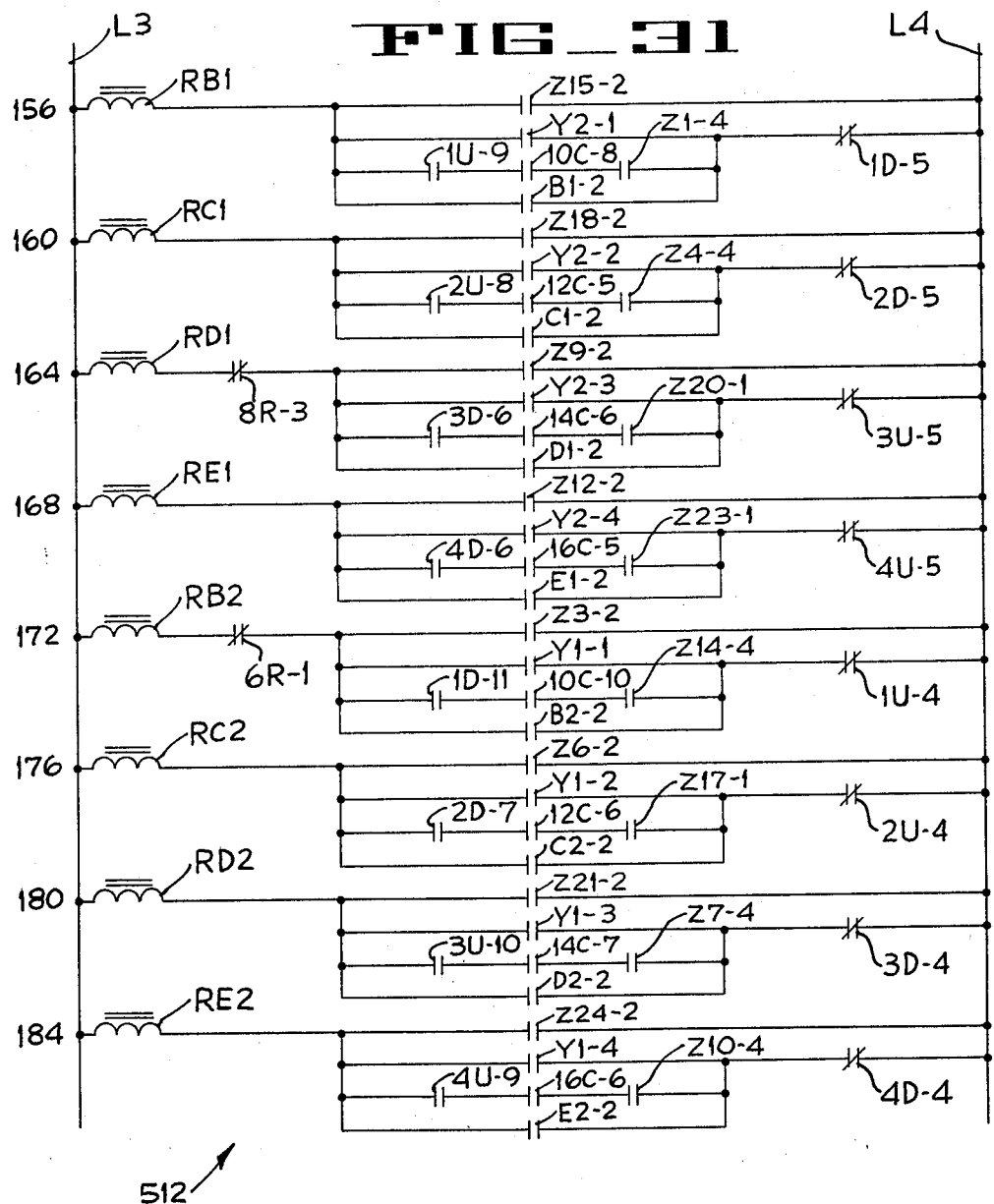

Nov. 18, 1969  S. A. MENCACCI  3,478,677
PRESSURE COOKER
Filed Aug. 8, 1966  28 Sheets-Sheet 24
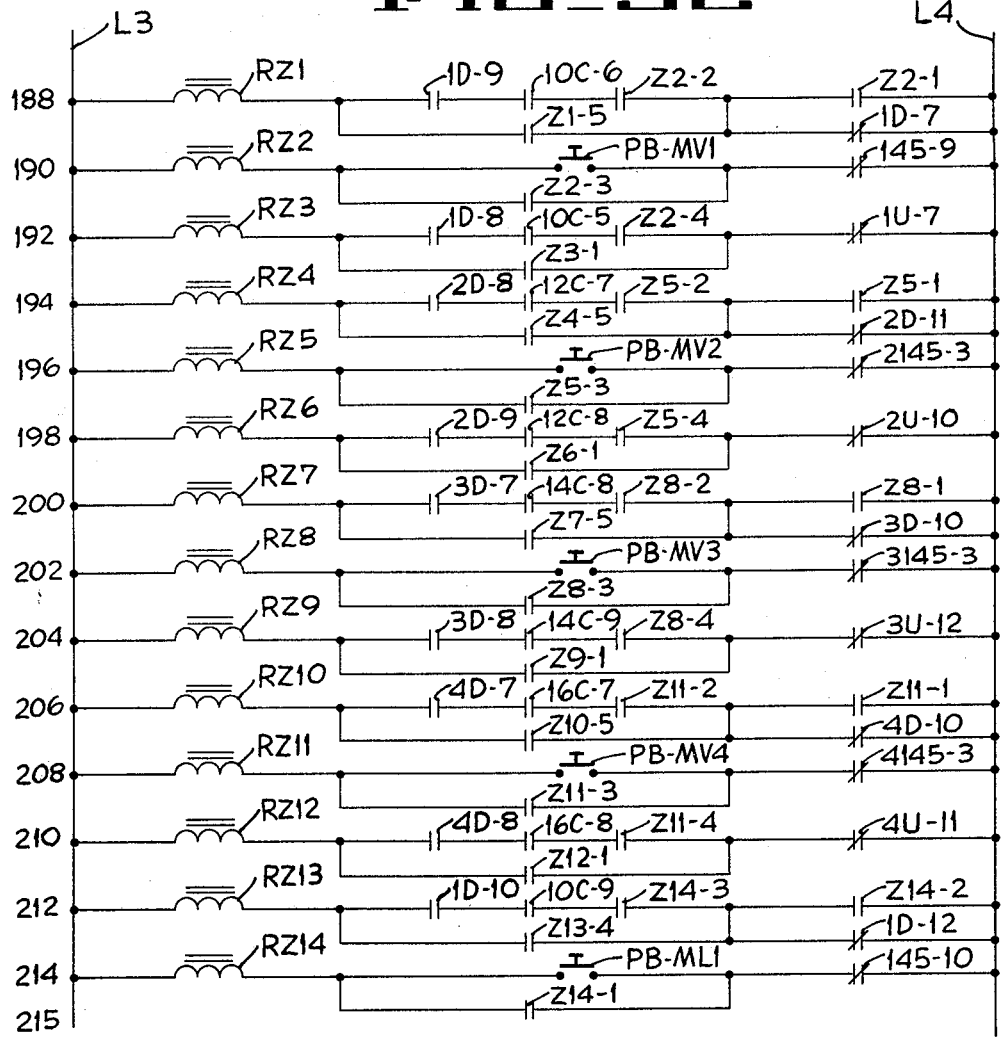
INVENTOR
SAMUEL A. MENCACCI
BY Francis W. Anderson
ATTORNEY

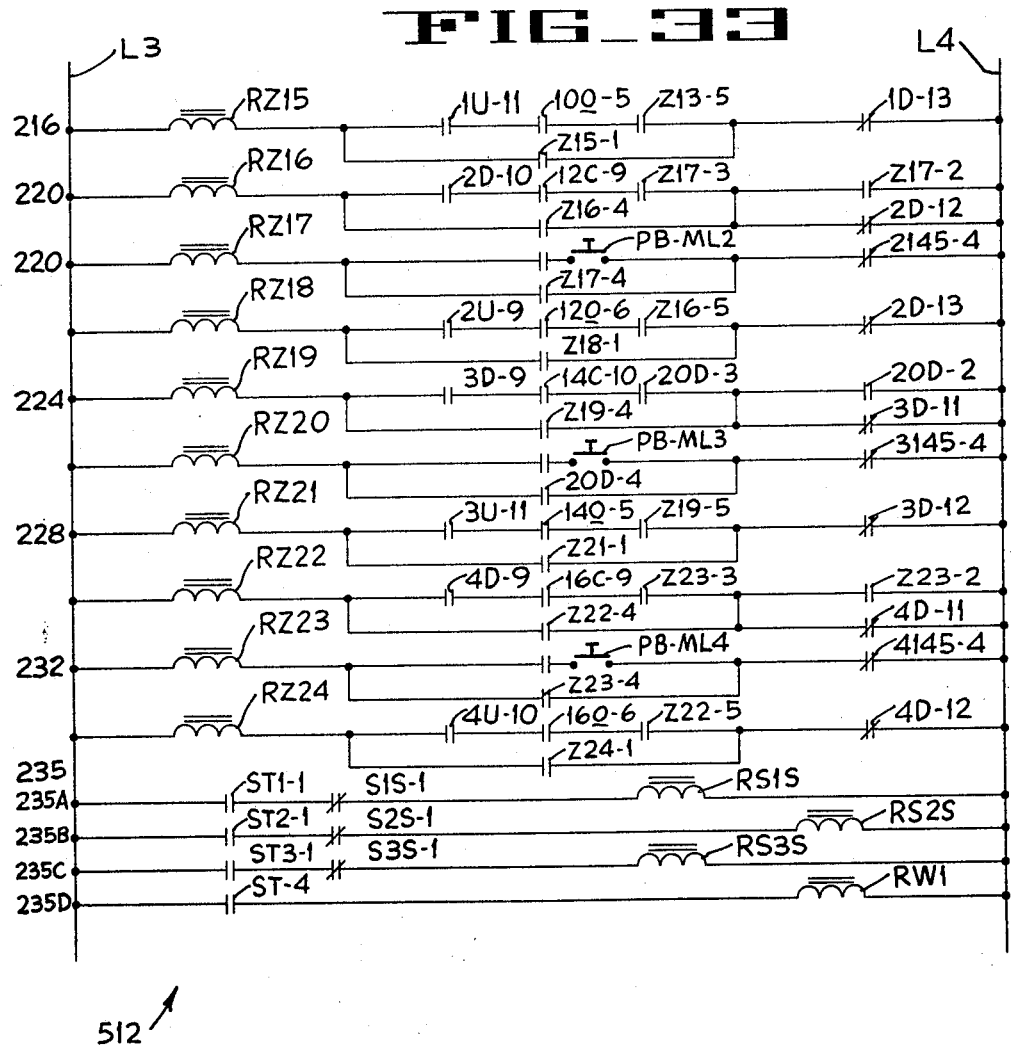

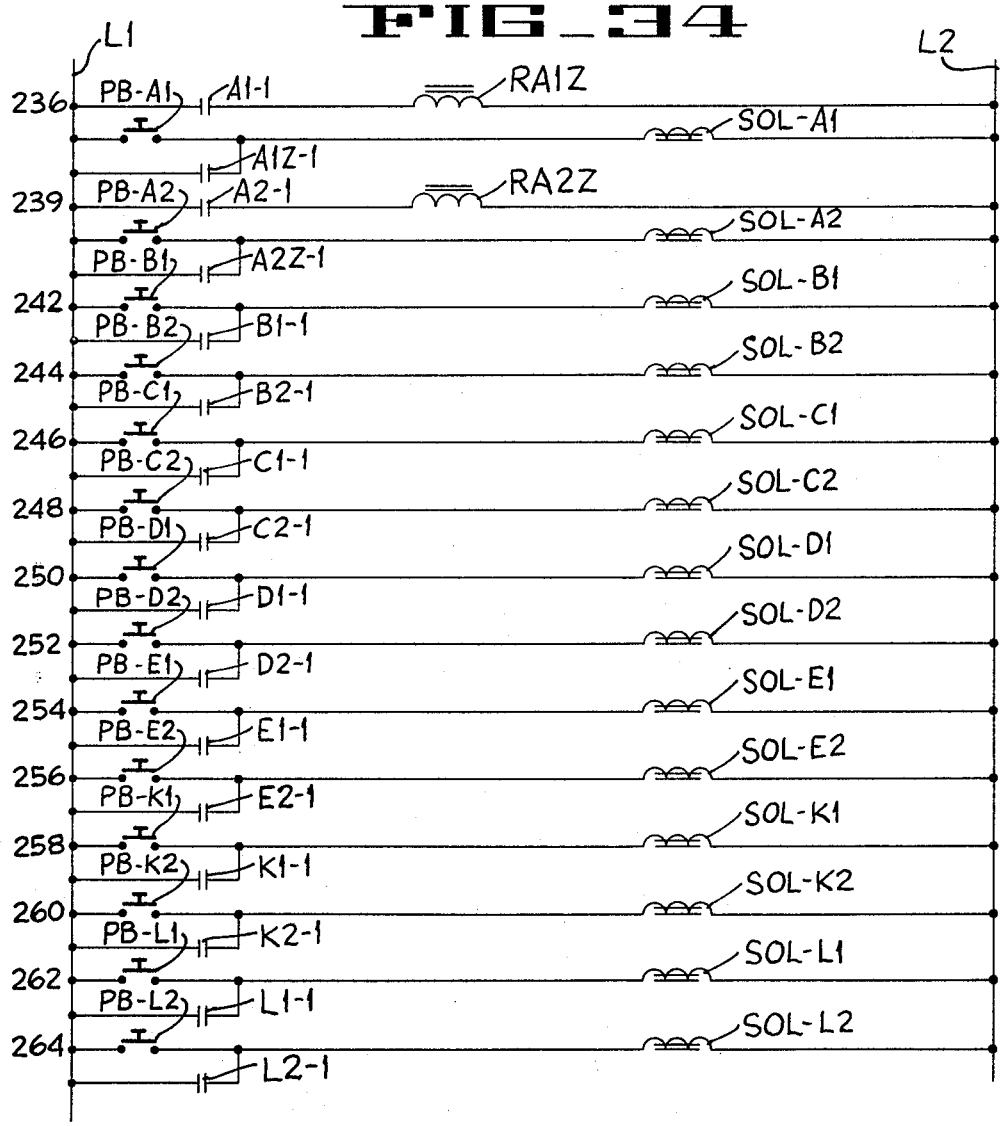

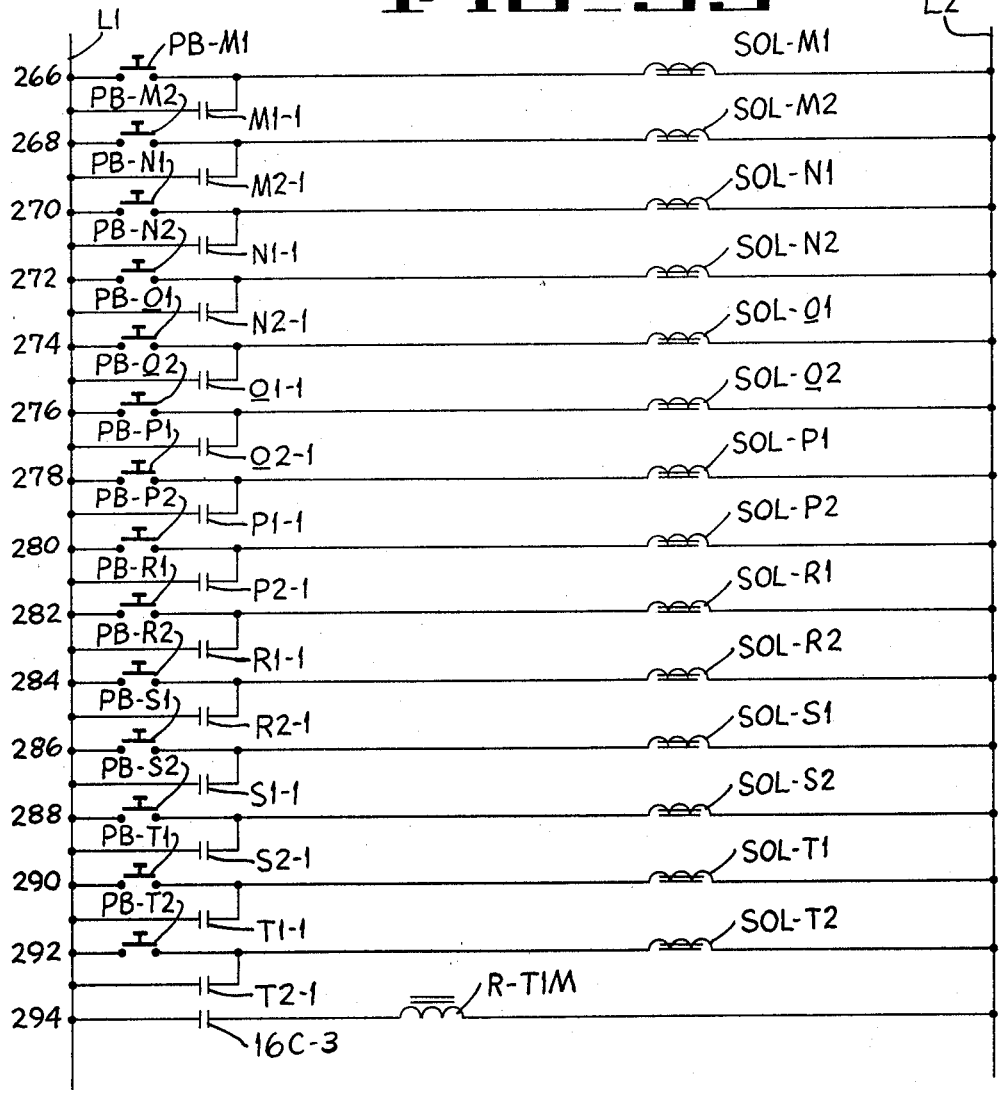
FIG_35

Nov. 18, 1969  S. A. MENCACCI  3,478,677
PRESSURE COOKER
Filed Aug. 8, 1966  28 Sheets-Sheet 28
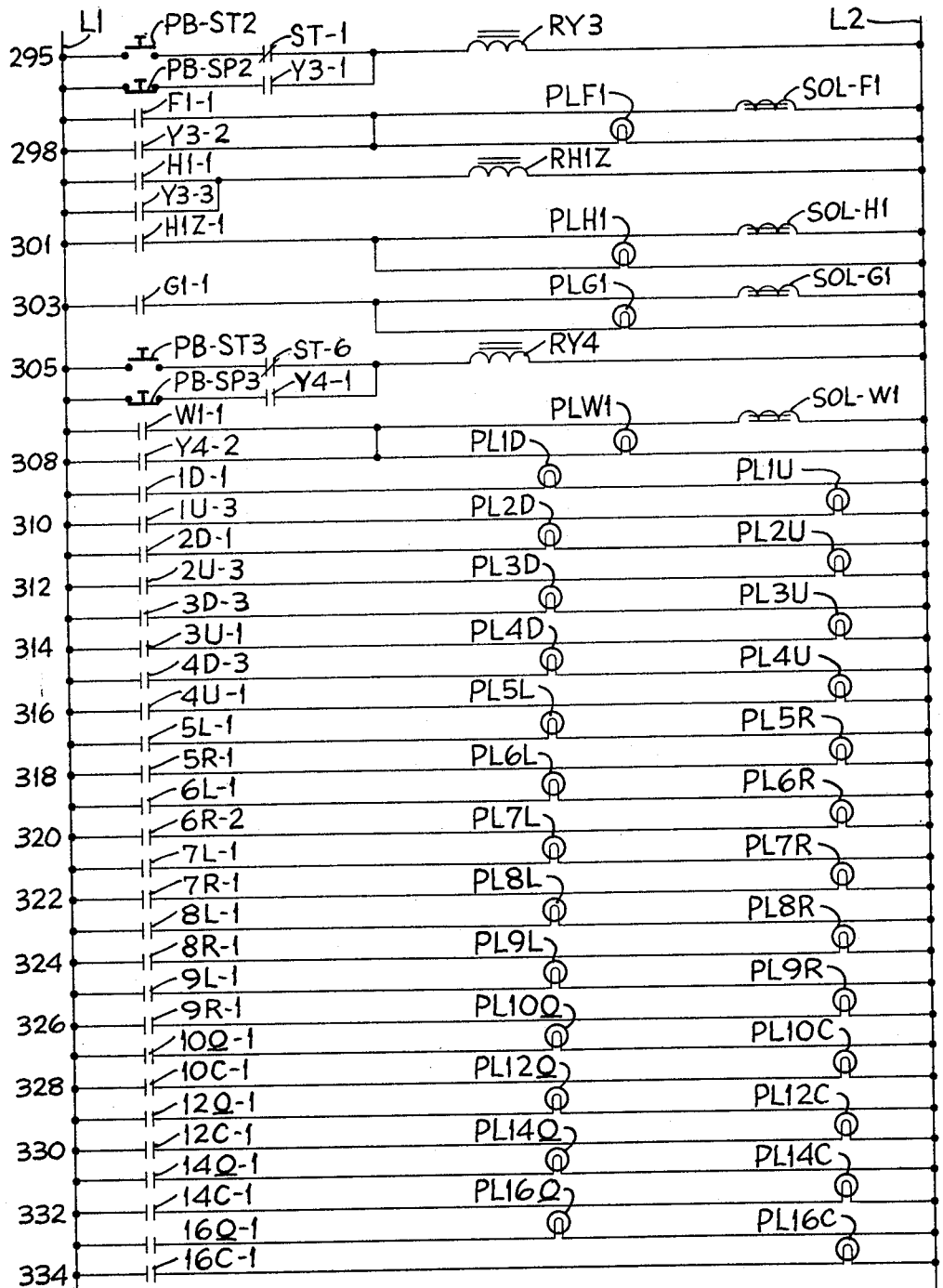
FIG_36
INVENTOR
SAMUEL A. MENCACCI
BY Francis W. Anderson ATTORNEY United States Patent Office
3,478,677
Patented Nov. 18, 1969

3,478,677
PRESSURE COOKER
Samuel A. Mencacci, Antwerp, Belgium, assignor to International Machinery Corporation, St.-Niklaas-Waas, Belgium, a corporation of Belgium
Filed Aug. 8, 1966, Ser. No. 571,017
Int. Cl. A23l 3/04
U.S. Cl. 99—360                                          14 Claims

ABSTRACT OF THE DISCLOSURE

A pressure cooker having a pair of sterilizing housings having a heat treatment medium therein maintained under high pressure and communicating with a water filled inlet housing and a water filled outlet housing. A series of unlinked baskets are moved along a predetermined path through the cooker housings by a series of column lifting jacks, transfer pushers, and holding dogs all controlled so as to operate in timed relation.

---

The present invention pertains to improved pressure cookers and more particularly relates to an article conveying apparatus for moving articles such as cans or jars through the cooker.

It is well known in the canning industry that certain products which require relatively long cooking periods, for example between 30 minutes and 60 minutes, are better processed in a still cooker as compared to an agitating type cooker. With the higher production rates demanded by the industry, i.e., where the can speed is in excess of approximately 200 cans per minute, it is recognized that a continuous type process, as compared to a batch process, is essential and that the use of certain well known rotary type cookers is not practical because the high operating speeds and long cooking periods required by this type of product would raise the initial cost of the installation to an excessive amount. Thus, in accordance with the preferred embodiment of the present invention, the well known hydrostatic type of cooker is employed since this type of cooker is adapted to handle large quantities of containers over long cooking periods without an excessive amount of agitation.

Hydrostatic cookers also have certain inherent disadvantages which are objectionable to the canning industry. These cookers are usually very large and the quite expensive, and accordingly, the canners desire as much versatility as possible in this type of equipment so that they can justify the relatively high cost of the equipment. Another disadvantage of the standard type of hydrostatic cooker is that the chain conveyors of the type which are usually used in hydrostatic cookers considerably restrict the versatility of the cooker as to cooking time since the conveyor length and speed cannot readily be changed to any great extent. Also, the size range of containers which the conveyors are capable of handling is generally somewhat limited.

It is therefore one object of the present invention to provide an improved pressure cooker.

Another object is to provide an improved method of processing comestibles in sealed containers.

Another object is to provide an improved conveying apparatus for advancing containers through a pressure cooker.

Another object is to provide a conveying apparatus which includes a continuous unlinked series of baskets that may be increased or reduced in number so as to vary the length of the conveying apparatus, and accordingly the processing time.

Another object is to provide a conveying apparatus which is versatile in that it can handle containers which may vary considerably in size.

Another object is to provide a conveying apparatus for receiving containers when either in random array or when in a predetermined order and for positively confining the containers when passing the containers through the cooker.

Another object is to provide a pressure cooker having a housing and a conveying system which may be readily changed in length so as to vary the processing time of the containers in the cooker.

Another object is to provide a hydraulic system for the conveying apparatus which utilizes the weight of the series of downwardly moving baskets in one vertically extending leg to aid in raising a series of upwardly moving baskets in another vertically extending leg.

Another object is to provide a hydraulic system and an electrical control system operable to load each leg of the hydrostatic cooker from the lower end thereof.

Another object is to provide a hydraulic system and an electrical control system operable to unload each leg of the hydrostatic cooker from the lower end thereof.

These and other objects and advantages of the present invention will become apparent from the following description and the accompanying drawings, in which:

FIGURE 1 is a diagrammatic top plan of the pressure cooker of the present invention.

FIGURE 2 is a diagrammatic central vertical section of the cooker of FIGURE 1 taken along lines 2—2 of FIGURE 1 and illustrating all of the processing chambers in a single plane, said view illustrating an upper and an intermediate transfer device in the sterilizing housings.

FIGURE 3 is a perspective with one corner broken away, of one of the container supporting baskets.

FIGURE 4 is an enlarged plan of the inlet hydrostatic housing illustrating a fragment of a basket transfer conveyor.

FIGURE 5 is a section taken along lines 5—5 of FIGURE 4.

FIGURE 6 is a vertical section taken along lines 6—6 of FIGURE 5, certain parts being broken away.

FIGURE 7 is an enlarged end elevation looking in the direction of arrows 7—7 of FIGURE 4.

FIGURE 8 is a perspective taken looking in the direction of arrow 8 of FIGURE 4 illustrating a support bracket for one of the basket holding dogs.

FIGURE 9 is an enlarged horizontal section taken along lines 9—9 of FIGURE 2 illustrating the mechanism for transferring the baskets from the lower end of one housing to the lower end of the next adjacent housing, certain parts being cut away.

FIGURE 10 is a vertical section taken along lines 10—10 of FIGURE 9.

FIGURE 11 is a vertical section taken along lines 11—11 of FIGURE 9 showing the bottom holding dogs which are associated with the inlet housing.

FIGURE 12 is an enlarged vertical section taken along lines 12—12 of FIGURE 10 illustrating basket pusher guide means.

FIGURE 13 is a horizontal section taken along lines 13—13 of FIGURE 2 showing a top transfer mechanism for transferring the baskets from the first to the second sterilizing housing, certain parts being cut away.

FIGURE 14 is a vertical section taken along lines 14—14 of FIGURE 13.

FIGURE 15 is a vertical section taken along lines 15—15 of FIGURE 14 with a pusher head being shown in a different operative position from that illustrated in FIGURE 14.

FIGURE 16 is a top plan of the cooling housing illustrating the mechanism for discharging the baskets therefrom, certain parts being broken away.

FIGURE 17 is a vertical section taken along lines 17—17 of FIGURE 16.

FIGURE 18 is a vertical section taken along lines 18—18 of FIGURE 16.

FIGURE 19 is an elevation looking in the direction of arrows 19—19 of FIGURE 16.

FIGURE 20 is a diagrammatic vertical central section of a pressure cooker that is similar to FIGURE 2, said view diagrammatically illustrating the hydraulic power units and the position of certain limit switches of the electrical control circuit which switches are closed when the associated pistons are aligned therewith.

FIGURE 21 is a diagram of that portion of the hydraulic circuit which controls the actuation of the main or basket lifting power units.

FIGURE 22 is a diagram of that portion of the hydraulic circuit which controls the actuation of the transfer power units and holding dog power units.

FIGURE 23 is a chart which illustrates the sequence of operation of the several hydraulic power units, the rate and direction of movement of the main lifting power units, and the unbalanced load acting on the main power units and which must be balanced by the hydraulic pumps.

FIGURES 24 to 36 are wiring diagrams which when combined illustrate the electrical control circuits of the pressure cooker, consecutively numbered component identifying lines being indicated near the left margin of each figure.

Figure 25:
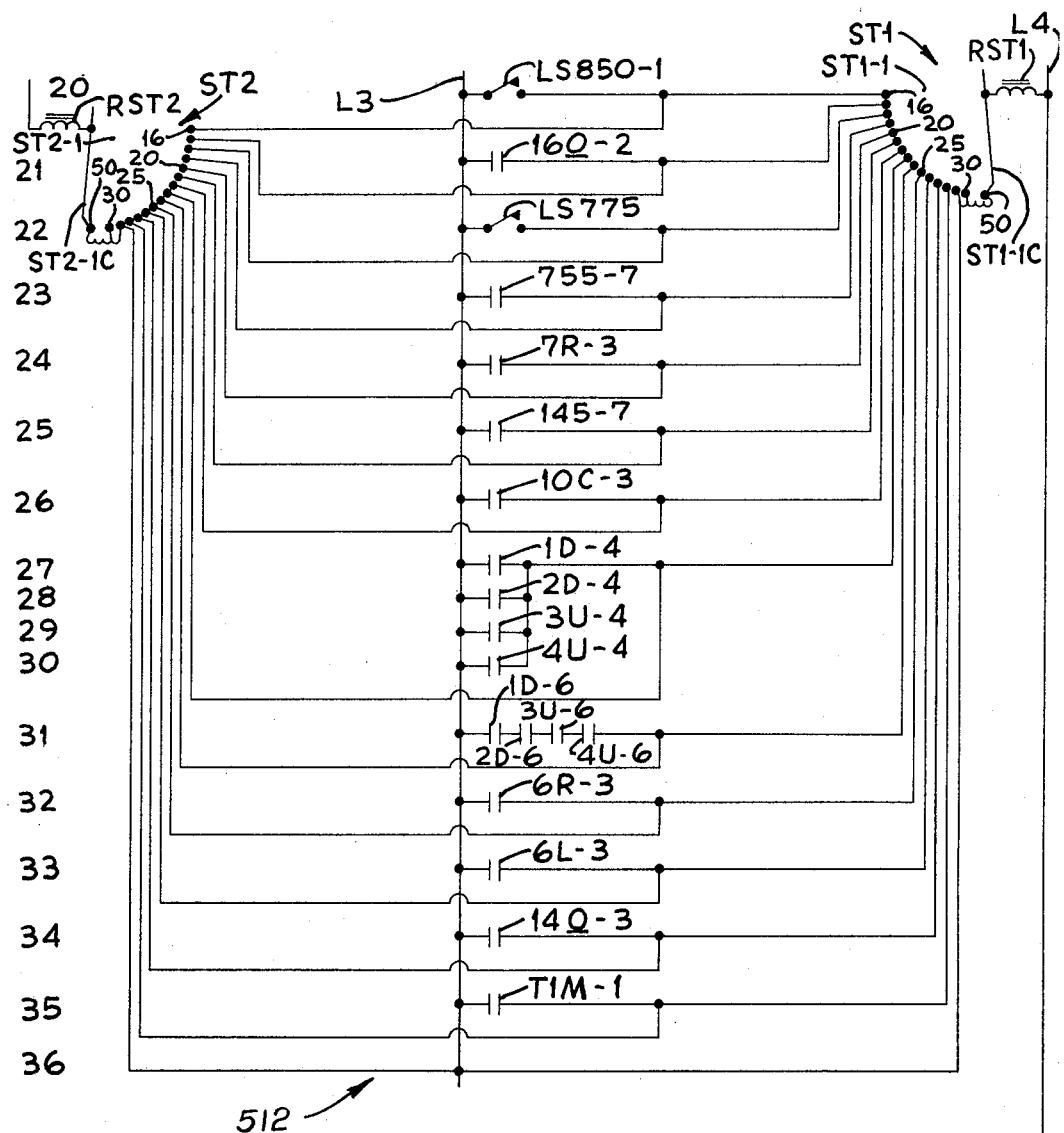

The preferred embodiment of the pressure cooker PC of the present invention is of the hydrostatic cooker type as diagrammatically illustrated in FIGURES 1 and 2.

The pressure cooker features conveying means defined by an unlinked series of baskets B which are moved through the cooker by a plurality of hydraulic power units 1–17 which are operated in timed relationship. It is to be understood, however, that the claims covering the pressure cooker of the present invention should be construed broadly enough to cover other types of cookers such as a cooker which replaces one or both of the hydrostatic legs with pressure retaining gate valves.

In general, the pressure cooker 20 comprises an inlet housing 22 defining a water filled, preheating hydrostatic water leg, a first sterilizing housing 24 defining a first steam filled sterilizing chamber, a second sterilizing housing 26 defining a second steam filled sterilizing chamber, and a discharge housing 28 defining a water filled, cooling hydrostatic water leg. The housings 22 and 24 are connected to each other at their lower ends by a transfer housing 30 which is of sufficient size to permit baskets B (FIG. 3) to be moved therethrough. The sterilizing housings 24 and 26 are connected at their upper ends by a transfer housing 32, and the sterilizing housing 26 and the discharge housing 28 are connected at their lower ends by a transfer housing 34. It will be understood that all of the transfer housings are of sufficient size to permit movement of one basket B at a time horizontally therethrough and that the upper end of the sterilizing housings are sealed to retain steam under pressure.

It will also be noted that an intermediate transfer housing 32a is provided between the sterilizing housings 24 and 26. It will be understood that the intermediate housing 32a is identical to the upper transfer housing 32 and will not be described in detail. It will also be understood that basket transfer will occur at the intermediate housing 32a when the parts are positioned as illustrated in FIGURE 2, and that the empty baskets disposed above the intermediate transfer housing 32a will remain stationary during operation of the machine when the parts are positioned as illustrated in FIGURE 2.

As illustrated in FIGURE 2, a continuous series of unlinked baskets B are placed in the housings 22, 24, 26 and 28 and are moved in the direction of the arrows in FIGURES 1 and 2 by a series of hydraulic jacks, transfer mechanisms, and holding dogs. In this regard, the baskets B in the inlet housing 22 and in the second sterilizing housing 26 are periodically lowered by hydraulic jacks 36 and 38 operated by power units 1 and 3, respectively, and the baskets B in the first sterilizing housing 24 and in the discharge housing 28 are periodically raised by hydraulic jacks 40 and 42 operated by power units 2 and 4. A plurality of horizontally disposed hydraulic transfer mechanisms 44, 46, 48, 50 and 52 are provided and are operated in timed relation with the above mentioned jacks by power units 5, 6, 7, 8 and 9, respectively. The transfer mechanism 44 transfers one filled basket at a time from a basket loader (not shown) at a loading station 54 into the upper end of the inlet housing 22, and the transfer mechanism 46 transfers baskets one at a time from the lower end of the housing 22 to the lower end of the first sterilizing column 24. Similarly, the transfer mechanism 48 is arranged to transfer baskets from the upper end of the sterilizing housing 24 into the upper end of the sterilizing housing 26 through transfer housing 32. An identical transfer mechanism 48a is provided to transfer the baskets through intermediate transfer housing 32a, it being understood however that, as illustrated in FIGURE 2, transfer mechanism 48 is inoperative and mechanism 48a will transfer all baskets from housing 24 to housing 26 to provide a short cooking cycle.

The transfer mechanism 50 transfers baskets B from the lower end of sterilizing housing 26 to the lower end of discharge housing 28, and the transfer mechanism 52 transfers baskets from the upper end of the discharge housing 28 to an unloading station 56 (FIG. 1) where the filled baskets of processed containers are unloaded by means not shown and are returned to the loading station 54 for refilling and movement through the several chambers of the hydrostatic cooker during another cycle of operation. Although other suitable means may be provided for loading and unloading containers from the baskets, a basket loader and unloader of the type manufactured by Peco Corporation, 111 Atega Ave., Mountain View, Calif., may be employed.

Although FIGURE 2 illustrated the baskets B being transferred at the intermediate position of sterilizing housings 24 and 26 rather than at the upper end thereof, in the detailed description to follow the transfer mechanism 48, rather than 48a will be described and the transfer operation will be described as occurring at the upper end of the housings. It will also be understood that the transfer mechanism 48a is identical to the mechanism 48, and that the hold dogs associated with the mechanism 48a are identical to and operate in the same way as the hold dogs associated with the mechanism 48. The conduits and wiring of the hydraulic and electrical systems, to be described hereinafter, which are connected to the parts which control the actuation of the power units of mechanism 48 at the upper ends of housings 24 and 26 may be removed therefrom and connected to the identical units of the mechanism 48a to operate the same. Also, it will be understood that two additional sets of holding dogs 56 and 57 are mounted above mechanism 48a for supporting the empty baskets above mechanism 48a during operation when the cooker is arranged to use transfer mechanism 48a. These pairs of dogs are operated by power units 58 and 59 which are identical to the other hold dog power units and may be operated by suitable controls in the electrical and hydraulic circuits.

The baskets B (FIG. 3) are all identical and cooperate with the above-mentioned transfer mechanisms and hydraulic jacks to define a continuous unlinked conveyor 60 which serves to intermittently advance each basket through the several heat treatment chambers of the cooker 20. Each basket comprises a lower box frame 62 having outwardly projecting flanges 64, an upper open box frame 66 having outwardly projecting flanges 68, corner angle members 70 welded to the upper and lower frames 62 and 66 at their corners, a perforated bottom wall 72 welded to the lower frame 62, and perforated side walls 74 welded to the upper and lower frames and to the corner members to define a rigid open top basket B.

In the preferred embodiment of the invention each basket is adapted to accommodate approximately one ton of containers which may be placed therein either in a symmetrical pattern or at random by loading means not shown. It is to be understood that during processing the perforated side walls 74 and bottom wall 72 will permit the heat treatment medium, which is water and steam, to enter the baskets but that the perforations are too small to permit the containers, or large pieces thereof such as broken jars, to escape from confinement within the basket. In the illustrated embodiment of the invention, each basket supports approximately one ton of containers as mentioned above. It is to be understood, however, that the present invention is not limited by the size or shape of basket being used. Thus, for example, it is within the scope of the invention to use baskets which handle only a single layer of containers.

As mentioned previously, the housings 22, 24, 26 and 28 are filled with empty baskets B before the normal cycle of operation begins. During continuous operation of the cooker 20 it will be understood that the baskets B within the cooker 20 will all be full of containers and that the containers, after being processed, will be discharged from their baskets by any suitable discharge means (not shown) at the discharge station 56 and that the discharge means then moves the empty baskets into the loading station 54 so that the basket can again be loaded by a container loader (not shown) of any suitable type.

As indicated in FIGURES 4–6, each loaded basket B is moved from the loading station 54 to the position opposite the transfer mechanism 44 by a transfer conveyor 80. The transfer conveyor 80 is a roller conveyor that is driven by a reversible motor 82. The conveyor 80 and motor 82 are supported on the upper end of the inlet housing 22 by a sub-frame 84 (FIG. 2). The sub-frame 84 includes a pair of parallel beams 86 and 88 upon which a first series of rollers 90 and a second series of rollers 92 are journaled. Each roller 90 in the first series has a sprocket 94 keyed thereto, and the sprockets 94 are interconnected by a chain 96 which is trained around the sprockets 94 and around idler sprockets 98 journaled on the beam 86. Similarly, each roller 92 in the second series has a sprocket 100 keyed thereto, and the sprockets 100 are interconnected by a chain 102 which is trained around the sprockets 100 and around idler sprockets 104 journaled on the beam 86. The first series of rollers 90 are driven from the reversible motor 82 by a first chain drive 106 and the second series of rollers 92 are driven from the motor 82 by a second chain drive 108.

During normal operation of the cooker 20, the conveyor is driven toward the left (FIG. 6) by the motor 82 until such time as the filled basket B is disposed in transfer position to be pushed into the inlet housing 22 by the pushing mechanism 44. When the basket reaches the transfer position, a limit switch 110 is engaged by the basket and causes deactivation of the motor 82 thereby stopping the conveyor 80 until the basket B is removed from the conveyor 80 and another basket B is filled with containers at which time the motor 82 is again energized.

The transfer mechanism 44 (FIGS. 4–8) transfers baskets B one at a time from the conveyor 80 into the upper end of the inlet housing 22 in the position indicated by basket B1. The transfer mechanism 44 comprises the hydraulic power unit 5 which has its cylinder 116 rigidly secured to the sub-frame 84. The piston rod 118 of the power unit 5 has a pusher head 120 secured to its free end which is movable between the retracted position shown in FIGURES 4 and 5 and an extended position which is effective to move the basket B to the inlet housing 22. As the basket B is being moved toward the inlet housing 22, the baskets lower flange 64 slides along the supporting rollers 90 and 92 and along short side guide rails 122, 124 and also along a central guide rail 126. The rails 122, 124 and 126 are bolted to the sub-frame 84, and the central rail 126 slidably engages a channel slide block 127 that is bolted to the pusher head 120 so as to guide the pusher head 120 during is reciprocable movement toward and away from the housing 22.

In order to provide a trouble free transfer of the basket B1 being pushed into the inlet housing 22 above the column of baskets in the housing 22, pivotally mounted basket supporting dogs 128 and 130 are disposed in position to slidably receive opposed upper flanges 68 of the basket B1 thereby supporting the basket being transferred into the housing in spaced position above the column of unlinked baskets therein. The dogs 128 and 130 each comprises an elongated slide bar 132 (FIGS. 4, 5 and 8) which is welded to two vertical support arms 134 each having a hub 136 welded to the lower end thereof. A stiffener plate 138 is welded to the arms 134 and to the slide bar 132 to add rigidity to the bar.

The hubs 136 of the dog 128 are keyed to a shaft 140 which is journaled in a pair of yokes 142 and in a packing gland 144 that is welded to and extends through the housing 22. Each hub 136 of the dog 128 has a stop plate 146 welded thereto which plate is pivoted against a pair of capscrews 148 that are locked in adjusted position on a web 150 of the associated yoke 142 so as to normally hold the dog 128 in the position shown in FIGURE 4.

The hubs 136 of the dog 130 are keyed to a shaft 152 which is journaled in a pair of yokes 154 and in a packing gland 156 that is welded to and extends through the housing 22. Each hub 136 of the dog 130 has a stop plate 158 welded thereto, and the plate 158 is pivoted against capscrews 160 locked in adjusted position on a web 162 of the associated yokes 154, which yokes are identical to the yokes 142, so as to normally hold the dog 130 in position to receive the basket B1 when moving into the position shown in FIGURE 4.

The yokes 142 are bolted to a horizontal frame member 166 which is welded to the housing 22, while the yokes 154 are bolted to a similar frame member 168 that is likewise welded to the housing. As indicated in FIGURES 4 and 5, vertical angle guide rails 170 and 172 are secured to the frame member 166 and serves to guide two corners of the column of baskets within the housing 22 during downward movement of the column. Similarly, two vertically extending guide rails 174 and 176 are secured to the frame member 168 and serve to guide the other two corners of the baskets B through the housing 22. As indicated in FIGURES 5 and 6, the angle rails 170 and 174 nearest the pusher head 120 have the upper portions of their transverse flanges cut away so as to permit the baskets being transferred to enter the inlet housing 22 and to be moved to the position indicated by the basket B1 (FIG. 4). It will be understood that the vertically extending guide rails 170, 172, 174 and 176 extend downwardly within the housing 22 to a position immediately above the transfer mechanism 46 so as to guide the baskets during their downward movement through the inlet housing 22. The rails 170, 172, 174 and 176 are supported by the frame members 166 and 168 and by a plurality of vertically spaced members (not shown) which are similar to the members 166 and 168 and are welded to the inner surface of the inlet housing 22.

As will be explained in more detail later, the basket B1 remains supported on the dogs 128 and 130 until after the hydraulic jack 36 (FIG. 2) raises the entire column of baskets B in the inlet housing 22 upwardly an amount sufficient to lift the basket B1 off the dogs 128 and 130. The dogs 128 and 130 are then pivoted out of the path of movement of the basket B1 and the entire column including basket B1 is lowered leaving sufficient room above the column of baskets to receive the next basket from the conveyor 80.

The dogs 128 and 130 are pivoted outwardly and thereafter return to the position shown in FIGURE 4 by the pair of hydraulic power units 10 and 10a (FIGS. 4 and 7). The power units 10 and 10a each includes a cylinder 182 which is pivotally supported by a bracket 184 that is welded to the housing 22. The piston rod 186 of power unit 10 is pivotally connected to one end of a lever 188 that is keyed to the shaft 152. Another lever 189 keyed to the shaft 152 is pivotally connected to one end of lever 190 by a link 192. The lever 190 and a second lever 193 are keyed to the shaft 140. The piston rod of power unit 10a is connected to the lever 193. Thus, the power units 10 and 10a are operated simultaneously to move the hold dogs 128 and 130 between the closed basket receiving position illustrated in FIGURE 4 and an open position permitting the baskets to move downwardly therepast.

It will be understood that the transfer mechanism 44 pushes one basket B at a time into the upper end of the inlet housing 22 and that the hydraulic jack 36 and transfer mechanism 46 are operated in timed relation with the transfer mechanism 44 to intermittently lower each basket to the bottom of the inlet housing 22 and to thereafter transfer the basket from the bottom of the inlet housing 22 to the bottom of the first sterilizing housing 24 to permit the hydraulic jack 40 to intermittently raise the transferred basket through the sterilizing housing 24.

As best shown in FIGURES 9-12, the hydraulic jack 36 comprises the power unit 1 having its cylinder 202 rigidly secured to the frame of the cooker 20 and having its piston rod 204 projecting upwardly into the inlet housing 22 through a packing gland 206 that is secured in fluid tight engagement to the bottom wall 208 of the inlet housing 22. Similarly, the hydraulic jack 40 comprises power unit 2 having its cylinder 212 rigidly secured to the frame of the cooker 20 and having its piston rod 214 projecting upwardly to the first sterilizing housing 24 through a packing gland 216 that is secured in fluid tight engagement to the bottom wall 218 of the first sterilizing housing 24.

Identical basket supporting heads 220 and 222 are screwed onto the upper ends of the piston rods 204 and 214, respectively, and accordingly, common parts of both heads will be assigned the same numerals. The heads 220 and 222 are each of cast construction, and each head includes a central hub 224 having diagonal I-beams 226, 228, 230 and 232 projecting radially outward therefrom and having their outer ends beveled downwardly and inwardly. The upper edges of the outer ends of the I-beams are interconnected by transverse angle stiffening members 234, 236 and by longitudinal angle slide members 238 and 240. A central longitudinal slide bar 242 is rigid with the hub 224 and with the transverse member 234 and 236.

As best indicated in FIGURES 10 and 11, the heads 220 and 222 are guided for vertical movement and are held from rotation by four vertical guide rods 244 which are slidably received in suitably bushed hubs 246 formed on the ends of the I-beams 226, 228, 230 and 232. The guide rods 244 are rigidly secured to the inner surface of the associated housings 22 or 24 by lower brackets 248 and upper brackets 250, which brackets are rigidly secured to the associated housings as by welding.

In order to allow the transfer mechanism 46 to transfer the lowermost basket B2 from the inlet housing 22 to the lowermost position in the first sterilizing housing 24, basket supporting dogs 254 and 256 are provided in the inlet housing 22 and basket supporting dogs 258 and 260 are provided in the first sterilizing housing 24. The dogs 254 256, 258 and 260, and the mechanism for actuating the same are substantially the same as the previously described dogs 128 and 130. Accordingly, the dogs 254, 256, 258 and 260 and their actuating mechanisms will only briefly be described.

The dogs 254 and 256 associated with the inlet housing 22 are keyed to shafts 262 and 264 which are journaled in yokes 266 and 268, respectively, and in packing glands 270 and 272, respectively. The yokes 266 are bolted to a horizontal frame member 274 that is welded to the internal surfaces of the inlet housing 22, and the yokes 268 are bolted to a similar frame member 276 that is welded to the housing. The packing glands are welded to the housing 22 and provide means for permitting the shafts 262 and 264 to project therethrough. The mechanism for actuating the dogs 254 and 256 comprises a pair of hydraulic power units 11 and 11a (FIG. 9). The power unit 11 has one end of its cylinder pivotally secured to the inlet housing 22 and has its piston rod pivoted to a lever 280 that is keyed to the shaft 262. The shaft 262 is connected to the shaft 264 by a link 282 that is pivotally connected to lever 284 and 286 keyed to the shafts 262 and 264, respectively. The piston rod of the power unit 11a is pivotally connected between the inlet housing 22 and a lever 290 that is keyed to the shaft 264. Thus, the power units 11 and 11a cooperate to move the dogs 254 and 256 between the basket supporting position under the upper flanges 68 of the next to lowest basket in the inlet housing 22 as indicated in FIGURES 9, 10 and 11, and an open position permitting the baskets to move vertically therepast.

The power units 11 and 11a are activated to momentarily move the dogs 254 and 256 out of the path of movement of the baskets B only after the basket supporting head 220, when empty, has moved upwardly against the lower surface of the basket supported by the dogs 254 and 256 to slightly lift the baskets thereby freeing the dogs from outward pivotal movement to their open or inactive positions.

The jack 36 then lowers the head 220, and the entire column of baskets supported thereon moves downwardly a distance equal to the height of one basket B. Shortly after this downward movement has been initiated and the lower flange 64 of the second to lowest basket in the column of baskets moves past the dogs 254 and 256, the power units 11 and 11a return the dogs into the active position to engage the upper flanges 68 of said second to lowest basket permitting the lowest basket to be moved to the position occupied by the basket B2 in FIGS. 10 and 11.

The dogs 258 and 260 are operated in substantially the same manner as dogs 254 and 256 except that hydraulic power units 13 and 13a are substituted for power units 11 and 11a. The dogs 258 and 260 are normally held in the active basket supporting position shown in FIGURES 9 and 10, and are momentarily cammed out the active position to an inactive position spaced from the path of movement of the baskets B only after a basket has been transferred from the inlet housing 22 to the first sterilizing housing 24 and is lifted by the hydraulic jack 40 a sufficient distance to engage and raise the upper flange of the basket supported by the dogs 258 and 260 above the dogs. The power units 13 and 13a subsequently return the dogs to the basket supporting position under the upper flange 68 of the lowermost basket after the upper flange has been moved by the head 222 above the dogs 258 and 260 permitting the empty head 222 to return to its lowermost position shown in FIGURE 10.

As mentioned above, the transfer mechanism 46 transfers the lowermost basket B2 from the inlet housing 22, through the transfer housing 30 and into the first sterilizer housing 24. The transfer mechanism 46 comprises the hydraulic power unit 6 which includes a cylinder 304 rigidly secured to the inlet housing 22 by a bracket 306 (FIG. 10) and having a piston rod 308 which extends into the housing 22 through a packing gland 310. A transfer head 312 (FIGS. 9, 10 and 12) is screwed on the free end of the piston rod 308 and has an inverted U-shaped guide block 314 welded to its lower surface. The guide block 314 is disposed in sliding engagement with the aforementioned slide bars 242 of the basket supporting heads 220 and 222, and with slide bar segments 316, 318 and 320 which are aligned with the slide bars 242. The slide bar segment 316 is supported by a bracket 322 that is welded to the packing gland 310. The segment 318 is supported by horizontal angle bars 324 and 326, and segment 320 is supported by similar angle bars 328 and 330. The angle bars 324, 326, 328 and 330 are welded to the inner walls of the transfer housing 30. Basket supporting slide bars 332 and 334 are welded to the angle bars 324, 326 and 328, 330, respectively. Similar slide bars 336 are secured to brackets 338 (FIG. 10) that are welded to the inner surface of a flanged clean-out neck 340 welded to the housing 24 and having a flanged cap 342 bolted thereto to close the same. It is to be understood that the cap 342 may be removed from the neck 340 when necessary for maintenance or for inserting or removing baskets from the housing 22 or 24. As indicated in FIGURES 10 and 11, basket aligning rail segments 344 are welded to the outer edges of the slide bars 332, 334 and 336, and to slide members 238 and 240 of the basket supporting heads 220 and 222 and serve to guide the basket B2 from the inlet housing 22 onto the head 222 in the first sterilizing housing 24 for subsequent movement upwardly through said first sterilizing housing.

After a basket B has been transferred into the lower end of the first sterilizing housing 24, the hydraulic jack 40 moves this basket upwardly against the next higher basket thereby elevating the entire column of baskets in the housing 24. Each intermittent movement of the jack 40 raises the column of baskets a distance slightly in excess of the height of one basket B and thereafter lowers the baskets until the upper flange 68 of the uppermost basket B3 (FIGS. 13 to 15) is engaged and supported by basket supporting dogs 350 and 352 at the upper end of the first sterilizing housing 24. Shortly thereafter, the remaining baskets in the housing 24 are supported by engagement of the previously described dogs 258 and 260 (FIG. 9) with the upper flange 68 of the lowermost basket B in the housing 24 thereby allowing the head 222 of the jack 40 to return empty to its lowermost basket receiving position as illustrated in FIGURE 10.

The dogs 350 and 352 are normally held in the closed or active basket supporting position by power units 12 and 12a and operate in exactly the same manner as do the dogs 258 and 260. Accordingly, these dogs will not be described in detail. The basket supporting dogs 350 and 352 are supported by horizontal frame members 358 and 360, respectively, which are welded to the housing 24 and to stiffening brackets 362 that are also welded to the housing 24.

In order to receive one basket B at a time in the upper end of the second sterilizing housing 26, a pair of holding dogs 364 and 366 are provided and are disposed at the same level as the dogs 350 and 352. The dogs 364 and 366 are identical to the dogs 350 and 352 but are operated by a pair of hydraulic power units 14 and 14a in exactly the same manner as the power units 10 and 10a (FIG. 7) operate the previously described holding dogs 128 and 130.

The dogs 364 and 366 are supported on frame members 372 and 374, respectively, which frame members are welded to the inner surface of the housing 26 and are additionally supported by brackets 376 welded thereto and to the housing. As indicated in FIGURES 13 and 14, slide bars 378 and 380 are rigidly secured to the transfer housing 32 by brackets 382 welded thereto and to the housing 32. The slide bars 378 are in alignment with the dogs 350 and 364, when the dogs are in the basket supporting positions, and define a stationary bridge between the dogs. Similarly, the slide bars 380 are in alignment with the dogs 352 and 366 when the dogs are in the basket supporting position and define a bridge between these last mentioned dogs.

The transfer mechanism 48 is provided to transfer the uppermost basket B3 in the first sterilizing housing 24, which basket B3 is supported by the dogs 350 and 352, to a similar position on the dogs 364 and 366 in the housing 26. The transfer mechanism 48 comprises hydraulic power unit 7 having a cylinder 386 supported by a bracket 388 welded to the housing 24. The piston rod 390 of the power unit 7 projects into the housing 24 through a packing gland 392 that is secured to the housing. A basket pushing head 394 is screwed on the free end of the piston rod 390.

In order to accurately guide the head 394 for horizontal reciprocable movement, a horizontal guide rail 396 (FIG. 14) is secured to and spaced from a longitudinally extending, horizontally disposed frame member 398 by a plurality of spacers 400 and cooperating bolts (not shown). The frame member 398 is supported in fixed position by a plurality of transverse channel members 402 and by a bracket 404 which are bolted to the frame member 398 and are welded to the associated housings 24 or 26. A guide block 406 is slidably received on the guide rail 396 and is connnected to the pusher head 394 by an arm 408. Thus, actuation of the hydraulic power unit 7 in timed relation with the other components of the pressure cooker 20 will advance the pusher head 394, which head is accurately guided by the rail 396, in a horizontal linear path toward the right (FIGS. 13 and 14) thereby pushing the basket B3 out of the upper end of the first sterilizing housing 24 and onto the dogs 364 and 366 in the upper end of the second sterilizing housing 26 and in spaced relation above the column of baskets therein.

As indicated in FIGURES 13 and 14 vertically extending angle members 409, and 409a are welded to the frame members 358 and 360 in housing 24, and similar members 411 and 411a are welded to frame members 372 and 374 in housing 26. The angle members 409, 409a, 411 and 411a extend substantially the full length of the housings 24 and 26 and serve to guide the baskets while moving vertically through the housings. As shown in FIGURE 14 the upper portion of the transverse flanges of angle members 409a and 411 are cut away to permit transfer of the baskets from housing 24 to housing 26. It will also be understood that transverse flange portion of angle members 409a and 411 are removed adjacent the intermediate transfer mechanism 48a to permit transfer at this intermediate point if transfer mechanism 48a, rather than mechanism 48 is placed in operation.

Each basket B while being guided by angle members 411 and 411a is lowered in a step-by-step manner from the upper end of the second sterilizing housing 26 (FIG. 2) to the lower end thereof by cooperation between the hydraulic jack 38 and a pair of holding dogs 412 and 414 which are actuated by hydraulic power units 15 and 15a. Each basket B is thereafter transferred into the lower end of the discharge housing 28 by the transfer mechanism 50 and is then elevated to the upper end of the discharge housing 28 by the hydraulic jack 42 and cooperating holding dogs 416 and 418 which are actuated by a pair of hydraulic power units 17 and 17a. The dogs 412, 414, hydraulic jack 38, transfer mechanism 50; hydraulic jack 42, and dogs 416 and 418 are identical to and operate in the same manner as the dogs 254, 256, hydraulic jack 36, transfer mechanism 46, hydraulic jack 40, and dogs 258, 260, respectively. Accordingly, these parts will not be described in detail.

Although only four vertical housings have been shown, it will be apparent that any number of housings may be added to or subtracted from the pressure cooker 20 by merely providing the appropriate number of baskets, holding dogs, hydraulic jacks and transfer mechanisms.

The hydraulic jack 42 is actuated by power unit 4 and intermittently moves each basket B upwardly through the discharge housing 28 in the same manner as the jack 40 moves the basket upwardly through the housing 24. During each stroke, the jack 42 moves the column of baskets upwardly a distance slightly greater than the height of a single basket B releasing the pressure on the lower dogs 416 and 418 which are then moved outwardly by power units 17 and 17a to permit the upper flange of the lowest basket to move therepast. Continued upward movement causes the upper flange of the uppermost basket B4 in the discharge housing 28 to move to a position above a pair of holding dogs 422 and 424, which are moved outwardly by a pair of power units 16a and 16, permitting the flange to move therepast. The power units 16a and 16 then return the dogs 422 and 424 to the basket supporting position under the upper flange 68. The hydraulic jack 42 then moves downwardly causing the uuper basket B4 to be supported by the upper dogs 422 and 424 and the remaining baskets to be supported by the lower dogs 416 and 418.

The upper dogs 422 and 424 are substantially the same as the dogs 258 and 260 and accordingly will not be described in detail. The upper dogs are supported on horizontal frame members 428 and 429 that are welded to the housing 28.

With the upper basket B4 supported in spaced relation above the other baskets B in the discharge housing 28 by the dogs 422 and 424, the upper transfer mechanism 52 is placed in operation. The transfer mechanism 52 comprises the hydraulic power unit 9 which includes a cylinder 432 and a piston rod 434. One end of the cylinder 432 is connected by a bracket 436 to the housing 28, and the other end is secured to a transversely extending channel member 438 which is welded to the housing 28. The free end of the piston rod 434 is screwed into a block 440 which is bolted to a transverse forward angle member 442 of a carrier 444. The forward angle member 442 and a transverse rear channel member 446 are welded to longitudinally extending side members 448 and 450. The side members 448 and 450 each have two rollers 452 journalled thereon which rotate about vertical axes and two rollers 454 journalled thereon which rotate about horizontal axes. The rollers 452 and 454 on the side member 448 ride along a horizontally disposed channel guide 456, and the rollers 452 and 454 of the side member 450 ride along another horizontally disposed channel guide 458. One end of each guide 456 and 458 is rigidly secured to the inner surface of the discharge housing 28 and the other end of the guides are welded to upstanding legs 460 and 462 (FIG. 19) and to an angle cross bar 464 of a discharge conveyor sub-frame 466. The sub-frame 466 is rigidly secured to the housing 28 by brackets 468 not fully shown.

As best shown in FIGURES 17 and 18, the channel member 446 of the carrier 444 is reinforced by ribs 470 to strengthen the same and engages the uppermost basket B4 in the discharge housing 28 at a point immediately below the upper flange 68 thereof. Energization of the power unit 9 thus causes the carrier 444 to push the basket B4 out of the discharge housing 28 onto a discharge conveyor 472 which advances the basket B of processed containers into the unloading station 56 where each basket is unloaded by means not shown and is advanced into the loading station 54 (FIG. 1) for refilling with unprocessed containers thereby starting another cycle of operation.

The discharge conveyor 472 comprises a plurality of rollers 474 journalled on spaced, horizontal support members 476 and 478 of the sub-frame 466. Each roller 474 has a sprocket 480 keyed thereon, and a chain 481 is trained around each of the sprockets 480. The conveyor 472 is driven by a motor 482 which is supported by a bracket 484 bolted to the sub-frame bracket 468. The motor 482 is connected to one of the rollers 474 by a chain drive 486. Thus, the motor 482 drives all the rollers 474 at the same speed.

In order to assure that the baskets are properly guided into the position indicated by basket B4, and thereafter into proper position to be unloaded, four vertically extending angle guide rails 488, 490, 492 and 494, are provided to guide the corners of the baskets upwardly into the position indicated by basket B4. The horizontal supporting member 476 and a horizontal rail 496 guide the baskets while they are being moved along the discharge conveyor 472. The vertical rails 488 and 490 are bolted to the frame member 428 and other similar frame members (not shown) in the discharge housing 28, and the vertical rails 492 and 494 are bolted to the frame member 429 and to other similar frame members (not shown). As indicated in FIGURES 17 and 18, the transverse flanges at the upper ends of the rails 488 and 492 are cut away to permit the baskets to be transferred out of the housing 28 onto the roller discharge conveyor 472. During this transfer movement, each basket is guided by the support member 476 and the cooperating horizontal rail 496 which rail is bolted to the support member 478.

OPERATION IN GENERAL

Because the description of the hydraulic system 510 (FIGS. 20–22) and electrical control system 612 (FIGS. 24–36) to follow is quite lengthy due to the numerous hydraulic power units used to operate the pressure cooker of the present invention, a brief description of the sequence of operations will first be given having reference to the charts of FIGURE 23 and the diagrammatic operational view of FIGURE 20.

At the beginning of the normal cycle of operation, the parts are positioned as illustrated in FIGURE 20, the housings 22, 24, 26 and 28 are filled with baskets B and with the processing mediums at desired temperatures and pressures, and the baskets are filled with jars or cans being processed. As indicated at the bottom of FIGURE 23, each cycle of operation, i.e., the movement of each basket in the cooker to the next position or step which it will assume in the cooker, requires at least 54 seconds.

In FIGURES 20 and 23, the power units are identified by the previously assigned numbers 1–17. When the associated piston is opposite the letter U following the numeral assigned to lifting power units 1–4 it indicates that the piston thereof is "up," whereas when the piston is disposed opposite the letter D is indicates that the piston of the associated power unit is "down." In regard to the transfer power units, the letter L following the power unit numeral indicates that the piston of the associated power unit is at its "left" end of its stroke, when aligned therewith as indicated in FIGURE 20 and the letter R indicates that the piston aligned therewith is at the "right" end of its stroke. Similarly, the letter C following the numerals assigned to the holding dog power units indicates that the piston of the associated power unit aligned therewith is in position to "close" the associated holding dogs, while the letter O indicates that the associated dogs are "open" when the associated piston is aligned therewith.

At the beginning of the cycle of operation, power units 1 and 2 begin their upward movement and power units 3 and 4 begin their downward movement at a slow speed of approximately 0.87 in./sec. During this time power unit 5 moves its piston from position 5L to position 5R, and thereafter immediately returns from position 5R to position 5L thus moving a basket onto the dogs controlled by power units 10 and 10a and returning power unit 5 to its starting position as illustrated in FIGURE 20. Movement of the main power units 1–4 continues at the same slow speed until the piston of power unit 1 reaches position 145 (FIG. 23), indicated in FIGURE 20 by limit switch LS145, at which time power unit 2 has lifted the column of baskets in housing 24 off the holding dogs therein. At this time, all of the piston rods of the lifting power units 1–4 begin to move at their high speed which is approximately 4.75 in./sec. Also, when the piston of power unit 1 reaches position 145, hold dog power units 12, 12a and 13, 13a move from the closed position 12C, 13C to the open position 12O, 13O. Transfer power unit 7 then moves its piston from position 7R to 7L thereby placing its pusher head into position to receive the uppermost basket in housing 24 for subsequent movement thereof into housing 26. When the piston of power unit 7 reaches position 7L, hold dog power units 14, 14a and 15, 15a move their holding dogs in housing 26 from the open to the closed positions.

The pistons of lifting power units 1–4 continue their fast movement until the piston of power unit 1 reaches position 755 (FIG. 23) and indicated by LS755 (FIG. 20) at which time the speed of all the pistons of the lifting power units returns to the slow speed of 0.86 in./sec. and remains at this slow speed until they reach the ends of their strokes. At position 755 transfer power unit 9 moves its piston from position 9L to 9R thereby moving the uppermost basket out of housing 28, and thereafter immediately returns the piston to position 9L.

In response to the piston of power units 1 and 2 reaching the upper ends of their stroke, and the pistons of power units 3 and 4 reaching the lower ends of their strokes, transfer power unit 8 is energized thereby moving its piston from position 8L to 8R and thereafter returning the piston to position 8L. This causes the lowermost basket in housing 26 to be transferred into housing 28. Hold dog power units 10, 10a and 11, 11a then move from the closed to the open position, and upon reaching the open position, hold dog power units 12, 12a and 13, 13a move from the open to the closed position thereby inactivating the downward movement of the pistons of power units 1 and 2, and the upward movement of pistons of power units 3 and 4 at the slow speed of 0.87 in./sec. Opening of the hold dogs in housing 22 controlled by power units 10, 10a and 11, 11a permits the entire column of baskets therein to move downwardly. Closing of the hold dogs in housing 24 by power units 12, 12a and 13, 13a causes the uppermost basket to be supported by the dogs of power units 12, 12a and causes the remaining baskets to be supported on the dogs of power unit 13, 13a.

Shortly after commencing the return movement of power units 1–4, power units 16, 16a and 17, 17a move the hold dogs controlled thereby from the closed to the open position, it being recognized that the entire column of cartons in housing 28 is at this time supported by the piston rod of power unit 4.

Shortly thereafter, transfer power unit 7 is activated to move its piston from position 7L to position 7R thereby closed hold dogs of power units 14, 14a in housing 26. During this time the downward moving piston of power unit 1 reaches point 755 (FIG. 23) thereby causing the pistons of all the lifting power units 1–4 to move at their high speed of 4.75 in./sec. The high speed continues until the piston of power unit 1 reaches position 145 at which time the rate of movement of all the lifting power units is reduced to the slow speed of 0.87 in./sec., and remains at this speed until the pistons reach the ends of their strokes. At position 145, hold dog power units 10, 10a and 11, 11a move the associated hold dogs in housing 22 from the open to the closed position thereby causing all but the lowermost basket to become supported on the holding dogs of power unit 11, 11a.

When the piston rod of all the lifting power units 1–4 have reached the ends of their strokes, transfer power unit 6 is energized to move the piston thereof from position 6L to position 6R and immediately thereafter returns the piston to position 6L thus moving the lowermost basket in housing 22 into housing 24. Upon return of the piston of the power units 6 to position 6L, hold dog power units 14, 14a and 15, 15a move the hold dogs in housing 26 from the closed to the open position, and hold dog power units 16, 16a and 17, 17a move the hold dogs in the housing 28 from the open to the closed position thereby completing the cycle of operation in about 54 seconds. As will be described hereinafter, although all transfer operations are completed in 54 seconds a timer is provided to extend the time required for each cycle of operation to whatever is desired for the particular product being handled. After this predetermined time cycle has elapsed, the timer initiates a new cycle of operation. In this manner, the baskets are moved step by step through the pressure cooker PC of the present invention until a sufficient number of cycles have taken place to move the baskets being processed out of the upper end of the discharge housing 28. The processed containers within the baskets are then discharged from the baskets, the baskets are refilled with containers to be processed, and are then returned to the pressure cooker by power unit 5.

From the above brief description of the operation, it will be noted that the main lifting power units 1–4 operate either at a high speed or at a low speed and that all transferring of baskets between holding dogs and the lifting power units occurs during the slow speed operation thereby assuring gentle transfer of baskets. It will also be noted from FIGURE 23, that during the higher speed operation there is substantially no unbalanced load on the lifting power units since, as will be described in the detailed description of the electrical and hydraulic circuits to follow, the power units 1–4 are hydraulically connected in series. Accordingly, the force acting on the downwardly moving piston rods will be imparted to the upwardly moving piston rods thus requiring that hydraulic force applied by the hydraulic pumps merely equalize the unbalanced loads on the power units.

HYDRAULIC AND ELECTRICAL CONTROL SYSTEMS

Since the operation of the pressure cooker PC is closely controlled by the hydraulic system 510 (FIGS. 20, 21 and 22), and the electrical control system 512 (FIGS. 24–36), the detailed operation will be described in conjunction with the two systems.

The hydraulic system 510 includes a pump motor MOT–1 (FIG. 21) which is coupled to a low pressure hydraulic pump LP and to a high pressure hydraulic pump HP which pumps control the movement of the piston rods of lifting power units 1, 2, 3 and 4. Another hydraulic pump motor MOT–2 (FIG. 22) is connected to a hydraulic pump TP which supplies hydraulic fluid to hydraulic power units 5–17 (FIG. 20) which control the movement of the several transfer mechanisms and basket holding dogs as mentioned above. The high pressure pump HP will supply pressure at approximately 30,000 p.s.i. while the pumps LP and TP supply hydraulic fluid at about 500 p.s.i.

As indicated in FIGURES 21 and 22, a plurality of solenoid operated valves A, B, C, D, E, F, G, H, K, L, M, N, O, P, R, S, T and W are provided and are operated by either one or two similarly numbered solenoids SOL–A1, SOL–A2, . . . SOL–W1 depending upon whether they are four-way valves or two-way valves. The valves F, G, H and W are two-way solenoid operated, spring return valves. The other valves are four-way, spring return valves and are all illustrated in a spring urged neutral position. Energization of the solenoids controlling the two-way valves place these valves in a flow preventing position. Energization of the solenoids controlling the four-way valves selectively place the valves in either a cross passage position or a parallel passage position as indicated by the arrows thereon.

A plurality of pilot operated check valves CV1 to CV4 are associated with the lifting power units 1 to 4 and are of the type which will permit flow of fluid toward the small end of the V, but will flow in the opposite direction unless hydraulically energized. Check valves CV5, CV6, CV7 (FIG. 21) are associated with main power units 1 to 4, and check valve CV8 (FIG. 22) is associated with the transfer and hold dog power units 5 to 17. The check valves CV5 to CV8 are of standard design which permits the flow of fluid therethrough only in the direction toward the small end of the V illustrated thereon. Pressure relief valves PR1, PR2 and PR3 are provided for the pumps HP, LP and TP, respectively, and are set so as to bypass the hydraulic fluid into return sumps 514 and 516 if the pressure on the associated pumps HP, LP and PP, respectively, become excessive. Speed control valves SCV1 and SCV2 are also provided in the hydraulic control circuit for the main power units 1, 2, 3 and 4.

The above mentioned two-way valves, four-way valves, pilot operated check valves, standard check valves, speed control valves, and pressure relief valves are of standard design and may be of the type manufactured by Vickers, Division of Sperry Rand Corporation, Detroit, Mich.

The aforementioned basket lifting power units 1, 2, 3 and 4 each have at least two limit switches LS, which limit switches are assigned the same numerals given to the associated power unit proceeded by the letters LS and followed by the letters U for "upper" and D for "down." It will be understood that the switches followed by the letter U will be actuated when the piston of the associated power unit is in its uppermost position, and that the switches followed by the letter D will be actuated when the piston of the associated power unit is in its lowermost position.

Similarly, the transfer hydraulic units 5 to 9 have equivalently numbered limit switches LS associated therewith followed by the letters L for "left" and R for "right." The switches followed by the letter L will be actuated when the piston of the associated power unit is at the far left end of its travel (FIG. 20), and the switches followed by the letter R will be actuated when the pistons of the associated power unit is at the right end of its travel.

The dog operating hydraulic power units 10, 10a, 11, 11a, 12, 12a, 13, 13a, 14, 14a, 15, 15a, 16, and 16a likewise have equivalently numbered limit switches LS associated therewith followed by the letter C for "closed" and O for "open." The switches followed by the letter C will be actuated when the piston of the associated power unit has moved to its fully closed position, thereby closing the associated pair of holding dogs. The switches followed by the letter O will be activated when the piston of the associated power unit has moved to its fully open position thereby moving the associated pair of holding dogs to the open position out of the vertical path of movement of the baskets.

In addition to the above mentioned limit switches, other limit switches, to be described hereinafter, are associated with the lifting power units 1, 2, 3, and 4, and serve to vary the speed of the lifting power units during their travel or to perform other functions made apparent hereinafter.

In order to simplify the detailed description to follow, the conduits leading out of the above described four way valves illustrated in FIGURE 22 will be assigned the numeral given to the power unit which is serviced by the valve followed by a letter indicating the particular end of the valve to which the conduit is connected to. Thus, for example, it will be understood that the conduits 5L and 5R at the upper end of FIGURE 22 are connected to conduits indicated by the reference numerals 5L and 5R, respectively, (FIG. 20) of the power unit 5.

Solenoid operated stepping switches ST1, ST2 and ST3 (FIGS. 24–29) are provided in the electrical control system 512 and are operated in part by the above mentioned limit switches. The stepping switch ST1 is a fifty step switch with three banks of contacts ST1–1, (FIGS. 24 and 25) ST1–2 (FIG. 26) and ST1–3 (FIG. 27). The three banks of this switch ST1 have contactors ST1–1C, ST1–2C and ST1–3C all of which pivot as a unit in response to the pivotal actuation of the contactor ST1–1C. The stepping switch ST1 includes a relay RST1 (FIGS. 24 and 25) which is energized to shift the contactors one step each time a closed circuit that includes contactor ST1–1C directs current to the relay RST1.

The stepping switch ST2 is also a fifty step switch but is provided with four banks ST2–1 (FIGS. 24 and 25), ST2–2, (FIG. 28), ST2–3 and ST2–4 (FIG. 29). Each bank includes a contactor ST2–1C, ST2–2C, ST2–3C and ST2–4C which contactors all pivot as a unit in response to pivotal actuation of the contactor ST2–1C. The stepping switch ST2 includes a relay RST2 which is energized by the same means and at the same time as relay RST1 of stepping switch ST1 by closing a circuit to relay RST2 which circuit includes contactor ST2–1C. Thus, stepping switches ST1 and ST2 are at all times on the same step.

Stepping switch ST3 (FIG. 29) is a twelve step two bank switch which includes actuating bank ST3–1 and control bank ST3–2. Contactors ST3–1C and ST3–2C are shifted step by step by a relay RST3 each time it is energized through a circuit containing contactor ST3–1C.

Stepping switches ST1, ST2, and ST3 are of standard design and may be of the type manufactured by Automatic Electric, Northlake, Ill.

In order to more easily locate the components of the electrical control system, numerals have been placed near the left hand margin of FIGURES 24–36 and will be referred to in the description to follow when appropriate.

With the cooker filled with baskets B and with the housings of the pressure cooker PC filled with steam and water at the proper temperature, the motors MOT–1 (FIG. 21) and MOT–2 (FIG. 22) are placed in operation by means of any suitable circuit such as a three phase circuit (not shown). It will be noted that at this time the motors run with very little load since the valves F and G (FIG. 21) are open and permit high pressure fluid from pumps HP and LP to flow directly into the sump 514. Similarly, hydraulic fluid from transfer pump TP (FIG. 22) flows directly into sump 516 through open valve W. It will be understood that the hydraulic pump motors MOT–1 and MOT–2 operate continuously during operation of the pressure cooker PC and accordingly have not been included in the electrical control system 512.

The electrical control system includes a 110 volt portion (FIGS. 34–36) and a 48 volt portion (FIGS. 24–33). Main switches (not shown) are turned on to direct 110 volt current into main lines L1 and L2, and 48 volt current into main lines L3 and L4.

At the start of a normal cycle of operation it will be understood that the mechanical, hydraulic and electrical parts of the pressure cooker PC are positioned as shown in FIGURES 20–36. With the parts so positioned and after supplying power to main lines L1, L2, L3 and L4, limit switches (FIGS. 20 and 30) LS1D, LS2D, LS3U, LS4U, LS5L, LS6L, LS7R, LS8L, LS9L, LS10C, LS10aC, LS11C, LS11aC, LS12C, LS12aC, LS13C, LS13aC, LS14O, LS14aO, LS15O, LS15aO, LS16C, LS16aC, LS17C and LS17aC will be closed thereby energizing the associated limit switch relays R1D, R2D, R3U, R4U, R5L, R6L, R7R, R8L, R9L, R10C, R12C, R14O, and R16C. Energization of the above relays will close relay contacts (lines 309–334, FIG. 36) 1D–1, 2D–1, 3U–1, 4U–1, 5L–1, 6L–1, 7R–1, 8L–1, 9L–1, 10C–1, 12C–1, 14O–1, and 16C–1 thereby energizing pilot lights PL1D, PL2D, PL3D, PL4U, PL5L, PL6L, PL7R, PL8L, PL9L, PL10C, PL12C, PL14O and PL16C.

If any of the pilot lights mentioned above do not light thereby indicating that the piston rod of the associated power unit is not in proper position to close the associated limit switch, it is necessary for the piston rod of that power unit to be moved to the proper position before automatic operation can commence. For example, if pilot light PL1D (line 309) is not glowing indicating the piston rod of power unit 1 is not in its proper lowermost position, push button start switch PB–ST2 (line 295) is closed. Relay RY3 is thereby energized through a 110 volt circuit which includes main lines L1, closed switch PB–ST2, a normally closed contact ST–1 of a relay RST (line 122), relay RY3, and main line L2. Energization of relay RY3 closed contact Y3–1 (line 296), Y3–2 (line 298), and Y3–3 (line 300) thereby energizing solenoid SOL–F1 (line 297), lighting pilot light PLF1, and energizing relay RH1Z. Energization of relay RH1Z close a relay contact H1Z–1 (line 301) thereby energizing solenoid SOL–H1 and lighting pilot light PLH1.

Energization of solenoids SOL–F1 and SOL–H1 (FIG. 21) causes the two way valves F and H to move into position to block the flow of fluid therethrough to the sump 514. Thus, the high-pressure pump HP will direct hydraulic fluid into high-pressure conduit 550 permitting the pressure to increase to approximately 2570 p.s.i. before opening pressure relief valve PR1 which then opens to permit the fluid to return to the sump 514 since at this time no other return route is open to the fluid.

Push button switch PB–B1 (line 242), which is preferably placed on a control panel under the unlit pilot PL1D, is then closed thereby energizing solenoid SOL–B1. Energization of solenoid SOL–B1 causes four way valve B (FIG. 21) to shift to the straight passage position thereby directing high pressure fluid into the upper end of power unit 1 moving its piston rod to the lowermost position causing limit switch LS–1D to close. The displaced hydraulic fluid flows through valve B and returns to sump 514 through conduits 552, 554 and speed control valves SCV1 which limit the downward movement of the piston rod of power unit 1 to a speed of approximately 0.87 in./sec.

If any of the other of the above mentioned pilot lights are not burning, then the push button switch associated with that pilot light is depressed until the associated power unit returns to its starting position. Thus, actuation of the push button switches PB–A1 (line 237, FIG. 34) . . . PB–T2 (line 292, FIG. 35) will energize the associated solenoid SOL–A1 . . . SOL–T2 to shift their associated valves to the appropriate position. When all of the above mentioned pilot lights are glowing thereby indicating that their associated power units are in proper position to start an automatic cycle of operation, stop switch PB–SP2 (line 296) is closed thereby deenergizing relays RY3 and RH1Z (line 299). Thus, solenoid SOL–F1 and SOL–H1 are de-energized causing the two way valves F and H (FIG. 21) to return to their illustrated open positions.

In order to initiate an automatic cycle of operation, start switch PB–ST1 (line 122) of the 48 volt circuit is closed. Closing push button switch PB–ST1 (line 122) energizes start relay RST which closes relay contacts ST–2 line 123, which is in series with closed stop switch PB–SP1 thereby providing a holding circuit across start switch PB–ST1 for relay RST. Closing PB–ST1 also energizes pilot light PLST and closes relay contacts ST–3 (line 1), ST–4 (line 235D), ST–5 (line 114) and opens contacts ST–1 (line 295) and ST–6 (line 305). Current then flows from main line L3 to main line L4 (line 1, FIG. 24) through a circuit which includes closed relay contacts 1D–2, 2D–2, 3U–2, 4U–2, 5L–2, 6L–2, 7R–2, 8L–2, 9L–2, 10C–2, 12C–2, 14O–2, 16C–2, ST–3, the contactors ST1–1C and ST2–1C (line 20) of stepping switches ST1 and ST2, and stepping switch relay RST1 and RST2. Energization of stepping switch relays RST1 and RST2 closes relay contacts ST1–1 and ST2–1 (lines 235A and B) thereby establishing a circuit through normally closed relay contacts S1S–1 of relay RS1S and S2S–1 of relay RS2–S, respectively. Energization of stepping switch relays RS1S and RS2S simultaneously pivots all of the contactors of stepping switches ST1 and ST2 to step No. 1. It will be noted that the circuits to relays RS1S and RS2S are immediately opened by the opening of normally closed contacts S1S–1 and S2S–1 as well as by the shifting of the stepping switch contacts to the new steps.

With stepping switch contactor ST2–3C (line 100) of stepping switch ST2–3 in step No. 1, relay RF1 (line 95) is energized thereby closing relay contact F1–1 (line 297) energizing solenoid SOL–F1 and lighting pilot light PLF1 (line 298). It will be noted that relay RF1 will remain energized until contactor ST2–3 moves to step No. 12.

With stepping switch contactor ST2–4C (line 109) in step No. 1, a circuit is closed to relay RH1 (line 104). It will be noted that this relay remains energized until stepping switch contactor ST2–4 has moved to step No. 4. Energization of relay RH1 closes contact H1–1 (line 299) thereby energizing relay RH1Z. Energization of relay RH1Z closes contact H1Z–1 (line 301) thereby energizing solenoid SOL–H1 and lighting pilot light PLH1. Thus, two valves F and H (FIG. 21) are shifting to their flow blocking positions and high pressure hydraulic fluid is directed into conduit 550 in the previously described manner for subsequent use by the lifting power units 1, 2, 3 and 4.

The previous energization of relay RST (line 122) and closing of relay contact ST–4 (line 235d) causes energization of relay RW1. Energization of relay RW1 closes contact W1–1 (line 307) thereby energizing solenoid SOL–W1 and lighting pilot light PLW1. Energization of solenoid SOL–W1 shifts valve W (FIG. 22) to a position which blocks the flow of hydraulic fluid from transfer pump TP to the sump 516 thereby making fluid available to main conduit 556. The hydraulic fluid in conduit 556 returns to the sump 516 through pressure relief valve PR3 which is set to open when the pressure in conduit 556 reaches about 490 p.s.i.

Therefore at this time, hydraulic fluid under proper operating pressure is available for use by the lifting power units 1, 2, 3 and 4 (FIG. 20), by the transfer power units 5, 6, 7, 8 and 9, and by the holding dog power units 10 to 17. At this time, contact ST2–2C (line 93) of stepping switch bank ST2–2 energizes relay RA2 (line 91) through a circuit which includes normally closed relay contacts 755–1, 510–1, and 145–1. Energization of relay RA2 closes relay contact A2–1 (line 239) thereby energizing relay RA2Z. Energization of relay RA2Z closes relay contact A2Z–1 (line 241) thereby energizing solenoid SOL–A2.

Energization of solenoid SOL–A2 causes four way valve A (FIG. 21) to shift to a cross passage position. Hydraulic fluid under pressure is then directed from pump HP, through conduit 550, through the valve A into conduits 558 and 560. Pressurized fluid in conduit 560 energizes check valve CV6 and fluid in conduit 558 flows through check valve CV7, through conduits 562 and 564 and into the upper end of the power unit 4. Hydraulic fluid below the piston in power unit 4 flows out of the power unit through conduit 566 and through check valve CV4. Check valve CV4 and check valve CV3 are energized, permitting fluid to pass therethrough toward the left (FIG. 21), by high pressure fluid flowing into check valves CV3 and CV4 through a conduit 568 that is connected to conduit 562. The high pressure fluid flowing from power unit 4 through check valve CV4 enters the upper end of power unit 3 through conduit 570. Hydraulic fluid below the piston of power unit 3 flows out of power unit 3 through conduit 572, through energized check valve CV3, through check valve CV2, and into the lower end of power unit 2 through conduit 574. The hydraulic fluid above the piston in power unit 2 flows out of the upper end of power unit 2 through conduit 576, through conduit 578, through check valve CV1, through conduit 580 and into the lower end of power unit 1. The hydraulic fluid above the piston in power unit 1 flows out of power unit 1 through conduits 582 and 584, through energized check valve CV6, through conduit 586, through four way valve A, through conduit 554, through speed control valve SCV1 and is returned to the sump 514. It will be noted that the speed control valve SCV1 regulates the speed of piston rod movement to about 0.87 in./sec. It will also be noted that the pressure resulting from the weight of the baskets B supported by the downwardly moving piston rods of power units 3 and 4 is utilized to help raise the baskets supported by the piston rods of power units 1 and 2 thereby greatly reducing the power requirements of the hydraulic pump motor MOT–1.

Movement of the piston rods of main power units 1, 2, 3 and 4 as above described opens limit switches LS1D, LS2D, LS3U and LS4U (FIG. 20) thereby de-energizing the associated relays and the associated pilot lights PL1D (line 309), PL2D, PL3U, PL4U, and PLO (line 37). It will be noted that pilot light PLO is energized when the piston of at least one of the four main power units 1, 2, 3, and 4 is in the starting position causing relay contacts 1D–3, 2D–3, 3U–3 or 4U–3 to close a circuit to the pilot light PLO.

As indicated in the chart of FIGURE 23, the lifting power units 1, 2, 3 and 4, and the transfer power unit 5 (FIG. 20) commence their cycles of operation at the same time. Bank ST1–3 (line 71) of stepping switch ST1 controls the timing of the transfer and holding dog actuations. Thus, when contact ST1–3C is in step 1, a circuit is completed to relay RK1 (line 49). Energization of relay RK1 closes relay contact K1–1 (line 259) thereby energizing solenoid SOL–K1. Energization of solenoid SOL–K1 causes valve K (FIG. 22) to shift to the parallel passage position thereby directing high pressure fluid from conduit 556 through conduit 5L and into the left end of the power unit 5 (FIG. 20) forcing the piston rod and a basket onto the holding dogs 128 and 130 which are locked at this time in the closed position by four way valve P (FIG. 22) which controls the actuation of power units 10, 10a, 11 and 11a, and is in the neutral, flow blocking position.

As soon as power unit 5 starts moving toward the right (20), limit switch LS5L opens and pilot light PL5L (line 317) is de-energized. When the piston rod of transfer power unit 5 reaches the right (FIG. 20) end of its stroke, limit switch LS5R is closed. Closing of limit switch LS5R (line 139) energizes relay R5R thereby closing relay contact 5R–1 (line 318) energizing pilot light PL5R. Closing of limit switch contacts 5R–2 (line 2) energizes stepping switch relays RST1 and RST2 in the manner previously described causing all of the contacts of stepping switches ST1 and ST2 to move to step No. 2.

Closing of limit switch relay contact 5R–3 (line 114) also causes stepping switch contact ST3–1C (line 117) of stepping switch ST3 to move to step No. 1. This is accomplished by energizing relay RST3 through a circuit which includes contact ST3–1C, relay contact ST–5 and contact 5R–3 (line 114). Energization stepping switch relay ST3 closes relay contacts ST3–1 (line 235C) and energizes a stepping switch relay solenoid RS3S through normally closed contact S3S–1 of relay RS3S. As soon as contact ST3–1C (line 117) shifts to step No. 1 thereby deenergizing relay RST3, it will be noted that contact ST3–1 (line 235C) will open thereby breaking the circuit to relay solenoid RS3S.

Stepping switch contact ST1–3C (FIG. 27) of bank ST1–3 opens the circuit to relay RK1 (line 49) and closes a circuit to relay RK2 (line 50). Deenergization of relay RK1 opens relay contacts K1–1 (line 259) thereby deenergizing solenoid SOL–K1. Energization of relay RK2 closes contact K2–1 (line 261) thereby energizing solenoid SOL–K2. Energization of solenoid SOL–K2 (FIG. 22) causes four way valve K to shift to the cross passage position thereby directing high pressure fluid through conduit 5R into the right end (FIG. 20) of power unit 5. Thus, the piston rod of power unit 5 returns to the left end of its travel thereby opening limit switch LS5R and closing limit switch LS5L. Opening of limit switch relay contacts 5R–1 (line 318) turns off pilot light PL5R, and closing of limit switch contact 5L–1 (line 317) again turns on pilot light PL5L.

Closing of limit switch contact 5L–4 (line 115) again closes a circuit to stepping switch relay RST3 thereby moving contactor ST3–2C (line 121) to step No. 2. Closing of limit switch contact 5L–3 (line 3) causes energization of stepping switch relays RST1 and RST2 (line 20) thereby moving all contacts of stepping switches ST1 and ST2 to step No. 3. Bank ST1–3 (line 71) of stepping switch ST1 opens the circuit to relay RK2 (line 50) thereby opening relay contact K2–1 (line 261) resulting in the deenergization of solenoid SOL–K2 and return of four-way valve (FIG. 22) to its neutral position. Positioning of stepping switch contact ST3–2C (line 121) at step No. 2 completes a circuit to relay RX1. Energization of relay RX1 closes relay contact X1–1 (line 91) and X1–2 (line 96) which establishes a holding circuit across normally closed relay contacts 145–1 (line 91) and 145–2 (line 95).

During this time the piston rods of power units 1 and 2 (FIG. 20) are moving upwardly at the slow rate of about 0.87 inch per second while the piston rods of power units 3 and 4 are moving downwardly at the same slow rate. After the piston of power unit 2 has moved upwardly a distance sufficient to support the entire load of the baskets in sterilizing housing 24 thereby removing the load from hold dogs 258 and 260, limit switch LS145 is closed. Closing of limit switch LS145 (line 125) energizes limit switch relay R145 thereby closing limit switch relay contacts 145–3 (line 4) and 145–4 (line 41), and opening contacts 145–1 (line 91) and 145–2 (line 95). Closing contact 145–3 (line 4) energizes stepping switch relays RST1 and RST2 thereby causing all stepping switch contacts of stepping switches ST1 and ST2 to shift the fourth step. Closing of contact 145–4 (line 41) energizes pilot light PL1. Opening of relay contact 145–1 (line 91) is ineffective at this time, since relay contact X1–1 is closed and defines a holding circuit across open contact 145–1 for relay RA2 (line 91). Opening of relay contact 145–2 (line 95) is ineffective since relay contact X1–2 (line 95) is closed and provides the necessary holding circuit.

It will be noted that stepping switch contacts ST3–1C and ST3–2C (lines 117 and 120) will not be positioned on the step No. 2 at this time unless the cycle of operation of transfer unit 5 is completed. If such a cycle did not take place, contact X1–1 (line 91) and X1–2 (line 96) would remain open and accordingly relays RA2 and RF1 would be de-energized and further automatic operation would stop. Such a situation can be manually corrected by closing the appropriate push button switch or switches PB–A1 (line 258) or PB–K2 (line 260) thereby energizing the appropriate solenoid SOL–K1 or SOL–K2 to move the transfer power unit piston to the correct position at the left end of its stroke. When the cycle is completed, limit switch LS5L will be closed energizing relay R5L (line 138) causing the light PL5L (line 317) to be energized and relays RA2 (line 91) and RF1 (line 95) to be energized.

Returning to the normal cycle of operation with stepping switches ST1 and ST2 at step No. 4, it will be noted that bank ST2–4 (line 109) of stepping switch ST2 opens the circuit to relay RH1 (line 104) and closes a circuit to relay RG1 (line 105). Deactivation of relay RH1 opens relay contact H1–1 (line 299) thereby deenergizing relay RH1Z which opens relay contact H1Z–1 (line 301). Opening relay contact H1Z–1 deenergizes solenoid SOL–H1 and pilot light PLH1. Energization of relay RG1 closes relay contact G1–1 (line 303) thereby energizing solenoid SOL–G1 and pilot light PLG1.

The de-energization of solenoid SOL–H1 (FIG. 20) causes two way valve H to return to the illustrated open position permitting the flow of hydraulic fluid from main power units 1, 2, 3 and 4 to return to the sump through conduit 554 and through speed control valve SVC1, and also through conduit 588, open valve H and speed control valve SCV2. Energization of solenoid SOL–G1 moves valve G1 from the open position to the closed position thereby preventing free flow of hydraulic fluid from the low pressure pump LP into the sump 514 through valve G. The hydraulic fluid from low pressure pump LP flows through check valve CV5 and into the high pressure main conduit 550 to mingle with the fluid discharged from high pressure pump HP. This increased supply of fluid then flows through the power units 1, 2, 3 and 4, through the previously described conduits causing the piston rods thereof to move at a high speed of approximately 4.75 inches per second as indicated in the FIGURE 23.

Upward movement of the piston rod of the power unit 1 causes limit switch LS145 (line 125) to open and its relay R145 to be de-energized opening contact 145-4 (line 41) turning off pilot light PL1.

The effect of contact ST1-3C of stepping switch bank ST1-3 (line 71) being in step No. 4 is to complete a circuit to relay RR2 (line 51) thereby closing relay contact R2-1 (line 285) and energizing solenoid SOL-R2. Energization of solenoid SOL-R2 (FIG. 22) shifts valve R to the cross passage position thereby directing high pressure fluid into conduits 12C and 13C of hold dog power units 12, 12a and 13, 13a (FIG. 20). The hold dogs 350, 352 and 258, 260 are thus moved to the open position causing limit switches LS12C, LS12aC and LS13C, LS13aC (line 151) to open and limit switches LS12O, LS12aO, LS13O, and LS13aO (line 150) to subsequently close. Opening of any of the limit switches in line 151 de-energizes relay R12C opening relay contact 12C-1 (line 330) thereby turning off pilot light PL12C. When all the limit switches in line 150 are closed, relay R12O is energized. Energization of relay R12O closes relay contacts 12O-1 (line 329) turning on pilot light PL12O, and closes contact 12O-2 (line 5) causes all contacts of stepping switches ST1 and ST2 (line 20) to shift from step No. 4 to step No. 5.

Stepping switch bank ST1-3 (line 71) breaks the circuit to relay RR2 (line 51) and establishes a circuit to relay RM2 (line 55). De-energization of relay RR2 opens contacts R2-1 (line 285) thereby de-energizing solenoid SOL-R2 permitting four-way valve R to return to its neutral position. Energization of relay RM2 closes contact M2-1 (line 269) thereby energizing solenoid SOL-M2. Valve M (FIG. 22) then shifts to the cross passage position causing high pressure hydraulic fluid to flow through conduit 7R into transfer power unit 7 thereby moving its piston rod from its right position to the left position (FIG. 20) causing limit switch LS7R to open and limit switch LS7L to close when the piston subsequently reaches the left end of its stroke. Opening limit switch LS7R (line 143) de-energizes relay R7R thereby opening contact 7R-1 (line 322) turning off pilot light 7R. Closing limit switch LS7L (line 142) energizes relay R7L which closes contact 7L-1 (line 321) thereby lighting pilot light PL7L.

Normally, the above operations take place before the piston rod of power unit 1 (FIG. 20) moves upwardly a distance sufficient to close limit switch LS510. However, if one of these operations is not completed by the time limit switch LS510 is closed, closing of limit switch LS510 (line 126) causes energization of relay R510 which opens normally closed contacts 510-1 (line 91) and 510-2 (line 95) thereby de-energizing relays RA2 and RF1 unless limit switch relay contacts 12O-3 and 7L-2 (line 92) and 12O-4, 7L-3 (line 96) are closed thereby defining a holding circuit across contacts 510-1 (line 91) and 510-2 (line 95). Energization of relay R510 also closes relay contact 510-3 (line 42) thereby causing pilot light PL2 to glow indicating the position of the piston rod of power unit 1.

If the relay RA2 (line 91) and RF1 (line 95) are de-energized and movement of power units 1, 2, 3 and 4 stops, the difficulty can be manually corrected by observing which pilot lights PL12O (line 329) and/or PL7L (line 321) are not glowing and depressing the proper push button switch PB-R2 (line 284) and/or PB-M2 (line 268) energizing the associated solenoid which causes the associated valve to shift to a position to correct the difficulty. When the difficulty is corrected, the relay RA2 (line 91) and relay RF1 (line 95) are energized returning the system to normal operation.

Continuing with the normal cycle of operation, closed limit switch relay contact 7L-4 (line 6) shifts the contacts of stepping switches ST1 and ST2 from step 5 to step 6. Stepping switch bank ST1-3 de-energizes relay RM2 (line 55) and energizes relay RS1 (line 56). De-energization of relay RM2 opens contact M2-1 (line 269) thereby de-energizing solenoid SOL-M2 permitting valve M (FIG. 22) to return to its neutral position. Energization of relay RS1 closes contact S1-1 (line 287) and S1-2 (line 59) thereby energizing solenoid SOL-S1. Energization of solenoid SOL-S1 (FIG. 22) causes four-way valve S to shift to the parallel passage position. High pressure fluid is thus directed through conduits 140, 150 (FIG. 20) thereby moving the piston rods of hold dog power units 14, 14a, 15 and 15a to positions which close the hold dogs 364, 366, 412, and 414. Limit switches LS14O, LS14aO, LS15O and LS15aO (line 152) then open, and when the pistons reach the closed ends of their strokes, limit switches LS14C, LS14aC, LS15C, LS15aC (line 153) close thereby energizing relay R14C.

Opening of any of the limit switches in line 152 de-energizes relay R14O thereby opening contact 140-1 (line 331) turning out pilot light PL14O. Energization of relay R14C closes contact 14C-1 (line 332) thereby energizing pilot light PL14C. Closing of relay contact 14C-2 (line 7) causes the contacts of stepping switches ST1 and ST2 to move from step No. 6 to step No. 7. Bank ST1-3 of stepping switch ST1 then breaks the circuits to relay RS1 (line 56) thereby deenergizing the same and opening contact S1-1 (line 287) deenergizes solenoid SOL-S1 (permitting four-way valve S (FIG. 22) to return to its neutral position.

The piston rod of lifting power unit 1 continues to move upwardly at the high rate of speed until limit switch LS755 (FIG. 20) is closed. Closing of limit switch LS755 (line 127) energizes relay R755. Energization of relay R755 opens normally closed contacts 755-1 (line 91) and 755-2 (line 95), and closes normally open contact 755-3 (line 43) thereby energizing pilot light PL3.

During normal operation, limit switch LS14C is closed prior to the closing of limit switch LS755 thereby closing contacts 14C-3 (line 91) and 14C-4 (line 96) which contacts, if closed, define holding circuits for relays RA2 (line 91) and RF1 (line 95). If the piston rods of power units 14, 14a, 15, 15a are not in proper position to close limit switch contacts 14C-3 (line 91) and 14C-4 (line 96), relays RA2 and RF1 will be de-energized thereby stopping upward movement of the piston rod of power unit 1. Pilot light PL14C (line 332) will be de-energized upon opening of relay contact 14C-1 thereby indicating such a defect to the operator. This situation can be corrected by manually closing push buttons switch PB-S1 (line 286) thereby energizing solenoid SOL-S1 causing valve S (FIG. 22) to shift to the parallel passage position thereby moving the piston rod of power units 14, 14a, 15, 15a to the closed position closing limit switches LS14C, LS14aC, LS15C, LS15aC, (line 153), thereby lighting pilot light PL14C. Relays RA2 (line 91) and RF1 (line 95) are then re-energized upon closing of the holding circuits permitting the normal cycle of operation to continue.

Closing of limit switch LS755 also closes relay contact 755-4 (line 8) thereby causing the contacts of stepping switches ST1 and ST2 to move from step No. 7 to step No. 8. The contactor ST2-4C of bank ST2-4 (line 109) then breaks the circuit to relay RG1 (line 105) and closes the circuit to relay RH1. De-energization of relay RG1 opens contact G1-1 (line 303) thereby de-energizing solenoid SOL-G1 permitting two-way valve G (FIG. 21) to return to the illustrated open position. Energization of relay RH1 causes contact H1-1 (line 299) to close thereby energizing relay RH1Z, closing contact H1Z-1 (line 301) and energizing solenoid SOL-H1 and pilot light PLH1. Energization of solenoid SOL-H1 causes its two-way valve H (FIG. 21) to move to the closed, flow blocking position thereby returning the portion of the hydraulic system associated with main power units 1, 2, 3 and 4 to the slow speed position. The slow speed is necessary to prevent damage to the hold dogs 412 and 414 and housing 26 when the weight of the downwardly moving baskets is transferred from the piston rod of power unit 3 to the holding dogs 412 and 414. This slow speed also permits the upwardly moving piston rod of power unit 1 to gently engage the column of baskets thereabove and lift them free from the holding dogs 254, 256 and 128, 130 in housing 22. As indicated in FIGURE 23, all transfer of baskets between hold dogs and the piston rods of the associated power units 1, 2, 3 and 4 occur while the piston rods of the power units are traveling at their slow speeds.

The contact ST1–3C of stepping switch ST1 is at this time on step No. 8 and accordingly completes a circuit to relay RO1 (line 60). Energization of relay RO1 closes contact O1–1 (line 275) thereby energizing solenoid SOL–O1. Energization of solenoid SOL–O1 causes four-way valve O (FIG. 22) to shift to the parallel passage position thereby directing hydraulic fluid through conduit 9L into power unit 9 (FIG. 20) moving the piston rod toward the right and transferring a basket out of housing 28. Movement of the piston rod of power unit 9 first opens limit switch LS9L and upon reaching the right end of its stroke closes limit switch LS9R.

Opening of limit switch LS9L (line 146) de-energizes relay R9L, and closing of limit switch LS9R (line 147) energizes relay R9R. De-energization of relay R9L opens contact 9L–1 (line 325) thereby turning off pilot light PL9L. Energization of relay R9R closes contact 9R–1 (line 326) thereby lighting pilot light PL9R. Energized relay R9R also closes contact 9R–2 (line 9) thereby causing the contacts of stepping switches ST1 and ST2 to shift from step No. 8 to step No. 9, and closes contact 9R–3 (line 116) causing the contact of stepping switch ST3 to shift from step No. 2 to step No. 3. Relay RX1 (line 120) is thus de-energized thereby opening contacts X1–1 (line 91) and X1–2 (line 96).

In response to closing relay contact 9R–2 (line 9) stepping switches ST1 and ST2 move from step No. 8 to step No. 9. Contact ST1–3C of stepping switch bank ST1–3 at step No. 9 opens the circuit to relay RO1 (line 60) and closes the circuit to relay RO2. De-energization of relay RO1 opens relay contact O1–1 (line 275) thereby de-energizing solenoid SOL–O1 permitting four-way valve O to return to its neutral position. Energization of relay RO2 closes relay contact O2–1 (line 277) thereby energizing solenoid SOL–O2 and shifting valve O (FIG. 22) to the cross passage position. Hydraulic fluid is then directed through conduit 9R into power unit 9 causing the piston rod to return to the left end of its stroke thereby first opening limit switch LS9R and thereafter closing limit switch LS9L. Opening of limit switch LS9R (line 147) closes relay contact 9R–1 (line 326) thereby turning pilot light PL9R off. Closing limit switch LS9L closes contact 9L–1 (line 325) causing pilot light PL9L to glow. Closing limit switch LS9L also closes contact 9L–3 (line 10) and 9L–4 (line 117). Closing of contact 9L–3 (line 10) energizes the relays of stepping switches ST1 and ST2 thereby causing the contacts of the switches to shift from step No. 9 to step No. 10. Closing of contact 9L–4 (line 117) energizes the relay of stepping switch ST3 (FIG. 29) thereby causing the contacts of this switch to shift from position 3 to position 4.

Shifting of stepping switch ST3 to step No. 4 in response to closing of contact 9L–4 causes stepping switch contact ST3–2 (line 121) to energize relay RX2 (line 121). Energization of relay RX2 closes relay contact X2–1 (line 15) which performs a protective function soon to be described.

With the contacts of stepping switches ST1 and ST2 on step No. 10, relay RO2 (line 61) is de-energized thereby opening relay contact O2–1 (line 277) and de-energizing solenoid SOL–O2 permitting four-way valve O (FIG. 22) to return to its neutral position.

As the piston rods of power units 1 and 2 then move to the upper ends of their strokes closing limit switches LS1U and LS2U, and the piston rods of power units 3 and 4 move to the bottom ends of their strokes closing limit switches LS3D and LS4D. Closing of limit switch LS1U (line 128) energizes relay R1U; closing of limit switch LS2U (line 131) energizes relay R2U; closing of limit switch LS3D (line 132) energizes relay R3D; and closing of limit switch LS4D (line 135) energizes relay R4D. When any one or all of the relays R1U, R2U, R3D or R4D become energized, pilot light PL4 (line 44) is lit through the associated closed relay contacts 1U–1, 2U–1, 3D–1 or 4D–1 (lines 44–47). Thus, pilot light PL4 indicates that at least one of the piston rods of power unit 1, 2, 3 or 4 is at the end of its stroke.

Closing of any one of limit switches LS1U, LS2U, LS3D or LS4D and the associated relays, effects the closing of the associated limit switch relay contact 1U–2, 2U–2, 3D–2 or 4D–2 (lines 11 to 14) which completes a circuit to the relays of stepping switches ST1 and ST2 thereby causing the contacts thereof to shift from position 10 to position 11. Also, closing of these limit switches effects closing of contacts 1U–3 (line 310), 2U–3 (line 312), 3D–3 (line 313), and 4D–3 (line 315) thereby lighting the associated pilot lights PL1U, PL2U, PL3D and PL4D.

During normal operation, all the piston rods of power units 1, 2, 3 and 4 reach the appropriate ends of their strokes at the same time. In the event one of the piston rods of power units 1, 2, 3 or 4 does not reach the end of its stroke at the same time as the other piston rods, the automatic movement of this rod will be stopped since the hydraulic fluid is circulated from one power unit to the next and if one power unit stops the flow of hydraulic fluid through the normal flow passages, all piston rods must stop. However, with stepping switch contact ST2–2C (line 93) in step No. 11, the circuit to relay RA2 (line 91) is broken and a circuit to relay RY1 (line 92) is closed. De-energization of relay RA2 opens relay contact A2–1 (line 239) de-energizing relay RA2Z opening contact A2Z–1 (line 241) thereby de-energizing solenoid SOL–A2 permitting four-way valve A (FIG. 21) to return to its neutral position. Energization of relay RY1 (line 92) closes relay contacts Y1–1 (line 173), Y1–2 (line 177), Y1–3 (line 181), and Y1–4 (line 185).

If piston rods of power units 1 and 2 (FIG. 20) are in proper position at the uppermost ends of their strokes at this time, limit switches LS1U and LS2U, respectively, will be closed and the associated limit switch relay R1U and R2U (lines 128 and 131) will be energized thereby opening normally closed contact 1U–4 and 2U–4 (lines 173 and 177) thus maintaining circuits through Y1–1 and Y1–2 to relays RB2 and RC2, respectively open.

Similarly, if the piston rods of power units 3 and 4 are in proper position at the lowermost ends of their stroke at this time, limit switches LS3D and LS4D, respectively, will be closed thereby energizing the associated limit switch relay R3D and R4D (lines 132 and 135). Energization of relay R3D will open normally closed relay contact 3D–4 (line 181) thereby maintaining the circuit which includes contact Y1–3 and relay RD2 open. Energization of relay R4D will open normally closed contact 4D–4 (line 185) thereby maintaining the circuits which includes contact Y1–4 and relay RE2 open.

However, if one of the piston rods is not in its proper position, for example, if the piston rod for power unit 1 (FIG. 20) is not at the upper end of its stroke, limit switch LS1U (line 128) is open and relay R1U is de-energized causing normally closed relay contact 1U–4 (line 173) to energize relay RB2 through a circuit which includes a normally closed limit switch relay contact 6R–1, which remains closed when the piston rod of power unit 6 is in its proper position at the left end of its stroke, the closed contact Y1–1 and closed contact 1U–4. Energization of relay RB2 closes contact B2–1 (line 245) and B2–2 (line 175) thereby energizing solenoid SOL–B2 causing four-way valve B (FIG. 21) to shift to the cross passage position thereby directing hydraulic fluid through conduits 550 and 580 into power unit 1 causing the piston rod to move to proper position at the upper end of its stroke closing limit switch LS1U. Closing of limit switch LS1U results in the opening of contact 1U–4 (line 173) thereby de-energizing relay RB2 and solenoid SOL–B2 permitting valve B to return to its neutral position.

If the piston rod of power unit 2 (FIG. 20) is not in position to close limit switch LS2U, limit switch relay contact 2U–4 (line 177) will be closed and relay RC2 will be energized by closing contact C2–1 (line 249) and C2–2 (line 179). Energizing solenoid SOL–C2 causing four-way valve C to shift to the cross passage position. Hydraulic fluid then flows from conduit 550, through a conduit 590, through the valve C, through a conduit 592, through conduit 574, into the lower end of power unit 2, out of the upper end of power unit 2, through conduits 576 and 594, through the valve C, and into the conduit 552 for return to the sump 514.

If the piston rod of power unit 3 is not in its lowermost position and limit switch LS3D remains open, limit switch relay contact 3D–4 (line 181) will be closed and relay RD2 will be energized thereby closing contact D2–1 (line 253) and D2–2 (line 183) energizing solenoids SOL–D2 causing four-way valve D to shift to the cross passage position. Fluid is then directed into power unit 3 causing its piston rod to move to the lowermost position closing limit switch LS3D thereby de-energizing solenoid SOL–D2 permitting valve D to return to the neutral position.

Similarly, if the piston rod of power unit 4 is not in its lowermost position and limit switch LS4D remains open, limit switch relay contact 4D–4 (line 185) will be closed and relay RE2 will be energized thereby closing contact E2–1 (line 257) and E2–2 (line 187) energizing solenoid SOL–E2 causing four-way valve E to shift to the cross passage position. Fluid is then directed into power unit 4 causing its piston rod to move to its lowermost position closing limit switch LS4D thereby de-energizing solenoid SOL–E2 permitting valve E to return to its neutral position.

With all the piston rods of power units 1, 2, 3, and 4 in proper position, at which time limit switches LS1U, LS2U, LS3D and LS4D are closed, the normal cycle of operation continues. Closing of the above limit switches closes limit switch contacts 1U–5, 2U–5, 3D–5 and 4D–5 (line 15). Relay contact X2–1 is also closed in response to stepping switch ST3 (line 121) being on step 4 as above described thereby indicating that power unit 9 is in its proper position at the left end of its stroke. Thus, with all parts properly positioned, a circuit is completed to stepping switch relays RST1 and RST2 (line 20) causing all contacts of stepping switches ST1 and ST2 to shift from step 11 to step 12. Contact ST1–3C (line 71) of stepping switch bank ST1–3 closes a circuit through normally closed limit switch contact 3U–7 (line 62) to relay RN1. Energization of relay RN1 closes relay contact N1–1 (line 271) thereby energizing solenoid SOL–N1. Energization of solenoid SOL–N1 causes four-way valve N (FIG. 22) to shift to the parallel passage position thereby directing high pressure hydraulic fluid through conduit 8L. The piston rod of power unit 8 then moves toward the right (FIG. 20) moving a basket B from housing 26 to housing 28. This movement causes limit switch LS8L to open, and limit switch LS8R to close when the piston rod reaches the right end of its stroke. Opening of limit switch LS8L (line 144) de-energizes relay R8L causing contact 8L–1 (line 323) to open thereby de-energizing pilot light UL8L. Closing limit switch LS8R (line 145) energizes relay R8R closing contact 8R–1 (line 324) thereby lighting pilot light PL8R. Energization of relay R8R also closes contacts 8R–2 (line 16) and opens contact 8R–3 (line 164).

Closing of contact 8R–2 (line 16) causes the contacts of stepping switches ST1 and ST2 to shift from step No. 12 to step No. 13. Contacts ST1–3C opens the circuit to relay RN1 (line 62) and closes a circuit to relay RN2. De-energization of relay RN1 opens contact N1–1 (line 271) thereby de-energizing solenoid SOL–N1 permitting four-way valve N (FIG. 22) to return to their neutral position. Energization of solenoid RN2 (line 63) closes contact N2–1 (line 273) thereby energizing solenoid SOL–N2 causing valve N (FIG. 22) to shift to the cross passage position directing hyraulic fluid into conduit 8R of power unit 8 thereby returning the piston rod to the left end of its stroke. Limit switch LS8R is thereby opened and limit switch LS8L is closed. Opening of limit switch LS8R causes limit switch relay contact 8R–1 (line 324) to open thereby turning pilot light PL8R off. Closing limit switch LS8L closes contact 8L–1 (line 323) thereby energizing pilot light PL8L, and closes contact 8L–3 (line 17) causing the contacts of stepping switches ST1 and ST2 to shift from step No. 13 to step No. 14.

With the contacts of stepping switches in step 14, relay RN2 (line 63) is de-energized opening contact N2–1 (line 273) thereby de-energizing solenoid SOL–N2 permitting valve N to return to its neutral position. Relay RP2 (line 64) is energized thereby closing relay contact P2–1 (line 281) and energizing solenoid SOL–P2. Energization of solenoid P2 causes four-way valve P (FIG. 22) to shift to the cross passage position directing hydraulic fluid into conduits 10C and 11C of holding dog power unit 10, 10a, 11 and 11a (FIG. 20). The piston rods of the power units 10 and 11 then move from the closed to the open position first opening limit switches LS10C, LS10aC, LS11C, and LS11aC (line 149) and then closing limit switches LS10O, LS10aO, LS11O, and LS11aO (line 148). Opening of limit switches LS10C, LS10aC, LS11C, and LS11aC (line 149) de-energizes relay R10C thereby opening relay contact 10C–1 (line 328) which de-energizes pilot light PL10C. Closing of all the limit switches in line 148 energizes relay R100 which closes contact 100–1 (line 327) energizing pilot light PL100.

The closing of limit switch LS100 also effects the closing of limit switch relay contact 100–2 (line 18) thereby shifting the contacts of stepping switches ST1 and ST2 from step 14 to step 15. Movement of contact ST1–3C from step 14 to step 15 de-energizes relay RP2 (line 64) and energizes relay RR1 (line 68). De-energization of relay RP2 opens contact P2–1 (line 281) thereby de-energizing solenoid SOL–P2 permitting four-way valve P to return to the neutral position. Energization of relay RR1 closes contact R1–1 (line 283) thereby energizing solenoid SOL–R1 causing four-way valve R (FIG. 22) to move to the parallel passage position thereby directing hydraulic fluid into conduits 12O and 13O of holding dog power units 12, 12a, 13 and 13a. The piston rods of the power units then return to the closed position thereby opening limit switches LS12O, LS12aO, LS13O and LS13aO (line 150) and closing limit switches LS12C, LS12aC, LS13C and LS13aC (line 151).

Opening limit switches LS12O, LS12aO, LS13O and and LS13aO (line 150) de-energizes R12O opening contact 12O–1 (line 329) thereby de-energizing pilot light PL12O. Closing all limit switches in line 151 energizes relay R12C which closes contact 12C–1 (line 330) thereby energizing pilot light PL12C. Energization of relay R12C also closes relay contact 12C–3 (line 19) thereby causing the contacts of stepping switches ST1 and ST2 to shift from step 15 to step 16 (FIG. 25) thereby opening the circuit to a relay RR1 (line 68). De-energization of relay RR1 opens contact R1–1 (line 283) thereby de-energizing solenoid SOL–R1 permitting fourway valve R (FIG. 22) to return to the neutral position.

With the contactor ST1–2C of stepping switch bank ST1–2 on step 16, pilot light PL4 is de-energized and pilot light PL5 is energized indicating that all functions have been performed thereby completing the first half cycle of operation, and indicating that the piston rods of power units 1 and 2 are ready to be moved downwardly, and that the piston rods of power units 3 and 4 are ready to be moved upwardly thereby initiating the second half of the cycle of operation.

With contact ST2–2C of stepping switch ST2 in step No. 16, a circuit is closed which includes relay RA1 (line 93), relay contacts 755–5 and 145–5, and a normally closed contact LS101–1 of limit switch LS101 (FIG. 20) that is operated by the piston rod of power unit 1. Energization of relay RA1 closes relay contact A1–1 (line 236) thereby energizing relay RA1Z. Energization of relay RA1Z closes contact A1Z–1 (line 238) thereby energizing solenoid SOL–A1. Energization of solenoid SOL–A1 shifts four-way valve A (FIG. 21) to the parallel passage position.

Contact ST2–3C of stepping switch ST2 completes a circuit to relay RF1 (line 95) through normally closed relay contacts 145–6 and 755–6. Energization of relay RF1 closes contact F1–1 (line 297) thereby energizing solenoid SOL–F1 and lighting pilot light PLF1. Energization of solenoid SOL–F1 shifts two-way valve F (FIG. 21) from the illustrated open position to its passage closing position thereby preventing fluid from flowing therepast. Thus, hydraulic fluid from high pressure pump HP is maintained under high pressure in conduit 550.

Contact ST2–4C of stepping switch ST2 completes a circuit to relay RH1 (line 104) thereby closing contact H1–1 (line 299) energizing relay RH1Z. Energization of relay RH1Z closes relay contact H1Z–1 (line 301) thereby energizing solenoid SOL–H1 and pilot light PLH1. Energization of solenoid SOL–H1 shifts two-way valve H (FIG. 21) into conduit blocking position thereby placing the hydraulic system of FIGURE 20 and 21 into the previously described low speed range.

With valves F and H in their closed position and valve A in its parallel passage position, high pressure hydraulic fluid from pump HP is directed through valve A, through conduit 586, through check valve CV6, through conduits 584 and 582 into the upper end of power unit 1. The fluid below the piston of power unit 1 flows through conduit 580 and check valve CV1. Check valves CV1 and CV2 are energized at this time by a conduit 596 that is connected to conduit 584 thus permitting flow of fluid through the energized check valves in either direction. Check valves CV3 and CV4 are not energized at this time and accordingly blocked the flow of fluid toward the left (FIG. 21). After passing through check valve CV1, the flow of fluid continues through conduits 578 and 576 into the upper end of power unit 2. The fluid below the piston of power unit 2 flows through conduit 574, through energized check valve CV2 through non-energized check valve CV3, and through conduit 572 into the lower end of power unit 3. The hydraulic fluid above the piston of power unit 3 flows through conduit 570, through non-energized check valve CV4, and through conduit 566 into the lower end of power unit 4. The fluid above the piston of power unit 4 flows through conduits 564, energized check valve CV7, conduit 558, the straight passage of valve A, conduit 554, and is returned to the sump 514 through speed control valve SCV1.

The piston rods of power units 1 and 2 then continue to move downwardly at a slow speed of approximately 0.87 inch per second thereby opening limit switches LS1U and LS2U, and the piston rods of the power units 3 and 4 move upwardly at the same slow speed opening limit switches LS3D and LS4D. Opening of limit switches LS1U, LS2U, LS3D and LS4D open the previously described relay controlled circuits to pilot lights PL1U, PL2U, PL3D and PL4D (lines 309 to 312).

The piston rods of power units 1, 2, 3 and 4 continue moving and no additional functions are performed until limit switch LS850 (FIG. 21) is closed by the piston rod of power unit 1. Closing of limit switch LS850 closes normally open switch contact LS850–1 (line 20) causing the contacts of stepping switches ST1 and ST2 to move from step No. 16 to step No. 17.

At this time, stepping switch contact ST1–3C closes a circuit to relay RT2 (line 72). Energization of relay RT2 closes contact T2–1 (line 293) and T2–2 (line 75) thereby energizing solenoid SOL–T2. Energization of solenoid SOL–T2 shifts valve T (FIG. 22) to the cross passage position directing hydraulic fluid into conduits 16C and 17C of holding dog power units 16, 16a, 17 and 17a causing the piston rods to move the associated dogs to the open ends of their strokes. Movement of the piston rods of the power units 16, 16a, 17 and 17a first opens limit switches LS16C, LS16aC, LS17C, and LS17aC (line 155), and upon completion of the stroke, closes limit switches LS16O, LS16aO, LS17O, LS17aO (line 154).

Opening of the limit switches in line 155 de-energizes relay R16C thereby opening contact 16C–1 (line 334) de-energizing pilot light PL16C. Closing limit switches in line 154 energizes relay R16O thereby closing contact 16O–1 (line 333) and energizing pilot light PL16O. Energization of relay R16O also closes relay contact 16O–2 (line 21) causing contacts of stepping switches ST1 and ST2 to move from position 17 to position 18.

Movement of contact ST1–3C from step No. 17 to step No. 18 opens the circuit to relay RT2 (line 72) thereby opening contact T2–1 (line 293) de-energizing solenoid SOL–T2 and permitting valve T to return to its neutral position.

Continued movement of the piston of power units 1, 2, 3 and 4 causes the piston rod of power unit 1 to lower sufficiently to close limit switch LS775 (line 22) thereby causing the contact of stepping switches ST1 and ST2 to shift from step 18 to step 19. Contacts ST1–3C of stepping switch ST1 then close a circuit which energizes relay RM1 (line 76).

Energization of relay RM1 closes relay contact M1–1 (line 267) thereby energizing solenoid SOL–M1. Energization of solenoid SOL–M1 shifts four-way valve M (FIG. 22) to the parallel passage position thereby directing high pressure fluid through conduit 7L into power unit 7 moving the piston rod toward the right (FIG. 20) and transferring a basket from housing 24 to housing 26. Movement of the piston rod of power unit 7 to the right first opens limit switch LS7L and upon completion of its stroke closes limit switch LS7R. Opening of limit switch LS7L causes limit switch relay contact 7L–1 (line 321) to open and pilot light PL7L to de-energize. Closing limit switch LS7R effects the closing of contact 7R–1 (line 322) thereby energizing pilot light PL7R.

Movement of the piston rods continue until after certain of the baskets have been transferred between the dogs and the associated piston rods of power units 1 to 4, and until the piston rod of power unit 1 has moved downwardly a sufficient distance to engage and close limit switch LS755. Closing of limit switch LS755 (line 127) energizes relay R755 which closes contacts 755–3 (line 43), 755–7 (line 23), and 755–8 (line 118); and opens normally closed contacts 755–5 (line 93), 755–2 (line 95) and 755–6 (line 97). Closing of contact 755–3 (line 43) lights pilot light PL6 which indicates that the piston rods of power units 1, 2, 3 and 4 are in position to begin their high speed movement.

Closing of relay contact 755–7 (line 23) causes the contacts of stepping switches ST1 and ST2 to shift from step No. 19 to step No. 20. If the hold dogs in discharge housing 28 are opened as required at this time, limit switch LS16O, LS16aO, LS17O and LS17aO (line 154) will be closed and relay contacts 16O–3 (line 93) and 16O–4 (line 98) will be closed thereby defining holding circuits across open contacts 755–5 (line 93) and 755–6 (line 97) thus maintaining relays RA1 and RF1 energized permitting uninterrupted movement of the pistons of power units 1, 2, 3 and 4.

If the piston rods of power units 16, 16a, 17, and 17a, and the associated hold dogs in column 28 are not open, contacts 160–3 and 160–4 (lines 93 and 98) will be opened thereby breaking the circuit to relay RA1 and RF1 and momentarily stopping the movement of the piston rods of the power units 1, 2, 3 and 4. Piston rods of power units 16, 16a, 17, 17a can be moved to the open position by closing push button switch PB–T2 (line 292) which energizes solenoid SOL–T2 and shifts valve T into the cross passage position thereby moving piston rods of power units 16, 16a, 17, and 17a to the right until limit switches LS16O, LS16aO, LS17O and LS17aO are closed at which time push button switch PB–T2 is released.

Movement of stepping switch contact ST2–4C from step 19 to step 20 opens the circuit to relay RH1 (line 104) and closes a circuit to relay RG1. De-energization of relay RH1 opens contact H1–1 (line 299) de-energizing relay RH1Z which opens contact H1Z–1 (line 301) and de-energizes solenoid SOL–H1 and pilot light PLH1. De-energization of solenoid SOL–H1 causes two-way valve H (FIG. 21) to return to the illustrated open position. Energization of relay RG1 closes relay contact G1–1 (line 303) thereby energizing solenoid SOL–G1 and pilot light PLG1. Energization of solenoid SOL–G1 shifts valve G (FIG. 21) into position to block the free flow of fluid from pump LP into the sump 514. Thus, the portion of the hydraulic system illustrated in the FIGURE 21 is placed in the high speed position causing the piston rods of cylinders to travel at the rate of approximately 4.75 inches per second.

The previous closing of relay contact 755–8 (line 118) causes stepping switch ST3 to move from step 4 to step 5 thereby de-energizing relay RX2 (line 121) opening relay contact X2–1 (line 15). Since steps 5 to 12 of stepping switch bank ST3–1 are connected in a series to main line L3, the contacts of stepping switch ST3 are reset to step 0 and stepping switch ST3 remains inoperative until a new cycle of operation is started.

During this time the piston rod of power unit 7 moves to the right and subsequently closes limit switch LS7R (FIG. 20) which energizes relay R7R (line 143) closing relay contact 7R–1 (line 322) to energize pilot light PL7R, and closes contact 7R–3 (line 24) which shifts the contacts of stepping switches ST1 and ST2 from step 20 to step 21. With contact ST1–3C on step 21 the circuit is broken to relay RM1 (line 76) thereby de-energizing the same, opening contact M1–1 (line 267) and de-energizing solenoid SOL–M1 permitting four-way valve M (FIG. 23) to return to the neutral position.

The piston rods of power units 1, 2, 3 and 4 continue their fast movement until the piston rod of power unit 1 moves downwardly a sufficient distance to close limit switch LS145 thereby returning the valves controlling the main power units to the slow speed conditions and causing the hold dog power units 10, 10a, 11 and 11a to move from the open to the closed position.

In this regard, closing of limit switch LS145 energizes relay R145 (line 125) thereby closing contact 145–7 (line 25) causing the contacts of stepping switches ST1 and ST2 to shift from step 21 to step 22. Closing of relay contact 145–4 (line 41) closes a circuit to pilot light PL7 (line 47) which indicates to the operator that the piston rods of power units 1, 2, 3 and 4 are again in position to commence their slow movement.

Movement of contact ST2–4C of stepping switch bank ST2–4 to step No. 22 energizes relay RH1 (line 104) and de-energizes relay RG1 thereby causing valve H (FIG. 21) to return to its passage blocking position and causing valve G to move to the illustrated open position by means of circuits previously described. Thus, the portion of the hydraulic system disclosed in FIGURE 21 is returned to the slow speed position.

Closing of limit switch LS145 also opens normally closed contact 145–5 (line 93) and 145–6 (line 97) thereby breaking the circuits to relay RA1 (line 93) and RF1 (line 95) and stopping movement of the main cylinders if limit switch LS7R and its associated contacts 7R–4 (line 93) and 7R–5 (line 98) are not closed by the properly positioned piston rod of power unit 7. If the piston rod is not in proper position, this situation can be corrected by closing push buttons switch PB–M1 (line 266). When the piston rod of cylinder 7 is in position to close limit switch LS7R, normal operation of power units 1, 2, 3, and 4 continues.

Movement of stepping switch contact ST1–3C into position 22 closes a circuit to relay RP–1 (line 77). Energizing relay RP1 closes contact P1–1 (line 279) thereby energizing solenoid P1 causing valve P (FIG. 22) to shift to the parallel passage position thereby directing high pressure fluid through conduits 100 and 110 (FIG. 20) causing power units 10, 10a, 11 and 11a to move the associated hold dogs into the illustrated closed position. Movement of the piston rods of power units 10, 10a, 11 and 11a from open to closed position first opens limit switches LS10O, LS10aO, LS11O and LS11aO (line 148), and thereafter closes limit switches LS10C, LS10aC, LS11C and LS11aC (line 149). Opening of the limit switches in line 148 de-energizes relay R10O thereby opening contact 100–1 (line 327) and breaking the circuit to pilot light PL10O. Closing of the limit switches in line 149 energizes relay R10C thereby closing contact 10C–1 (line 328) and lighting pilot light PL10C. Energization of relay R10C also closes contact 10C–3 (line 26) and 10C–4 (line 93).

Closing of contact 10C–3 (line 26) causes the contacts of stepping switches ST1 and ST2 to shift from step 22 to step 23 thereby causing contact ST1–3C to open the circuit to relay RP1 (line 77) permitting valve P to return to its neutral position.

Normal slow movement of the piston rods of power units 1, 2, 3 and 4 then continue until the piston rod of power unit 1 closes limit switch LS101 (FIG. 20) thereby opening normally closed limit switch contact LS101–1 (line 93). If limit switch relay contact 10C–4 (line 93) is not closed at this time by limit switches LS10C, LS10aC, LS11C and LS11aC being closed in response to proper positioning of the piston rods of hold dog power units 10, 10a, 11, 11a, then relay RA1 is de-energized and movement of the piston rods of power units 1, 2, 3, and 4 stops. If such an abnormal condition occurs indicating that the hold dogs in housing 22 are not closed, it can be corrected by closing push button switch PB–P1 (line 278). Closing of limit switch LS101 (FIG. 20) also closes contact LS101–2 (line 48) thereby lighting pilot light PL8.

When limit switches LS10C, LS10aC, LS11C, and LS11aC are closed indicating that all hold dogs in housing 22 are in proper closed position, downward movement of the piston rods of power units 1 and 2 and upward movement of the piston rods of power units 3 and 4 continues. Pilot light PL8 (line 48) is de-energized as soon as limit switch contact LS101–2 opens.

During normal operation the piston rods of power units 1, 2, 3 and 4 all reach the end of their stroke simultaneously. However, if all of these piston rods do not reach the ends of their stroke simultaneously, the piston rods not yet at the ends of their strokes will be hydraulically locked in their non-terminal positions. When any one of the piston rods reach the end of its stroke, the associated limit switch LS1D, LS2D, LS3U or LS4U will be closed, thereby closing the associated relay contact 1D–4, 2D–4, 3U–4 or 4U–4 (lines 27 to 30) causing the contact of stepping switch ST1 and ST2 to move from position 23 to position 24. The appropriate pilot light PL1D, PL2D, PL3U or PL4U (lines 309 to 315) will also be lighted through circuits previously described. Closing of any one of the above limit switches will cause pilot light PL9 (line 48) to de-energize thereby indicating that at least one of the lifting piston rods has completed its cycle of operation.

The contact ST2-2C on step 24 will break the circuit to relay RA1 (line 93) and will complete a circuit to relay RY2 (line 94). De-energization of relay RA1 opens relay contact A1-1 (line 236) thereby de-energizing relay RA1Z opening contact A1Z-1 (line 238) de-energizing solenoid SOL-A1 permitting four way valve A (FIG. 21) to return to its neutral position. Energization of relay RY2 closes relay contact Y2-1 (line 157), Y2-2 (line 161), Y2-3 (line 165) and Y2-4 (line 169). If the piston rods of power units 1, 2, 3 and 4 are all at the proper end of their stroke at this time, normally closed limit switch relay contacts 1D-5 (line 157), 2D-5 (line 161), 3U-5 (line 165) and 4U-5 (line 169) will all be open and accordingly will retain the circuit to relay RB1 (line 156), RC1 (line 160), RD1 (line 164) and RE1 (line 168) open.

If the piston rod of power units 1, for example, is not at the lower end of its stroke, normally closed limit switch contact 1D-5 (line 176) will remain closed thereby energizing relay RB1 and closing contact B1-1 (line 243) and B1-2 (line 159) energizing solenoid SOL-B1. Energization of solenoid SOL-B1 shifts valve B (FIG. 21) to the parallel passage position permitting hydraulic fluid to enter the upper end of power unit 1 and move the piston thereof to the lower end of its stroke. Upon reaching the lower end of its stroke, the piston rod of power unit 1 closes limit switch LS1D, opening contact 1D-5 (line 157) and de-energizing relay RB1 thereby permitting valve B to return to its neutral position.

If the piston rod of power unit 2 is not at the lower end of its stroke, normally closed limit switch relay contact 2D-5 (line 161) will remain closed thereby energizing relay RC1 and closing contacts C1-1 (line 247) and C1-2 (line 163) thus energizing solenoid SOL-C1. Energization of solenoid SOL-C1 shifts valve C (FIG. 21) to the parallel passage position permitting hydraulic fluid to enter the upper end of power unit 2 and move the piston thereof to the lower end of its stroke. Upon reaching the lower end of its stroke, the piston rod of power unit 2 closes limit switch LS2D, opening contact 2D-5 (line 161) and de-energizing relay RC1 permitting the valve C to return to its neutral position.

If the piston rod of power unit 3 is not at the upper end of its stroke, normally closed limit switch contact 3U-5 (line 165) will remain closed thereby energizing relay RD1 if the normally closed contact 8R-3 remains closed, as will be the case if the piston rod of power unit 8 is not in its proper position at the left end of its stroke as indicated in FIGURE 20. Energization of relay RD1 closes relay contact D1-1 (line 251) and D1-2 (line 167) thereby energizing solenoid SOL-D1. Energization of solenoid SOL-D1 shifts valve D (FIG. 21) to the parallel passage position permitting hydraulic fluids to enter the lower end of power unit 3 and move the piston thereof to the upper end of its stroke. Upon reaching the upper end of its stroke, the piston rod of power unit 3 closes limit switch LS3U, opening contact 3U-5 (line 165) and de-energizing relay RD1 permitting the valve D to return to the neutral position.

If the piston rod of power unit 4 is not at the upper end of its stroke, normally closed limit switch contact 4U-5 (line 169) will remain closed thereby energizing relay RE1. Energization of relay RE1 closes relay contact E1-1 (line 255) and E1-2 (line 171) thereby energizing solenoid SOL-E1. Energization of solenoid SOL-E1 shifts valve E (FIG. 21) to the parallel passage position permitting hydraulic fluid to enter the lower end of power unit 4 and move a piston rod thereof to the upper end of its stroke. Upon reaching the upper end of its stroke, the piston rod of power unit 4 closes limit switch LS4U, opening contact 4U-5 (line 169) and de-energizing relay RE1 permitting the valve E to return to the neutral position.

With all the piston rods at the appropriate ends of their strokes, limit switch relay contacts 1D-6, 2D-6, 3U-6 and 4U-6 (line 31) will all be closed thereby completing a series circuit to stepping switch ST1 and ST2 causing the contacts thereof to shift from step 24 to step 25. Movement of stepping switch contact ST2-2C from step 24 to step 25 de-energizes relay RY2 (line 94) thereby opening contact Y2-1 (line 157), Y2-2 (line 161), Y2-3 (line 165) and Y2-4 (line 169). Movement of contact ST2-4C from step 24 to step 25 de-energizes relay RH1 (line 104) thereby opening contact H1-1 (line 299) de-energizing relay RH1Z which opens contact H1Z-1 (line 301). Opening of contact H1Z-1 de-enerizes solenoid SOL-H1 and pilot light PLH1. De-energization of solenoid SOL-H1 permits two-way valve H (FIG. 21) to return to the illustrated open position. Movement of relay contact ST2-3C to step 25 de-energizes relay RF1 thereby opening contact F1-1 (line 297) de-energizing solenoid SOL-F1 permitting valve F to return to its illustrated open position thereby permitting hydraulic pump motor MOT-1 to operate a minimum load since the fluid discharge by high pressure pump HP flows freely through valve F into sump 514, and hydraulic fluid from pump LP flows freely through open valve G to sump 514. The portion of the hydraulic system shown in FIGURE 21 remains in this condition until a new cycle of operation is initiated.

With contact ST1-3C on step 25 a circuit is completed to relay RL1 (line 81) through normally closed relay contact 1U-6 of limit switch LS1U. Thus, if limit switch LS1U is open indicating that the piston rod of power unit 1 is improperly positioned at its uppermost position, relay RL1 will not be energized. With the parts in proper position and contact 1U-6 closed, energization of relay RL1 closes relay contact L1-1 (line 263) thereby energizing solenoids SOL-L1. Energization of solenoid SOL-L1 shifts valve L (FIG. 22) to the parallel passage position thereby directing high pressure fluid through conduit 6L into power unit 6 causing the piston rod thereof to move to the right thereby transferring a basket from housing 22 to housing 24. As the piston rod of power unit 6 moves toward the right end of its stroke on the limit switch LS6L is first opened and limit switch LS6R is then closed. Opening of limit switch LS6L (line 140) de-energizes relay R6L thereby opening contact 6L-1 (line 319) and de-energizing pilot light PL6L. Closing limit switch LS6R (line 141) energizes relay R6R which closes contact 6R-2 (line 320) thereby energizing pilot light PL6R. Energization of relay R6R also closes contact 6R-3 (line 32) thereby completing a circuit to stepping switch ST1 and ST2 causing the contacts thereof to move from step 25 to step 26.

Movement of contact ST1-3C from step 25 to step 26 de-energizes relay RL1 (line 81) and energizes relay RL2. De-energization of relay RL1 will open contact L1-1 (line 263) thereby de-energizing solenoid SOL-L1 permitting valve L (FIG. 22) to return to its normal position. Energizing relay RL2 closes relay contact L2-1 (line 265) thereby energizing solenoid SOL-L2 causing valve L (FIG. 22) to move to the cross passage position. High pressure hydraulic fluid is then directed through conduit 6R into power unit 6 (FIG. 20) causing the piston rod thereof to return to the left end of its stroke opening limit switch LS6R and closing limit switch LS6L.

Opening of limit switch LS6R causes limit switch contact 6R-2 (line 320) to open thereby de-energizing pilot light PL6R. Closing limit switch LS6L causes the contact 6L-1 (line 319) to close thereby lighting pilot light PL6L. Closing of limit switch LS6L also closes contact 6L-3 (line 33) causing the contact of stepping switches ST1 and ST2 to move from step 26 to step 27.

Movement of contact ST1-3C from step 26 to step 27 de-energizes relay RL2 (line 82) and energizes relay RS2. De-energization of relay RL2 permits four-way valve L to return to its neutral position. Energization of relay RS2 closes contact S2–1 (line 289) and closes contact S2–2 (line 86) thereby energizing solenoid SOL–S2. Energization of solenoid SOL–S2 causes valve S (FIG. 22) to shift to the cross passage position thereby directing hydraulic fluid through conduits 14C and 15C into holding dog power units 14, 14a, 15, and 15a (FIG. 20). The piston rods of power units 14, 14a, 15, and 15a are thereby moved from the closed to the open position thus opening limit switch LS14C and closing limit switch LS14O.

Opening limit switches LS14C, LS14aC, LS15C, and LS15aC (line 153) effects the opening of contact 14C–1 (line 332) thereby de-energizing pilot light PL14C. Closing limit switch LS14O, LS14aO, LS15O and LS15aO closes contact 140–1 (line 331) thereby lighting pilot light PL14O. Closing the limit switches in line 154 also closes limit switch relay contact 14O–3 (line 34) thereby closing a circuit to stepping switches ST1 and ST2 causing the contacts thereof to move from step 27 to step 28.

Movement of contact ST1–3C from step 27 to step 28 de-energizes relay RS2 (line 83) and energizes relay RT1 (line 87). De-energization of relay RS2 causes contact S2–1 (line 289) to open thereby de-energizing solenoid SOL–S2 and returning the valve S (FIG. 22) to its neutral position. Energization of relay RT1 closes relay contact T1–1 (line 291) and T1–2 (line 90) thereby energizing solenoid SOL–T1 which moves valve T (FIG. 22) to the parallel passage position causing high pressure hydraulic fluid to flow through conduits 16O and 17O into holding dog power units 16, 16a, 17, and 17a. The piston rods of power units 16, 16a, 17 and 17a, are thereby moved from the open to the closed position causing limit switches LS16O, LS16aO, LS17O, and LS17aO (line 154) to open and limit switches LS16C, LS16aC, LS17C, and LS17aC (line 155) to close. Opening of the limit switches in line 154 opens contact 16O–1 (line 333) thereby de-energizing pilot light PL16O, and closing of all the limit switches in line 155 effects the closing of relay contact 16C–1 (line 334) causing the energization of pilot light PL16C.

Closing of limit switches in line 155 also causes the closing of limit switch relay contact 16C–3 (line 294) thereby completing a circuit to relay R–T1M of a timer, which timer was previously set to provide a predetermined desired time for each cycle of operation in accordance with the product being processed.

The timer may be of any standard well known design such as Style D, Catalogue No. 84920D32, as manufactured by Allen Bradley, 1136 W. Greenfield Ave., Milwaukee, Wis.

As indicated in the chart of FIGURE 23, the movements which take place during each cycle of operation occur within approximately the first 54 seconds of each cycle. The baskets then remain stationary until the timer indicates that the predetermined cycle time has been completed for one cycle of operation, at which time relay contact T1M–1 (line 35) closes thereby closing the circuits to relays RST1 and RST2 of stepping switches ST1 and ST2 returning the contacts thereof to the O position.

A new cycle of operation then begins since all of the relay contacts in line 1 are closed including contact ST–3 which remains closed unless relay RST (line 122) is de-energized by opening normally closed stop switch PB–SP1 (line 123).

BASKET LOADING OPERATION

The hydraulic system 510 (FIGS. 10–22) and the electrical control system 512 (FIGS. 24–36) also include means for loading the vertical housings 22, 24, 26 and 28 (FIG. 20) from their lower ends with baskets B. The baskets are manually placed one at a time in elevating position at the bottom of the housings after first removing the associated flanged caps 342 (FIGS. 9 and 10).

In order to load baskets B into any one of the empty columns, the piston rods of the several power units must be in position to close limit switches LS1D, LS2D, LS3D, LS4D, LS5D, LS6L, LS7R, LS8L, LS9L, LS10C, LS10aC, LS12C, LS12aC, LS14C, LS14aC, LS15C, and LS15aC. Power at 110 volts is then introduced into main lines L1 and L2, power at 48 volts is introduced into main lines L3 and L4, and hydraulic pump motors MOT–1 (FIG. 21) and MOT–2 (FIG. 22) are started thereby placing the high pressure pump HP, the low pressure pump LP, and the transfer pump TP in operation.

Start switch PB–ST3 (line 305) is first closed thereby energizing relay RY4 which closes holding contacts Y4–1, (line 306) and Y4–2 (line 308) thereby energizing solenoid SOL–W1 and pilot light PLW1. Energization of solenoid SOL–W1 causes two-way valve W (FIG. 22) to shift to the conduit blocking position making high pressure fluid available for the transfer and holding dog power units.

If, for example, housing 22 is to be filled, a basket is manually placed in elevating position on the piston rod of power unit 1. Start switch PB–MV1 (line 190) is closed thereby closing a circuit which includes normally closed contact 145–9 (line 190) thereby energizing relay RZ2. Energized relay RZ2 closes holding contacts Z2–1 and Z2–2 (line 188), Z2–3 (line 191), and Z2–4 (line 192). Closing of relay contact Z2–4 energizes relay RZ3 (line 192) through a circuit which includes closed contacts 1D–8, 10C–5, Z2–4 and normally closed contact 1U–7. Energization of relay RZ3 closes relay holding contact Z3–1 (line 193), Z3–2 (line 172) and Z3–3 (line 65). Closed relay contact Z2–1 and Z2–2 (line 188) energizes relay RZ1 through a circuit which includes closed relay contacts 1D–9 and 10C–6 (line 188).

Energization of relay RZ1 closes relay contact Z1–1 (line 96), Z1–2 (line 79), Z1–3 (line 106), Z1–4 (line 158) and Z1–5 (line 189). Closing of contact Z1–1 (line 96) energizes relay RF1 closing relay contact F1–1 (line 297). Closing of contact F1 energizes solenoid SOL–F1 and lights pilot light PLF1. Closing of contact Z1–3 (line 106) energizes relay RH1 (line 104) thereby closing contact H1–1 (line 299) energizing relay RH1Z. Energization of relay RH1Z closes relay contact H1Z–1 (line 301) thereby energizing solenoid SOL–H1 and pilot light PLH1. Thus, two-way valves F and H (FIG. 21) shift to the passage blocking position making high pressure hydraulic fluid available for slow speed operation of the lifting hydraulic system.

Closing of relay contact Z3–2 (line 172) energizes relay RB2 through a circuit which includes normally closed relay contact 6R–1. Energization of relay RB2 closes contact B2–1 (line 245) thereby energizing solenoid SOL–B2 causing four-way valve B (FIG. 21) to move to the cross passage position moving the piston of power unit 1 from the lower end of its stroke to the upper end thereof. Opening of limit switch contact 1D–1 (line 309) de-energizes pilot light PL1D. Relay RZ1 (line 188) and RZ3 (line 192) remains energized through normally closed switches 1D–7 (line 189) and 1U–7 (line 192).

When the piston of power unit 1 (FIG. 20) moves upwardly a sufficient amount to close limit switch LS145, relay R145 (line 125) is energized which closes contact 145–8 (line 65) and completes a circuit to relay RP2 through a circuit which includes closed contact Z3–3 and normally closed contact 10O–3. Energization of relay RP2 closes contact P2–1 (line 281) thereby energizing solenoid SOL–P2 causing four-way valve P (FIG. 22) to shift to the cross passage position. Hydraulic fluid is then directed into conduits 10C and 11C causing the piston rods of power units 10, 10a, 11 and 11a to move the hold dogs in inlet housing 22 to the open position thereby opening limit switches LS10C, LS10aC, LS11C, and LS11aC (line 149) and closing limit switches LS10O, LS10aO, LS11O, and LS11aO (line 148). Opening of normally closed relay contact 10O–3 (line 65) de-energizes relay RP2 causing four-way valve P to return to its neutral position.

When the piston of power unit 1 closes limit switch LS145, normally closed contact 145–9 (line 190) is opened thereby de-energizing relay RZ2. When the piston of power unit 1 reaches the upper end of its stroke, limit switch LS1U is closed thereby opening normally closed limit switch relay contact 1U–7 (line 192) de-energizing relay RZ3 (line 192). De-energization of relay RZ3 opens relay contact Z3–2 (line 172) thereby de-energizing relay RB2 since contact 1U–4 is also open at this time. De-energization of relay RB2 opens contact B2–1 (line 245) thereby de-energizing solenoid SOL–B2 permitting four-way valve B to return to the neutral position stopping movement of the piston rod of power unit 1 in its uppermost position.

With the piston rod of power unit 1 in its uppermost position, limit switch relay contact 1U–8 (line 79), 10O–4, normally closed contact 10C–7 and relay contact Z1–2 cooperate to close a circuit thereby energizing relay RP1 (line 77). Energization of relay RP1 closes contact P1–1 (line 279) thereby energizing solenoid SOL–P1 causing four-way valve P (FIG. 22) to shift to the parallel passage position, causing the piston rods of power units 10, 10a, 11 and 11a to return the holding dogs in housing 22 to the closed position, and causing limit switches LS10O, LS10aO, LS11O, and LS11aO, (line 148) to open, and limit switches LS10C, LS10aC, LS11C, and LS11aC to close.

Closing of limit switches in line 149 causes normally closed limit switch relay contact 10C–7 (line 78) to open thereby de-energizing relay RP1, de-energizing solenoid SOL–P1 (line 278) and allowing four-way valve P (FIG. 22) to return to its neutral position. Closing of limit switch relay contact 10C–8 (line 158) closes a circuit to relay RB1 which includes closed relay contacts 1U–9, Z1–4 and normally closed contact 1D–5. Energization of relay RB1 closes relay holding contact B1–2 (line 159) and closes contact B1–1 (line 243) thereby energizing solenoid SOL–B1 shifting valve B (FIG. 21) to the parallel passage position.

The piston of power unit 1 then returns to its lowermost position opening limit switch LS1U (FIG. 20) and closing limit switch LS1D. Closing of limit switch LS1D, opens normally closed limit switch relay contact 1D–5 (line 157) thereby de-energizing relay RB1 and solenoid SOL–B1 (line 242) permitting the valve B to return to its neutral position. Opening of normally closed relay contact 1D–7 (line 189) de-energizes relay RZ1 opening contacts Z1–1 (line 96) thereby de-energizing relay RF1. De-energization of relay RZ1 also opens contact Z1–3 (line 106) thereby de-energizing relay RH1 (line 104).

De-energization of relay RF1 opens contact F1–1 (line 297) thereby de-energizing solenoid SOL–F1 causing two-way valve F (FIG. 21) to return to the illustrated conduit opening position. De-energization of relay RH1 (line 104) opens contact H1–1 (line 299) thereby de-energizing relay RH1Z which opens contact H1Z–1 (line 301) de-energizing solenoid SOL–H1. Thus, the machine is ready to have another basket placed manually on the piston rod of the power unit 1, and another loading cycle of operation can then be initiated by closing push button switch PB–MV1 (line 190). The above operation is repeated for each basket in turn until the housing 22 is filled with the proper number of baskets.

The housings 24, 26 and 28 are initially filled with baskets from the lower end thereof by circuitry which is similar to that described above in regard to the filling of housing 22, and accordingly will not be described in detail. However, the relays and relay contacts are illustrated in the drawings and are given reference numbers which are similar to those used in rgeard to filling housing 22. It will suffice to say that the start switch PB–MV2 (line 196), relays RZ4, RZ5, RZ6 (lines 194–198) relay RC1 (line 160), and relay RC2 (line 176), and their contacts control the filling of housing 24; start switch PB–MV3 (line 202), relays RZ7, RZ8 and RZ9 (lines 200–204), relay RD1 (line 164) and relay RD2 (line 180), and their contacts control the filling of housing 26; and start switch PB–MV4 (line 208), relays RZ10, RZ11 and RZ12 (lines 206 to 210), relay RE1 (line 168) and relay RE2 (line 184) and their contacts control the filling of housing 28. It will also be noted that whereas certain relay contacts of limit switch LS145 performed certain functions in the basket loading operation of chamber 22, that limit switches LS2145, LS3145 and LS4145 (FIG. 20) and their associated relays and relay contacts form equivalent functions when loading housings 24, 26, and 28, respectively. In this regard it will be noted that closing of limit switch LS2145 (line 130) energizes relay R2145; closing of limit switch LS3145 (line 133) energizes relay R3145; and energization of limit switch LS4145 (line 136) energizes relay R4145.

With all the housings filled with the desired number of baskets, stop switch PB–SP3 (line 306) is opened thereby de-energizing relay RY4, opening Y4–2 (line 308) causing the de-energization of relay solenoid SOL–W1. De-energization of solenoid SOL–W1 causes two-way valve W (FIG. 22) to return to the illustrated open position.

UNLOADING OPERATION

The hydraulic system 510 (FIGS. 20–22) and electrical control system 512 (FIGS. 24–36) also includes the means for controlling the lowering of all baskets in the housings 22, 24, 26 and 28 so that they can be manually removed from the lower end thereof through ports which are normally closed by the flanged caps 342 (FIGS. 9 and 10).

Before starting the basket unloading operation, the piston rods of several power units are positioned so as to close limit switches LS1D, LS2D, LS3D, LS4D, LS5L, LS6L, LS7L, LS8L, LS9L, LS10C, LS10aC LS11C, LS11aC, LS12C, LS12aC, LS13C, LS13aC, LS14C, LS14aC, LS15C, LS15aC, LS16C, and LS16aC. Power of the appropriate voltage is then supplied to main lines L1, L2, L3 and L4 and motors MOT–1 (FIG. 21) and MOT–2 (FIG. 22) are started thereby driving hydraulic pumps HP, LP and TP.

Start switch PB–ST3 (line 305) is first closed thereby energizing relay RY4 which closes holding contact Y4–1 (line 306) and Y4–2 (line 308) thereby energizing solenoid SOL–W1 and pilot light PLW1. Energization of the solenoid SOL–W1 causes two-way valve W (FIG. 22) to shift to the conduit blocking position making high pressure fluid available for the transfer and holding dog power units.

If, for example, it is desired to unload all baskets from the inlet housing 22, start switch PB–ML1 (line 214) is closed after first determining that no baskets are supported on the piston rod of power unit 1. Closing of start switch PB–ML1 completes a circuit to relay RZ14 through normally closed relay contact 145–10 of limit switch LS145. Energization of relay RZ14 closes holding circuit contact Z14–1 (line 215), closed contacts Z14–2 and Z14–3 (line 212) and closes contact Z14–4 (line 174). Closing of contact Z14–3 thereby (line 212) completes a circuit through closed relay contacts 10C–9 and 1D–10 to relay RZ13 (line 212). Energization of relay RZ13 closes relay contacts Z13–1 (line 100), Z13–2 (line 66), Z13–3 (line 110), holding contact Z13–4 (line 213) and relay contact Z13–5 (line 216).

Closing of contact Z14–4 (line 174) establishes a circuit to relay RB2 through normally closed contacts 1U–4 and 6R–1, closed limit switch relay contacts 1D–11 and 10C–10 and contact Z14–4. Energization of relay RB2 closes relay contact B2–1 (line 245) thereby energizing solenoid SOL–B2 causing four-way valve B (FIG. 21) to shift to the cross passage position.

Closing of relay contact Z13–1 (line 100) and Z13–3 (line 110) energizes relays RF1 (line 95) and RH1 (line 104). Energization of relay RF1 closes contact F1–1 (line 297) thereby energizing solenoid SOL–F1 and lighting pilot light PLF1. Energization of relay RH1 closes contact H1–1 (line 299) thereby energizing relay RH1Z closing contact H1Z–1 (line 301) energizing solenoid SOL–H1 and pilot light PLH1. Thus, valves F and H (FIG. 21) shift from the open to the closed position and hydraulic fluid is directed through valve B into the lower end of power unit 1 causing the piston rod thereof to move upwardly.

Upon movement of the piston rod of power unit 1 limit switch LS1D opens, de-energizing the associated relay, and limit switch LS1U closes energizing the associated relay. Opening of normally closed limit switch relay contact 1U–4 (line 173) de-energizes relay RB2 opening contact B2–1 (line 245) thereby de-energizing solenoid SOL–B2 permitting valve B to return to the neutral position.

Closing of relay contact 1U–10 (line 66), which contact is in series with closed contacts 10C–11, Z13–2, and normally closed contact 10O–3, causes the energization of relay RP2 (line 64). Energization of relay RP2 closes contact P2–1 (line 281) thereby energizing solenoid SOL–P2 causing four-way valve P (FIG. 22) to shift to the cross passage position. Power units 10, 10a, 11, and 11a then cause their piston rods to move from the closed to the open positions thereby opening limit switches LS10C, LS10aC, LS11C, and LS11aC, and closing limit switches LS10O, LS10aO, LS11O and LS11aO (FIG. 21). Closing of limit switch relay contact 10O–5 (line 216) closes a circuit to relay RZ15 which circuit includes closed relay contact 1U–11, closed contat Z13–5, and normally closed contact 1D–13. Energization of relay RZ15 closes contact Z15–2 (line 156) thereby energizing relay RB1. Energization of relay RB1 closes contact B1–1 (line 243) thereby energizing solenoid SOL–B1 causing valve B (FIG. 21) to shift to the parallel passage position directing hydraulic fluid into the upper end of power unit 1 causing the piston rod to move downwardly.

When the piston of power unit 1 moves downwardly a sufficient distance to close limit switch LS145, limit switch relay contact 145–11 (line 78) closes to complete a circuit to relay RP1 which circuit includes relay contact Z15–3 and normally closed limit switch relay contact 10C–7. Energization of relay RP1 closes contact P1–1 (line 279) energizing solenoid SOL–P1 thereby shifting four-way valve P (FIG. 22) to the parallel passage position causing the piston rods of power units 10, 10a, 11 and 11a to return to the closed position thereby opening limit switches LS10O, LS10aO, LS11O and LS11aO, and closing limit switches LS10C, LS10aC, LS11C and LS11aC. Opening of normally closed limtt switch relay contact 10C–7 (line 78) de-energizes relay RP1 causing contact P1–1 (line 279) to open and de-energize solenoid SOL–P1 permitting valve P (FIG. 22) to return to the neutral position. With limit switch LS145 closed, normally closed limit switch relay contact 145–10 (line 214) opens thereby de-energizing relay RZ14.

When the piston rod of power unit 1 moves to its lowermost position, limit switch LS1D is closed thereby opening normally closed contact 1D–12 (line 213) causing relay RZ13 to de-energize since relay contact Z14–2 (line 212) is also open at this time. Opening of normally closed relay contact 1D–13 (line 216) de-energizes relay RZ15. Opening of relay contact Z15–2 (line 156) de-energizes relay RB1 opening contact B1–1 (line 243) de-energizing solenoid SOL–B1 and permitting valve B to return to its neutral position. The previous de-energization of relay RZ13 (line 212) opens contact Z13–1 (line 100) and Z13–3 (line 110) thereby de-energizing relays RF1 (line 95) and RH1 (line 104). De-energization of relay RF1 and relay RH1 opens relay contact F1–1 (line 297) de-energizing solenoid SOL–F1, and opening contact H1–1 (line 299) de-energizing relay RH1Z which opens relay contact H1Z–1 (line 301) to de-energize solenoid SOL–H1. Thus, valves F and H (FIG. 21) return to their starting positions illustrated in FIGURE 21. After the lowered basket has ben removed from the inlet housing 22, actuation of start switch PB–ML1 (line 214) will initiate another unloading cycle. The above described unloading cycle is then repeated until all baskets have been removed from the inlet housing 22.

Similar circuits are provided to control the basket unloading operations of housings 24, 26 and 28. Because of the close similarity of the circuits and the unloading circuit just described, the unloading circuits associated with housings 24, 26 and 28 will not be described in detail although they are illustrated in drawings and are given reference numerals which correspond to the numerals assigned to the unloading circuit described above. It will suffice that the circuit controlling the unloading of housing 24 is controlled by start switch PB–ML2 (line 220), limit switch LS2145 (FIG. 20), relays RZ16, RZ17 and RZ18 (lines 218–222), relay RC1 (line 160), and relay RC2 (line 176) and their associated contacts; the circuit controlling the unloading housing 26 is controlled by start switch PB–ML3 (line 226), limit switch LS3145 (FIG. 20) relays RZ19, RZ20, and RZ21 (lines 224–228), relay RD1 (line 164) and relay RD2 (line 180) and their associated contacts; and, the circuit controlling the unloading of housing 28 is controlled by start switch PB–ML4 (line 232) limit switch SL4145 (FIG. 20), relays RZ22, RZ23 and RZ24 (lines 230 to 234), relay RE1 (line 168) and relay RE2 (line 184) and their associated contacts.

When all of the housings 22, 24, 26 and 28 are empty, stop switch PB–SP3 (line 306) is momentarily opened de-energizing relay RY4, opening contact Y4–2 (line 308) thereby de-energizing solenoid SOL–W1 since at this time relay contact W1–1 (line 307) is open. Thus, two-way valve W (FIG. 22) returns to the passage opening position permitting the hydraulic fluid to be freely circulated by pump TP. The motors MOT–1 and MOT–2 may then be de-energized and power may be disconnected from the 110 volt and 48 volt circuits thereby completing the unloading operation.

From the foregoing description it is apparent that the pressure cooker of the present invention features a conveying system comprising a series of unlinked baskets which are moved through the cooker by plurality of basket elevating jacks, basket transferring jacks, and holding dogs. Because the baskets are unlinked, the baskets in one sterilizing housing may be transferred to the next sterilizing housing either at their upper ends or intermediate their ends.

A hydraulic system is provided which is arranged to apply the weight of the downwardly moving columns of baskets to the upwardly moving baskets in other columns thereby reducing the amount of pressure required from the hydraulic pumps to raise the upwardly moving columns of baskets. Also, the conveying system is controlled by the hydraulic system and the cooperating electrical system so that the several housings may be filled with baskets or emptied of baskets from the lower ends of the housings.

The invention having thus been described, what is believed to be new and desired to be protected by Letters Patent is:

1. A continuous pressure cooker comprising means defining a first processing chamber having a heat transfer medium under pressure therein, inlet sealing means communicating with said chamber for maintaining the high pressure atmosphere within said chamber, outlet sealing means communicating with said chamber for maintaining the high pressure atmosphere within said chamber, conveying means for progressively moving articles along a predetermined path through said inlet sealing means, through said processing chamber, and through said outlet sealing means without a substantial loss of pressure from said first processing chamber, said conveying means including a series of unlinked baskets and means for moving said unlinked baskets along said predetermined path, said processing chamber being elongated and being connected to said inlet sealing means and to said outlet sealing means at one end thereof, partition means dividing said processing chamber into two communicating parts with the baskets in one part moving in the opposite direction from the baskets in the other part, and means included in said conveying means for transferring the baskets from one of said communicating parts to the other part of said processing chamber, said transferring means being located intermediate the ends of said processing chamber whereby the length of the path of movement of the baskets is shortened thereby reducing the processing time.

2. An apparatus according to claim 1 wherein means are provided in said two parts of said processing chamber for supporting a series of empty baskets in positions displaced from the path of movement of the baskets being transferred intermediate the ends of said processing chamber.

3. A continuous pressure cooker comprising means defining a first processing chamber having a heat transfer medium under pressure therein, inlet sealing means communicating with said chamber for maintaining the high pressure atmosphere within said chamber, outlet sealing means communicating with said chamber for maintaining the high pressure atmosphere within said chamber, conveying means for progressively moving articles along a predetermined path through said inlet sealing means, through said processing chamber, and through said outlet sealing means without a substantial loss of pressure from said first processing chamber, said conveying means including a series of unlinked baskets and means for moving said unlinked baskets along said predetermined path, said processing chamber being elongated and being connected to said inlet sealing means and to said outlet sealing means at one end thereof, partition means dividing said processing chamber into two communicating parts with the baskets in one part moving in the opposite direction from the baskets in the other part, and means included in said conveying means for transferring the baskets from one of said communicating parts to the other part of said processing chamber, said inlet sealing means being a vertically extending water filled open ended inlet housing and said outlet sealing means being a vertically extending water filled open ended outlet housing through which the baskets are passed; said conveying means including a first hydraulic jack for vertically moving a column of draulic jack for vertically moving another column of baskets in said inlet housing in one direction, another hybaskets in said outlet housing in the opposite direction, a hydraulic system for supplying hydraulic fluid under pressure to said hydraulic jacks, and control means in said hydraulic system for directing the hydraulic fluid discharged from said downwardly moving hydraulic jack into said upwardly moving hydraulic jack to aid in lifting the baskets supported thereon.

4. An apparatus according to claim 3 wherein said control means includes speed control means for varying the speed of said jacks during vertical movement of the baskets in said inlet and outlet housings for causing said jacks to move slowly near the ends of their strokes and for moving at higher rates of speed during the remaining portions of their strokes.

5. An apparatus according to claim 3 wherein said transferring means is located intermediate the ends of said processing chamber for processing products requiring short processing periods, and wherein said control means is provided with a timer for providing additional control over the length of the processing period.

6. A continuous pressure cooker and cooler comprising means defining a vertically extending water filled inlet housing; means defining a vertically extending first sterilizing housing communicating with said water filled housing at its lower end and having a heating medium under high pressure therein; means defining a vertically extending second sterilizing housing communicating with said first sterilizing housing and having a heating medium under high pressure therein; means defining a vertically extending water filled outlet housing; and conveying means for moving articles to be processed along a predetermined path progressively through said inlet housing, said first sterilizing housing, said second sterilizing housing and said outlet housing; said conveying means including a series of unlinked baskets and means for moving said baskets along said predetermined path; said conveying means further including a hydraulic jack in each housing for raising and lowering the column of baskets therein with two of said jacks moving upwardly while another two of said jacks move downwardly, a hydraulic system for applying high pressure fluid to said jacks, and control means in said hydraulic system for transmitting the pressure applied to the downwardly moving jacks by the weight of the baskets thereon to the upwardly moving jacks to aid in lifting the baskets supported thereon.

7. An apparatus according to claim 6 wherein movable basket holding means are provided in each housing for supporting a column of baskets therein thereby permitting two of said hydraulic jacks to move from their uppermost positions to a point near their lowermost positions while each of said two jacks supports a plurality of baskets, and permitting the other two jacks to move from a point near their uppermost positions to their lowermost positions while empty, and means for controlling said movable basket holding means in timed relation with the movement of said hydraulic jacks.

8. An apparatus according to claim 7 wherein said basket holding means are pairs of pivotally mounted holding dogs.

9. An apparatus according to claim 7 wherein first transfer means are provided for transferring one basket at a time into the upper end of said inlet housing, second transfer means are provided for transferring one basket at a time from the lower end of said inlet housing to the lower end of said first sterilizing housing, third transfer means are provided for transferring one basket at a time from the first to the second sterilizing housing, fourth transfer means are provided to transfer one basket at a time from the lower end of said second sterilizing housing to the lower end of said outlet housing, fifth transfer means are provided to transfer one basket at a time out of the upper end of said outlet housing, and means are provided for operating said transfer means in timed relation with the movement of said hydraulic jacks.

10. An apparatus according to claim 9 wherein said basket holding means and said transfer means are hydraulically operated.

11. An apparatus according to claim 9 wherein control means are provided for operating said jacks, said holding means, and said basket holding means in timed relation wherein each housing can be loaded with empty baskets from the lower end thereof.

12. An apparatus according to claim 9 wherein control means are provided for operating said jacks, said holding means, and said transfer means in timed relation wherein baskets in each housing can be unloaded therefrom by first moving the baskets one at a time to the lower end of the associated housing.

13. An apparatus according to claim 9 wherein a pair of movable holding dogs are disposed at the upper end of each of said housings and are placed in basket supporting relation when a basket is being moved into or out of the associated housing.

14. An apparatus according to claim 6 wherein said control means includes speed control means for varying the speed of said jacks during vertical movement of the baskets in said housings for causing said jacks to move slowly near the ends of their strokes and for moving at higher rates of speed during the remaining portions of their strokes.

(References on following page)

References Cited

UNITED STATES PATENTS

| | | |
|---|---|---|
| 1,805,029 | 5/1931 | Baker. |
| 2,719,478 | 10/1955 | Van Der Winden _____ 99—360 |

FOREIGN PATENTS

| | | |
|---|---|---|
| 320,532 | 4/1920 | Germany. |
| 924,054 | 4/1963 | Great Britain. |
| 1,010,613 | 11/1965 | Great Britain. |

BILLY J. WILHITE, Primary Examiner

U.S. Cl. X.R.

21—78; 214—6

PO-1050
(5/69)

UNITED STATES PATENT OFFICE
CERTIFICATE OF CORRECTION

Patent No. 3,478,677     Dated November 18, 1969

Inventor(s)  S. A. MENCACCI

It is certified that error appears in the above-identified patent and that said Letters Patent are hereby corrected as shown below:

Column 1, line 48 - change "the to --are--. Column 6, line 9 - change "is to --its--. Column 9, line 61 - insert a period after --130--. Column 12, line 22 - change "612" to --512--. Column 13, line 47, after "thereby" insert --transferring the uppermost basket in housing 24 onto the--. Column 16, line 60, change "PL3D" to --PL3U--.

Column 20, line 7, after "valve" insert --K--. Column 20, line 69, change "SVC1" to --SCV1--. Column 21, line 65, change "relay" to --relays--. Column 22, line 28, chang "circuits" to --circuit--. Column 24, line 64, after "closed" insert --relay--. Column 25, line 74, change "UL8L" to PL8L--. Column 26, line 38, change "LS100" to --LS1o0--. Column 26, line 43, change "R100" to --R1o0--. Column 26, line 44, change "100-1" to 1o0-1--. Column 26, line 44, change "PL100" to --PL1o0--. Column 26, line 45, change "LS100" to --LS1o0--. Column 26, line 46, change "100-2" to 1o0-2--. Column 26, line 64 after "de-energizes" insert --relay--. Column 37, line 30, change "contat" to --contact--. Column 37, line 50, change "limtt" to --limit--. Column 39, line 46, delete "draulic jack for vertical] moving another column of" and insert the same between lines 47 and 48.

Signed and sealed this 17th day of August 1971.

(SEAL)
Attest:

EDWARD M. FLETCHER, JR.
Attesting Officer

WILLIAM E. SCHUYLER, JR.
Commissioner of Patents